United States Patent [19]
Richter et al.

[11] Patent Number: 5,727,184
[45] Date of Patent: Mar. 10, 1998

[54] METHOD AND APPARATUS FOR INTERFACING BETWEEN PERIPHERALS OF MULTIPLE FORMATS AND A SINGLE SYSTEM BUS

[75] Inventors: Bryan M. Richter, Fremont; Stephen A. Smith, Palo Alto; Daniel G. Bezzant, Pleasanton; Kasturiraman Gopalaswamy, Santa Clara; Suhas Anand Shetty, Sunnyvale; Arunachalam Vaidyanathan, Fremont, all of Calif.

[73] Assignee: Cirrus Logic, Inc., Fremont, Calif.

[21] Appl. No.: 266,975

[22] Filed: Jun. 27, 1994

[51] Int. Cl.$^6$ .............................. G06F 13/10; G06F 5/01
[52] U.S. Cl. .................. 395/500; 395/882; 395/829; 395/884
[58] Field of Search ................. 395/200.01–200.04, 395/200.08, 200.1, 200.2, 828, 832, 856–860, 882–884, 892, 500; 364/238.2, 238.3, 239, 239.9, 240.1, 240.5, 260.1, 926.9, 926.93, 939.3, 942.3, 940.61

[56] References Cited

U.S. PATENT DOCUMENTS

| | | | |
|---|---|---|---|
| 4,075,693 | 2/1978 | Fox et al. | 364/200 |
| 4,081,858 | 3/1978 | Koblasz et al. | 364/553 |
| 4,106,092 | 8/1978 | Millers | 364/200 |
| 4,268,906 | 5/1981 | Bourke et al. | 395/700 |
| 4,371,932 | 2/1983 | Dinwiddie et al. | 395/841 |
| 4,415,986 | 11/1983 | Chadra | 395/851 |
| 4,484,263 | 11/1984 | Olson et al. | 395/886 |
| 4,509,113 | 4/1985 | Heath | 395/886 |
| 4,538,224 | 8/1985 | Peterson | 395/842 |
| 4,589,066 | 5/1986 | Lam et al. | 364/200 |
| 4,592,012 | 5/1986 | Braun | 364/900 |
| 4,631,666 | 12/1986 | Harris et al. | 395/309 |
| 4,683,534 | 7/1987 | Tietjen et al. | 364/200 |
| 4,716,525 | 12/1987 | Gilanyi et al. | 364/200 |
| 4,727,475 | 2/1988 | Kiremidjian | 364/200 |
| 4,747,047 | 5/1988 | Coogan et al. | 395/858 |

(List continued on next page.)

OTHER PUBLICATIONS

Rockwell International R65C00/21 Dual CMOS Microcomputer and R65C29 Dual CMOS Microprocessor Data Book, pp. 3–22 through 3–24.

*Primary Examiner*—Kevin J. Teska
*Assistant Examiner*—Tyrone V. Walker
*Attorney, Agent, or Firm*—Robert P. Bell; William Alford; J. P. Violette

[57] ABSTRACT

A peripheral interface system and apparatus including a pair of integrated circuits, referred to as a system adapter and a socket controller, use a communication protocol, referred to as a windowed-interchip-communication protocol, to interface peripherals, such as PCMCIA cards or infrared devices, and other subsystems having different formats with a CPU system bus. The system adapter communicates to a hard disk drive subsystem using the ATA communication standards to interface an ATA hard disk drive with the CPU system bus. Communication between the system adapter and the socket controller, which communicates with PCMCIA peripheral cards and IR peripherals, is accomplished using the windowed-interchip-communication protocol which may share hardware resources with other communication protocols. Communication between the system adapter and the hard disk drive and between the system adapter and the socket controller may be provided on the same chain of a standard 40 signal ribbon cable. Alternatively communication between an expansion board and a socket controller may be performed across a cable separate from the hard disk drives having a different signal line format. The system adapter may be included within a single interface expansion board which can be connected to the motherboard and CPU system bus or it can be directly connected or soldered to the motherboard and communicate with the socket controller and ATA hard disk drives using one or more busses.

26 Claims, 18 Drawing Sheets

U.S. PATENT DOCUMENTS

| | | | |
|---|---|---|---|
| 4,775,931 | 10/1988 | Dickie et al. | 364/200 |
| 4,805,090 | 2/1989 | Coogan | 395/894 |
| 4,807,282 | 2/1989 | Kazan et al. | 379/284 |
| 4,935,894 | 6/1990 | Ternes et al. | 364/900 |
| 4,972,470 | 11/1990 | Farago | 364/240.8 |
| 4,980,822 | 12/1990 | Brantley, Jr. et al. | 364/200 |
| 5,038,320 | 8/1991 | Heath et al. | 364/900 |
| 5,107,462 | 4/1992 | Grundman et al. | 365/189.02 |
| 5,123,094 | 6/1992 | MacDougall | 395/375 |
| 5,175,536 | 12/1992 | Aschliman et al. | 340/825.04 |
| 5,191,653 | 3/1993 | Banks et al. | 395/275 |
| 5,218,707 | 6/1993 | Little et al. | 395/800 |
| 5,245,703 | 9/1993 | Hubert | 395/200 |
| 5,255,376 | 10/1993 | Frank | 395/325 |
| 5,263,172 | 11/1993 | Olnowich | 395/800 |
| 5,264,958 | 11/1993 | Johnson | 364/239 |
| 5,265,252 | 11/1993 | Rawson et al. | 364/280.9 |
| 5,280,587 | 1/1994 | Shimodaira et al. | 395/275 |
| 5,367,301 | 11/1994 | Stittner et al. | 371/68.3 |
| 5,367,646 | 11/1994 | Pardillos et al. | 364/239 |
| 5,371,892 | 12/1994 | Petersen et al. | 395/700 |
| 5,376,928 | 12/1994 | Testin et al. | 340/825.5 |
| 5,379,382 | 1/1995 | Work et al. | 395/883 |
| 5,379,384 | 1/1995 | Solomon | 395/325 |
| 5,386,517 | 1/1995 | Sheth et al. | 395/275 |
| 5,404,318 | 4/1995 | Hoffert et al. | 364/551.01 |
| 5,408,618 | 4/1995 | Aho et al. | 395/325 |
| 5,420,987 | 5/1995 | Reid et al. | 395/325 |
| 5,454,081 | 9/1995 | Thorne | 395/281 |
| 5,457,784 | 10/1995 | Wells et al. | 395/829 |

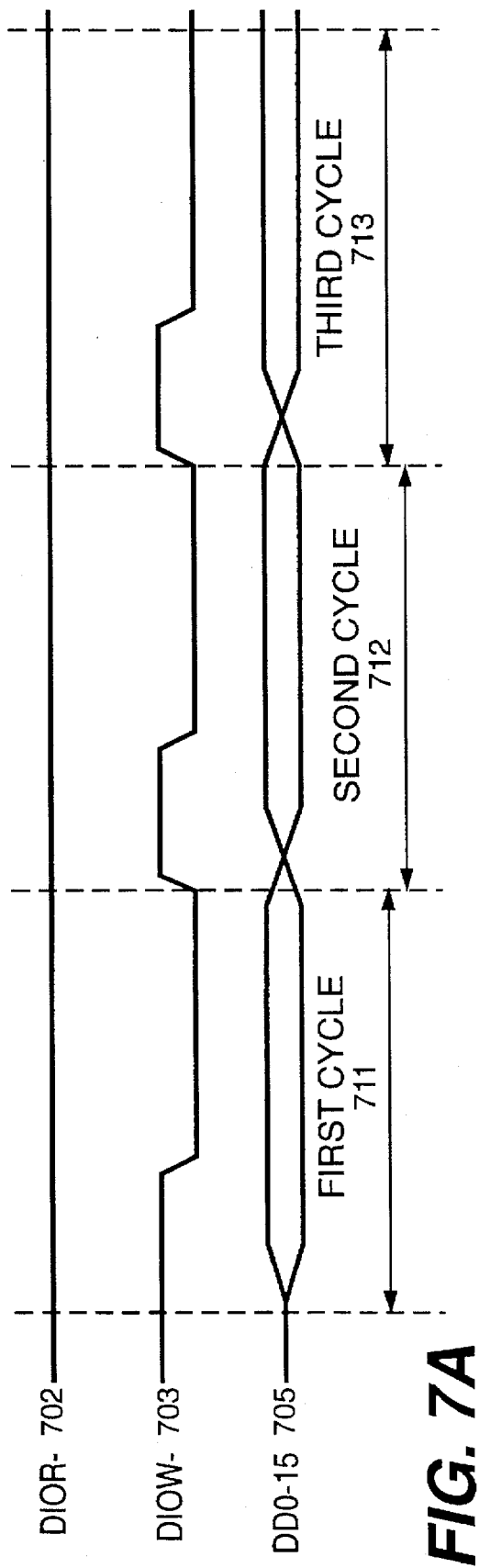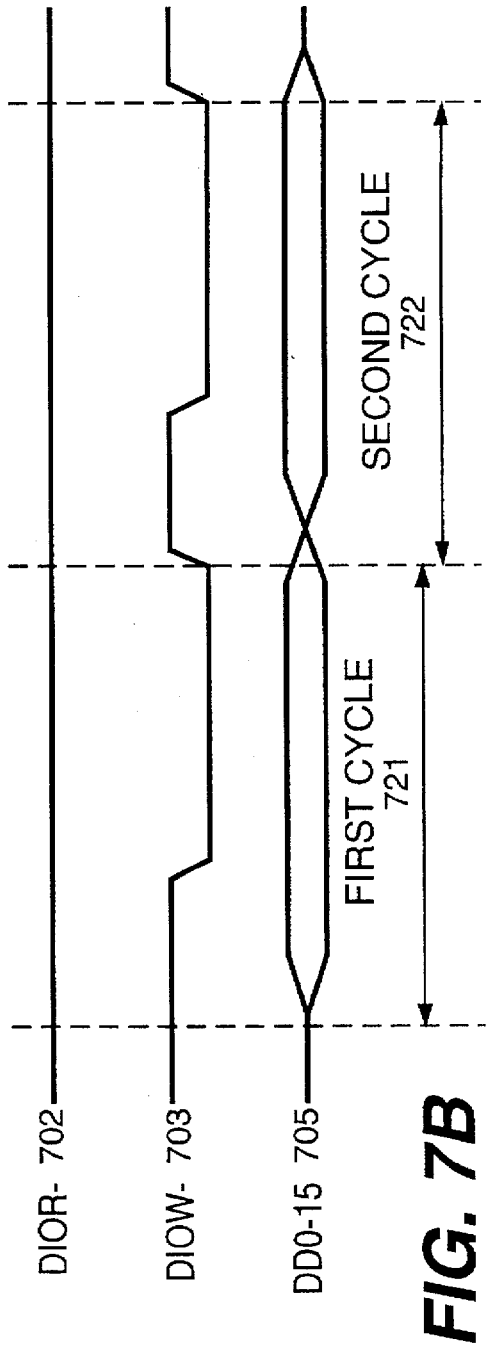

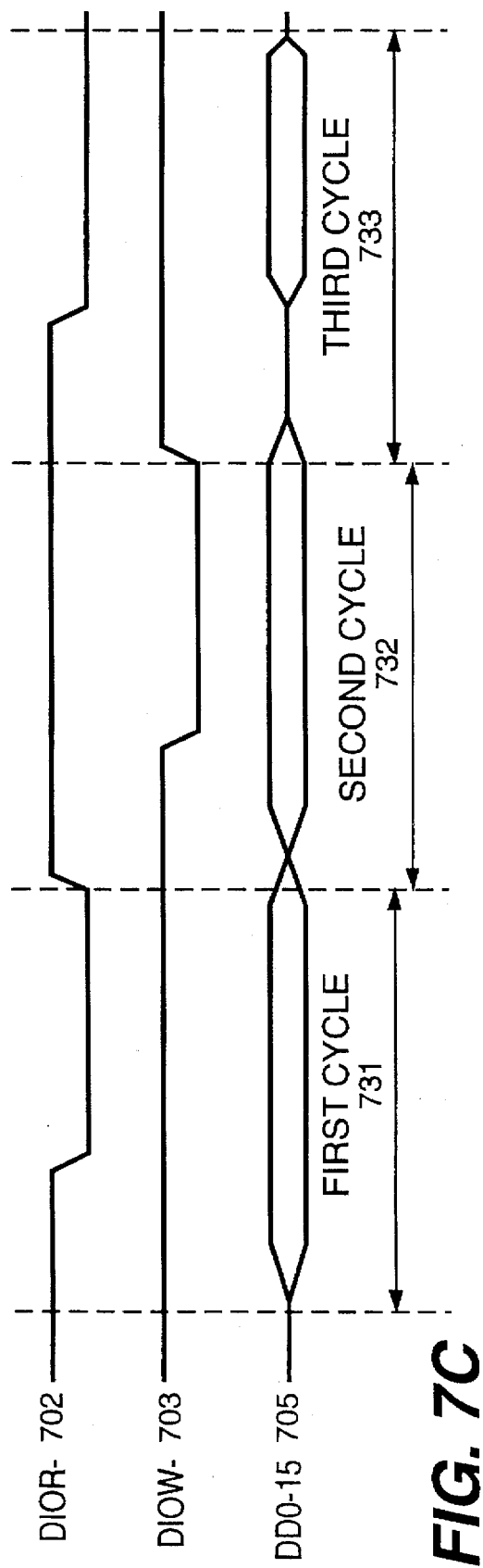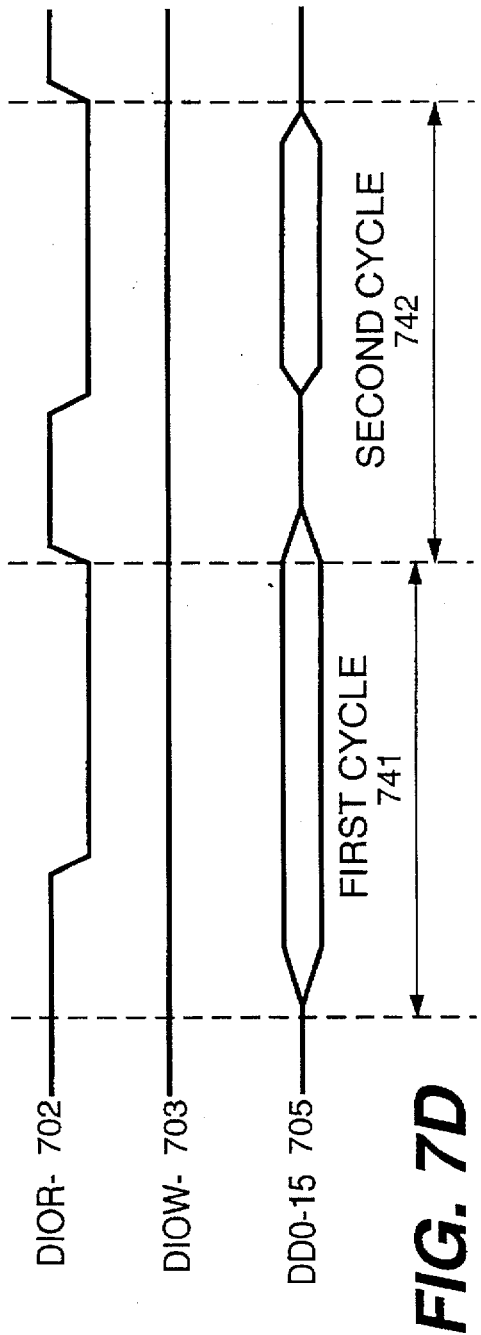

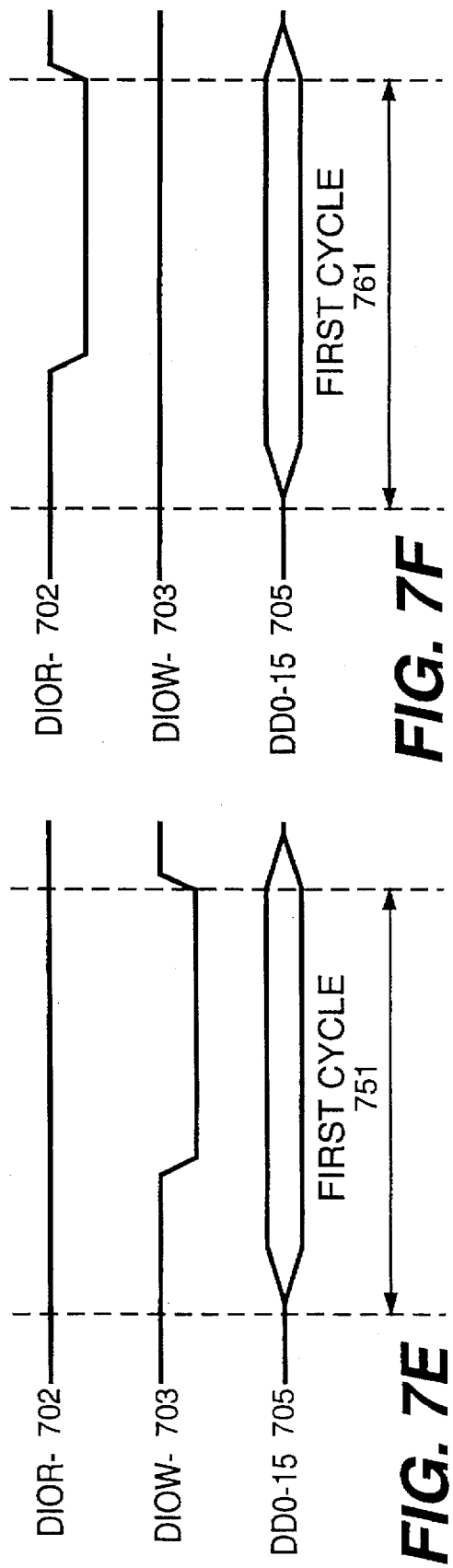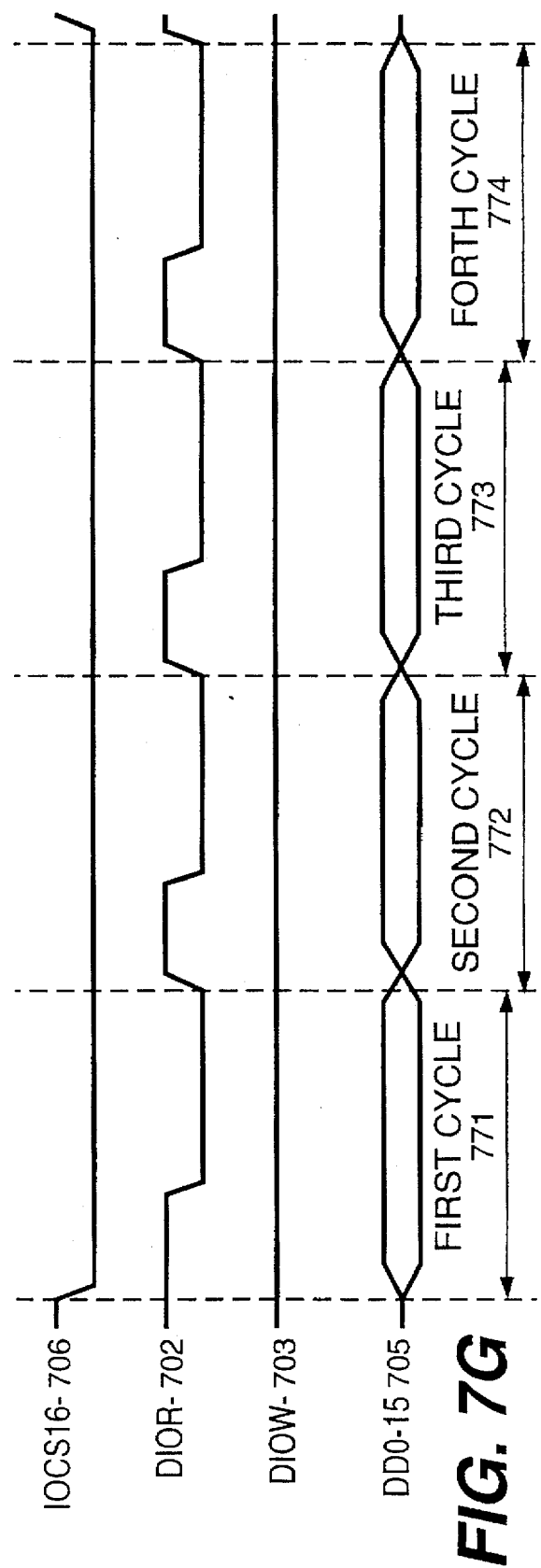

METHOD AND APPARATUS FOR INTERFACING BETWEEN PERIPHERALS OF MULTIPLE FORMATS AND A SINGLE SYSTEM BUS

FIELD OF THE INVENTION

The present invention relates to the field of host adapters and interface circuits for interfacing and controlling communications between peripherals and a system bus. More particularly, the present invention relates to the field of host adapters and interface circuits for interfacing and controlling communications between Personal Computer Memory Card International Association (PCMCIA) peripheral cards, infrared peripheral devices, hard disk drives, or other subsystems and a host CPU system bus wherein the PCMCIA peripherals, infrared peripherals, hard disk drives, or other subsystems may have a format and characteristic different from one another.

BACKGROUND OF THE INVENTION

Modern digital systems such as the system 101 illustrated in FIG. 1A typically include multiple integrated circuits on multiple printed circuit boards. The system 101 is a desktop computer which includes two ATA-type disk drives 114 and 115 and two Personal Computer Memory Card International Association (PCMCIA) expansion slots or sockets 116 and 117. PCMCIA is a standard interface and specification to allow PCMCIA cards such as 122 and 123 to vary the capabilities of a computer system or other electronic equipment. The PCMCIA cards consist of a connector that interfaces to a printed circuit board that is approximately the size of a credit card. The main printed circuit board or motherboard 100 includes the central processing unit (CPU) 140, which is the heart of the computer system 101 and controls the operations of the system, and also the internal system memory 142. The CPU 140 is coupled to the system memory 142 and the other integrated circuits on the motherboard 100 by the core logic 143. As peripherals or subsystems such as the disk drives 114 and 115 are added to the system 101, interface boards such as the board 104 are coupled to the motherboard 100 and to the system bus 146. This interface board 104 is also coupled to the disk drives 114 and 115 by a cable 110 which allows the interface board 104 to communicate with the disk drives 114 and 115. The interface board 104 includes the ATA host adapter integrated circuit 108 which serves as the interface and controls communications between the disk drives 114 and 115 and the CPU system bus 146.

In systems of the prior art, as additional peripherals such as the PCMCIA expansion slots or sockets 116 and 117, are added to the system, an additional interface board 102 must be coupled to the motherboard 100 to serve as the interface and control communications between the PCMCIA expansion slots 116 and 117 and the bus 146. The bus 146 has a differing number of address and data lines as compared to the PCMCIA address and data line requirements. Data transfers across bus 146 are at a different rate than the data transfer to a PCMCIA card. Other control signals are also required at the PCMCIA interface in order to adapt to the various needs of differing PCMCIA cards that may be inserted. Thus the PCMCIA interface is very flexible and the PCMCIA adapter 106 is used to interface differing data and address line requirements having different transfer rates between the system bus 146 and PCMCIA cards 122 or 123. The interface boards 102 and 104 are typically coupled to the motherboard 100 by inserting them into receiving slots on the motherboard 100. Because there is limited space within the computer system case and the number of receiving slots on the motherboard 100 is also typically limited, only a finite number of interface boards can be coupled to the motherboard 100, thus restricting the number of peripherals which can be coupled to the computer system 101 at any one time.

The disk drives 114 and 115 illustrated in FIG. 1A are ATA (Advanced Technology Attached) hard disk drives. ATA hard disk drives may also be commonly referred to as IDE (Integrated Drive Electronics) hard disk drives. ATA is a set of standards and specifications used for communications between disk drives and host central processing units which defines an integrated bus interface between disk drives and host CPUs and provides a common point of attachment for system manufacturers, system integrators and suppliers of intelligent peripherals. The ATA standard interface having 40 total lines, includes a three-bit address bus designated as DA0, DA1, and DA2 used for indexing drive registers; a 16 bit bidirectional data bus designated as DD0 through DD15; a data width format signal designated as IOCS16-indicating either an 8 or 16 data bit capability, a write strobe signal designated as DIOW-; a read strobe signal designated as DIOR-; an interrupt request signal INTRQ, a status signal I/O Channel Ready designated as IORDY, and host chip select 0 and 1 signal lines respectively designated as CS1FX- and CS3FX-. The two host chip select signal lines CS1FX- and CS3FX- which act similar to an address line, select access of either Command Block registers or Control Block registers within an attached ATA disk drive. Other signals present within the ATA standard interface that may be significant to the description of the present invention will be described below. The complete ATA standard interface and communication standard is described within the APPENDIX 1 "Information Technology—AT Attachment Interface for Disk Drives".

The disk drives 114 and 115 may be designated disk drive 0 and disk drive 1 by the ATA cable connection for the ATA standard interface signal CSEL (ground=drive 0, open=drive 1) or by setup switches or jumper wires within the disk drive electronics that are read upon reset. Only one of the disk drives 114 or 115 connected to the same ATA cable 110 can be accessed at any one time. The selection of whether disk drive 0 or disk drive 1 is to be accessed is controlled through use of the drive/head register which is embedded in each disk drive. Both disk drives 114 and 115 simultaneously respond to writes on the cable to the drive/head register, however only the selected drive will respond to writes to other registers therein. Bit 4 of each drive/head register, designated DRV, is used to select the drive that should be active to receive the other drive register accesses and is compared by the drive with its CSEL or switch/jumper configuration as drive 0 or drive 1. If the host CPU sets DRV to zero then drive 0 is selected and further register accesses are to drive 0 registers. If the host CPU sets DRV to one then drive 1 is selected and further register accesses are to drive 1 registers.

Accesses to the disk drives occur during cycles such as those illustrated in FIG. 1D as either ATA read cycles 190 or ATA write cycles 191. Note that during all ATA read or write cycles either a CS1FX- or CS3FX- signal becomes active as illustrated by the CS1FX-/CS3FX- waveform 181. Activation of CS1FX- or CS3FX- is then followed by either DIOR- active low signal or DIOW- active low signal as represented by the DIOR waveform 182 or the DIOW- waveform 183. If neither CS1FX- nor CS3FX- is active then no write or read operation is being performed to the disk drives regardless of the condition of other signals on the ATA cable 110 including DIOR- and DIOW- as illustrated by the ATA NOOP cycles 192 and 193.

If a read or write host CPU transfer cycle to or from the ATA drive needs to be extended then the ATA drive de-asserts the IORDY signal inactive low. This indicates that the selected hard disk drive needs further time to complete the present operation before any other operation may take place. Otherwise IORDY is pulled up to an active one or an active high level by a pullup resistor.

The PCMCIA expansion slots 116 and 117 illustrated in FIG. 1A are two typical implementations of sockets, also referred to as slots, into which a PCMCIA card 122 or 123 can be inserted. The PCMCIA standard enables memory and I/O devices to be inserted as exchangeable peripherals into electronic devices through a standard interface. A PCMCIA card 122 uses this standard interface, allowing PCMCIA interfaced peripheral devices such as a modem card, a network card, a sound card, a floppy disk drive, a hard disk drive, or other cards to be plugged into the system computer by means of their embodiment in a PCMCIA card 122. This PCMCIA card 122 is plugged into a PCMCIA expansion slot 116 which is coupled to a PCMCIA host adapter integrated circuit 106 within the computer system 101. The operation of the PCMCIA expansion slot 116 is controlled by the PCMCIA host adapter integrated circuit 106. The PCMCIA bi-directional buffer 120 is coupled to the PCMCIA expansion slot 116 through the bus 124. The PCMCIA bi-directional buffer 120 is coupled to the connector 128 by the bus 126. The cable 112 is coupled to the connector 128 and to the connector 130. The connector 130 is coupled to the PCMCIA host adapter integrated circuit 106 by the bus 138.

A second type of PCMCIA expansion slot 117 is also shown in the computer system 101 and coupled to the PCMCIA host adapter board 102. The second PCMCIA expansion slot 117 is coupled to the termination circuit 121 by the bus 125. The circuits 120 and 121 can be either bi-directional buffers or simple termination circuits. The termination circuit 121 is coupled to the connector 129 by the bus 127. The connector 129 is coupled to the cable 113 which is in turn coupled to the connector 131. The connector 131 is coupled to the PCMCIA host adapter integrated circuit 106 by the bus 139. The first and second PCMCIA expansion slots 116 and 117 are designed to function identically but may provide differing voltage settings and timing parameters.

The ATA standard interface is not compatible with the PCMCIA standard interface in that a PCMCIA device cannot be coupled to a system through an ATA port, even if the differing connector types were not a problem. Correspondingly, a user cannot couple a standard ATA device, such as the disk drives 114 or 115 to a system through a PCMCIA port. However, there is a method of interface described by the ATA SFF (Advanced Technology Adapter Small Form Factor) committee to connect ATA devices packaged in a PCMCIA form factor to PCMCIA socket connectors. This allows an ATA disk drive to be mechanically arranged into a PCMCIA card form factor and designates how the ATA signal lines may be arranged within the card's PCMCIA connector. However, the ATA SFF interface to a PCMCIA socket connector does not support system identification of installed drives and will not work for devices other than ATA SFF packaged disk drives. Due to the limited applicability, the ATA SFF interface method is not supported in many machines which offer PCMCIA card support. For the reasons discussed above, it is preferable to use the more flexible PCMCIA standard because it can interface to a wide variety of peripheral devices including a disk drive interface and because it simplifies the interface.

A second desktop computer system is illustrated in FIG. 1B. The only difference between the system of FIG. 1A and the system illustrated in FIG. 1B is that within the system of FIG. 1B, a single cable 170 is coupled between the PCMCIA host adapter board 102 and the two PCMCIA expansion slots 116 and 117. Cable 170 is a wider cable than cables 112 and 113 of FIG. 1A, carrying a greater number of signal lines to support two PCMCIA expansion slots 116 and 117. Due to the increased number of signal lines, cable 170 and connectors 172 and 133 are more costly than cable 112 or 113 and connectors as illustrated in FIG. 1A. The cable 170 is coupled to the connector 133 and to the connector 172 on the PCMCIA expansion board 178. The connector 133 is coupled to the PCMCIA host adapter 106 by the busses 138 and 139. The connector 172 is coupled to a termination or buffering circuit 176 by the bus 174. The termination or buffering circuit 176 is coupled to the first PCMCIA expansion slot 116 by the bus 124 and to the second PCMCIA expansion slot 117 by the bus 125.

A portable computer system 161 is illustrated in FIG. 1C. The portable computer system 161 includes an ATA compatible disk drive 114, a modem 157 and two PCMCIA expansion slots 116 and 117. Because this is a portable computer system, the integrated circuits such as the ATA host adapter 108 and the PCMCIA host adapter 106 are integrated onto the motherboard 160 instead of coupled through receiving slots as in the desktop system discussed previously. The modem 157 is coupled to a Universal Asynchronous Receiver/Transmitter (UART) through a cable 158 and a bus 155. The UART 154 is also coupled to the system bus 146. The modem 157 is also coupled to a phone jack 156 for coupling the modem to a phone line.

The graphics controller 144 of the portable computer system 161 is coupled to the system bus 146 and to the display used by the portable computer system 161, by either of the outputs 150 or 152. If the display used by the portable system 161 is a CRT display then the RGB output 150 of the graphics controller 144 is coupled to the display. If the display used by the portable system 161 is a flat-panel display then the flat-panel output 152 of the graphics controller 144 is coupled to the display.

While in the systems illustrated in FIGS. 1A, 1B and 1C, ATA compatible peripherals and PCMCIA compatible peripherals have been illustrated and described, peripherals of many different formats can be coupled to systems of the prior art in this same fashion. For example, printers, modems, fax boards, digitizers, scanners and other types of peripherals can be included in a computer system by coupling an expansion board similar to the boards 102 and 104 to the motherboard 100 in desktop systems or integrating additional integrated circuits onto the motherboard 160 for portable computer systems. However, as stated above, the number of peripherals which can be coupled to a computer system at any one time is limited to the amount of space within the computer case and the specific limitations of the motherboard 100. The cost of adding peripherals is also related to the number and size of the chips required to add those peripherals as well as the size and number of cables.

What is needed is an apparatus which allows multiple peripherals of differing formats to be coupled to the motherboard 100 by a single expansion board or a single integrated circuit interface. What is further needed is an apparatus for coupling multiple peripherals to a single expansion board or a single integrated circuit interface using a single cable or connector. What is also needed is an apparatus which will use more efficiently the finite space within a computer system case and allow a greater number of peripherals to be coupled to a computer system. What is needed is an apparatus which will use low cost standard cabling and connectors having a low signal line count in order to provide for the most economically efficient method of supporting an increasing number of peripheral devices within a computer system.

SUMMARY OF THE INVENTION

A peripheral interface system and apparatus including a pair of integrated circuits, referred to as a system adapter and a socket controller, use a communication protocol, referred to as a windowed-interchip-communication (WIC) protocol, to interface peripherals, such as PCMCIA cards or infrared devices, and other subsystems having different formats with a CPU system bus. The system adapter may further communicate to a hard disk drive subsystem using the advanced technology attached (ATA) communication standards to interface an ATA hard disk drive with the CPU system bus. Communication between the system adapter and the socket controller, for purposes of PCMCIA peripheral support and other associated functions within the socket controller such as an IR communications link, is accomplished using the WIC protocol which may share hardware resources with other communication protocols. Communication between the system adapter and the hard disk drive using the ATA protocol and communication between the system adapter and the socket controller using the WIC protocol may be provided on a single chain of a standard 40 pin ribbon cable. The WIC protocol is designed to be able to mutually exist with the ATA protocol over the same interface cable. Alternatively communication between an expansion board and a socket controller may be performed across a cable separate from the hard disk drives having a different signal line format. The system adapter may be included within a single interface expansion board which can be connected to the motherboard and CPU system bus or it can be directly connected or soldered to the motherboard and communicate with the socket controller and ATA hard disk drives again using a single standard 40 pin cable. As another alternative, especially in the case of a portable system, both the system adapter and socket controller may be directly connected or soldered to the motherboard and communicate using a single bus or set of signal traces on a motherboard, or a flexible printed circuit board or other daughterboard type assembly, which may also be connected to the ATA hard disk drives.

A socket controller integrated circuit can be configured to control one or more PCMCIA slots over a single cable or signal bus interface into which PCMCIA peripherals having different formats may be inserted. A socket controller integrated circuit may be configured to further control one or more infrared peripherals or other subsystem. When communication is desired by a CPU or other controlling device with one of the peripherals coupled to the peripheral interface system, the peripheral interface system first determines which one of the multiple peripherals that are connected to it that the CPU desires to communicate with. The peripheral interface system then converts the signals from the system bus into the proper format for the required peripheral and controls the transmission of those signals to the peripheral. Correspondingly, when a peripheral is sending instructions or data to the CPU or other controller, the peripheral interface system converts the instructions or data from the peripheral into the format required by the CPU or controller and controls the transmission of those signals to the system bus.

In an ISA bus interface implementation of the peripheral interface system, the peripheral interface system monitors the address lines of the system bus in order to determine which peripheral the system is communicating with. The peripheral interface system also monitors the I/O read signal line, the I/O write signal line, the memory read signal line, the memory write signal line of the ISA bus in order to determine the direction and the type of communication that may be originating. In implementations of the peripheral interface systems for other bus systems, similar signals are monitored and the interface and communication protocol may be applied to these systems as well.

When one of the peripherals is initiating a communication with the peripheral interface system, an interrupt signal or direct memory access request is sent to the system adapter integrated circuit. Each of the peripherals coupled to the peripheral interface system has a corresponding detection circuit for detecting when the peripheral interface system is communicating with that peripheral. The chip select signal lines and other address information multiplexed on data signal lines can be used to select each peripheral and notify the peripheral that its operation is required for completion of the current task by the system.

In the case where ATA hard disk drives are connected to the same chain of cable as the system adapter integrated circuit and socket controller integrated circuit, communication between the system adapter integrated circuit and the socket controller integrated circuit is transparent to communication between the system adapter integrated circuit and the ATA hard disk drives.

The peripheral interface system may be adapted to use a communication protocol similar to the windowed-interchip-communication protocol so that other communication busses may share hardware resources such as cables and controller circuits in order to minimize system costs, reduce space requirements, and the component count that is normally associated with providing peripheral expansion capability.

BRIEF DESCRIPTION OF THE DRAWINGS

FIGS. 7A–G illustrate waveform diagrams of the various operations that may be performed over a standard ATA cable using the WIC (windowed-interchip-communication) protocol of the present invention.

DETAILED DESCRIPTION OF THE PREFERRED EMBODIMENT

Figure 1A:
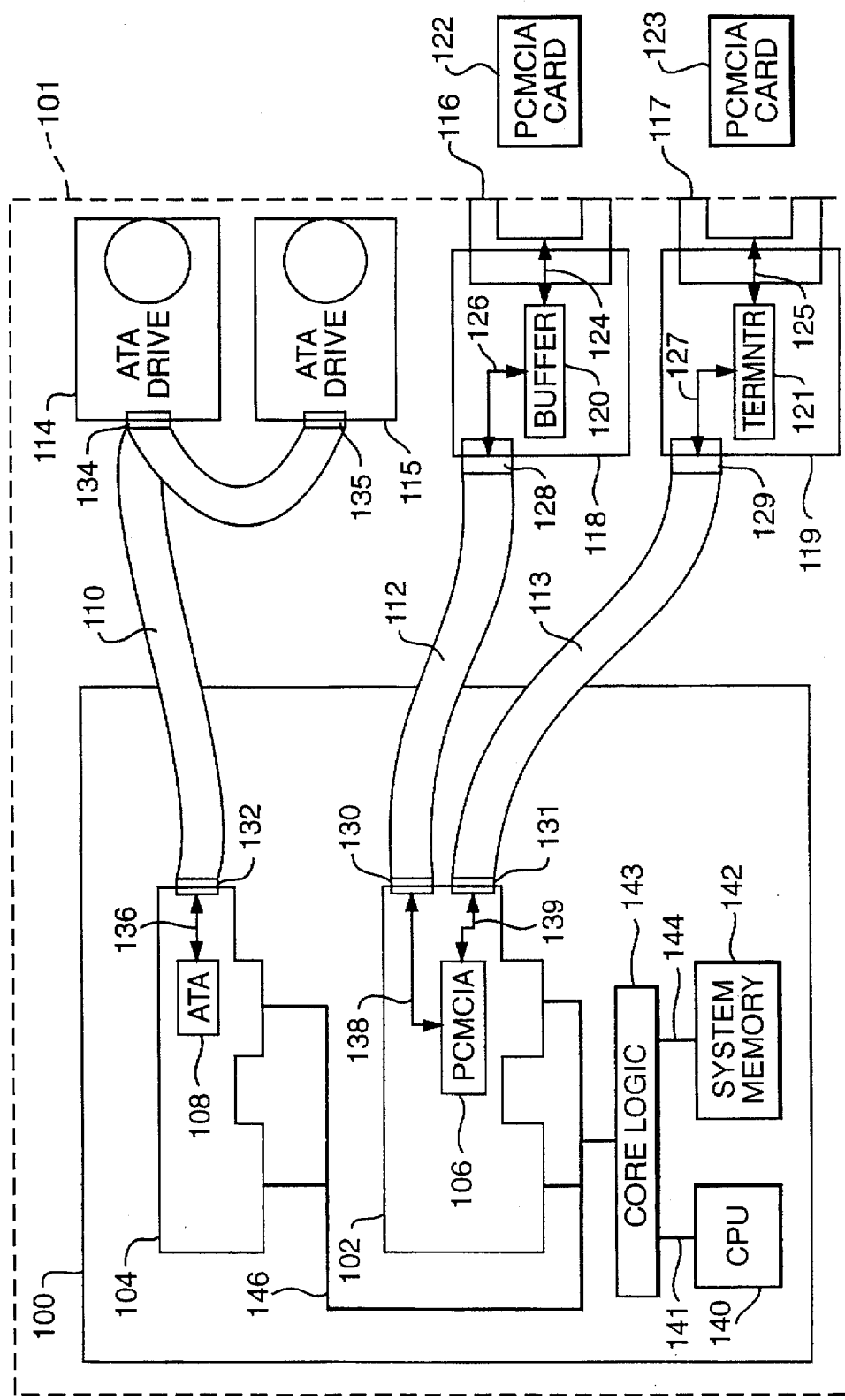
FIG. 1A illustrates a block diagram schematic for a desktop computer system of the prior art where multiple cables provide the medium for communication between the CPU and various peripherals.
Figure 1B:
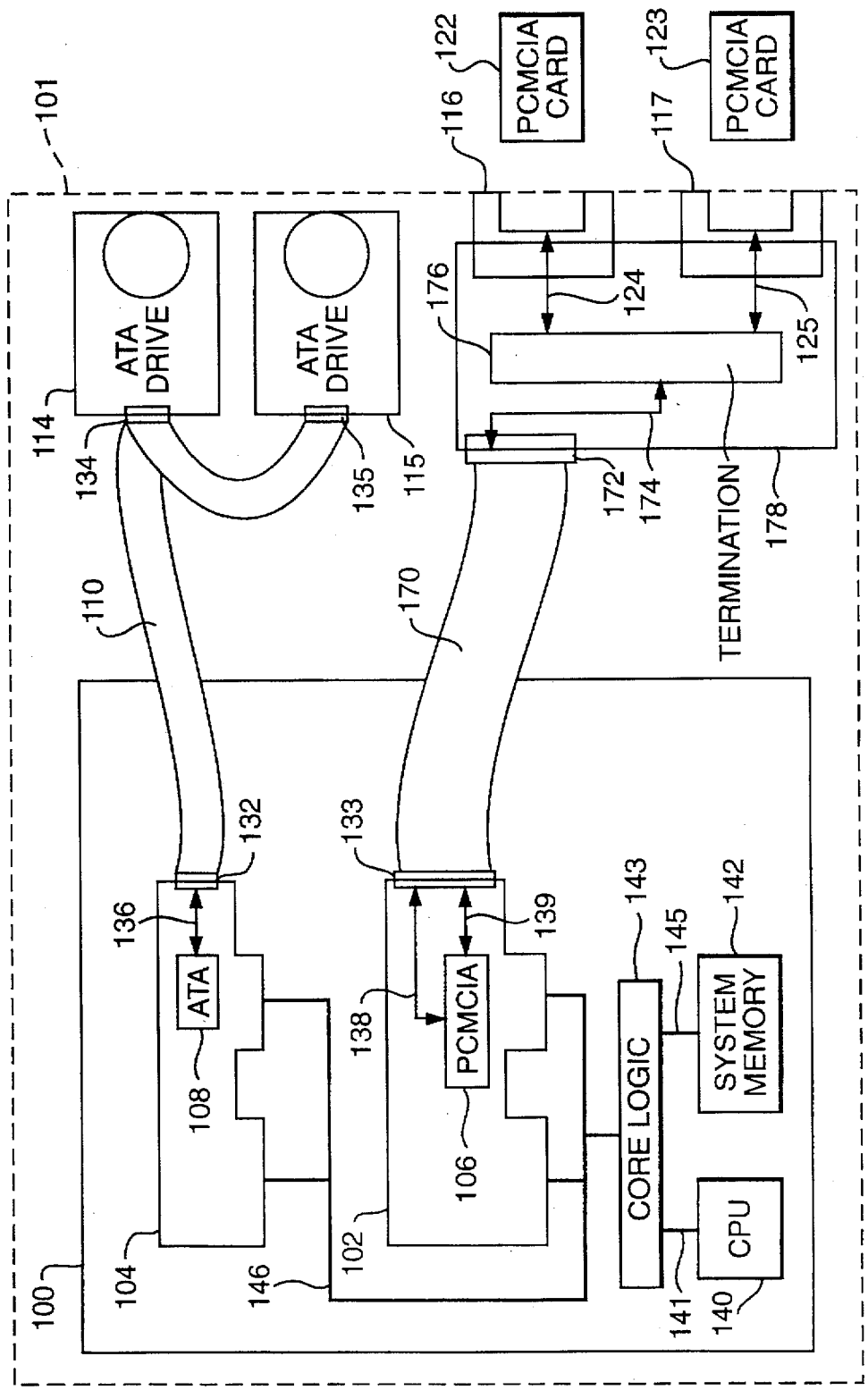
FIG. 1B illustrates a block diagram schematic for a desktop computer system of the prior art where a number of cables as illustrated in FIG. 1A are reduced to a single cable having a large number of signal lines.
Figure 1C:
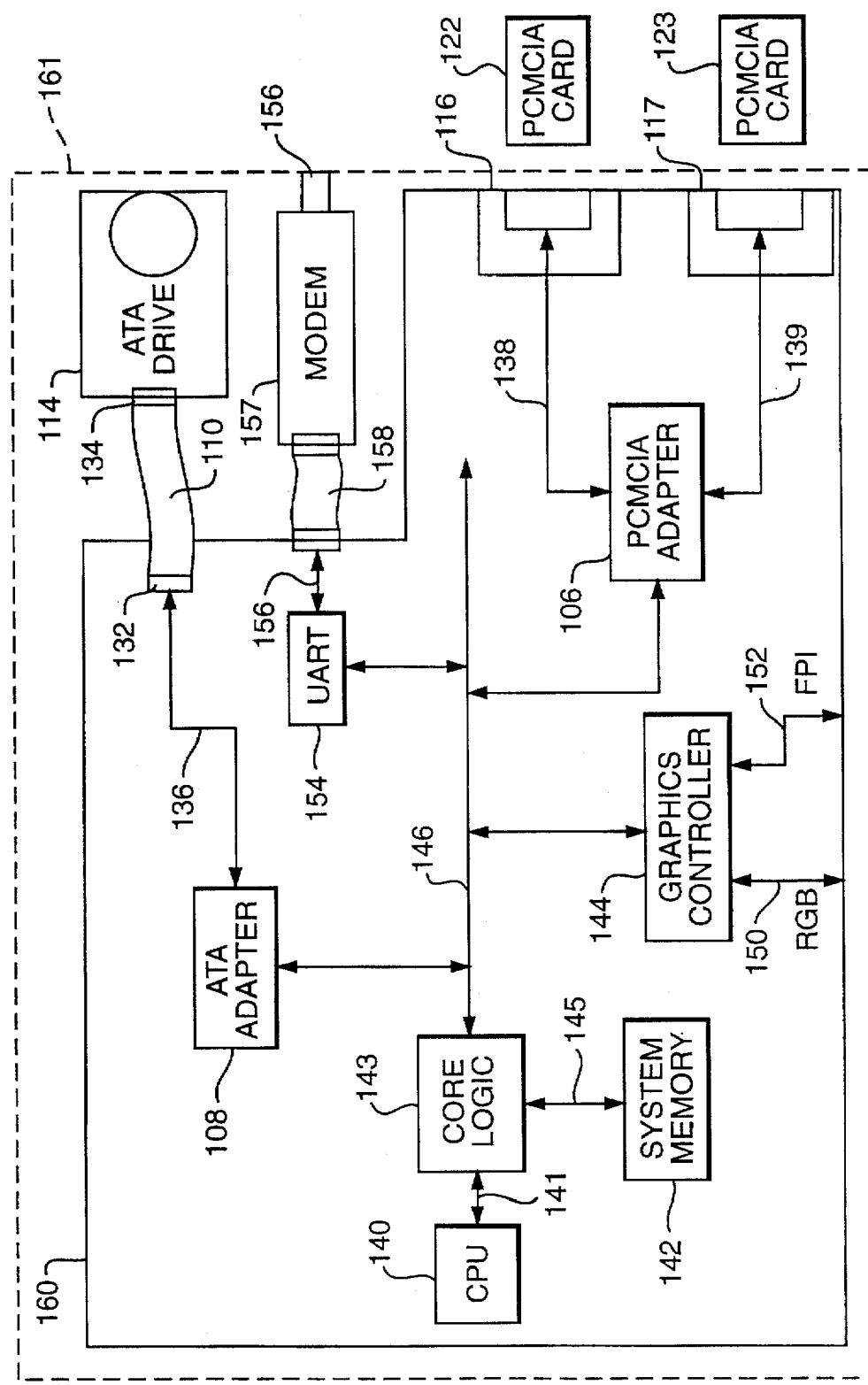
FIG. 1C illustrates a block diagram schematic for a portable computer system of the prior art.
Figure 1D:
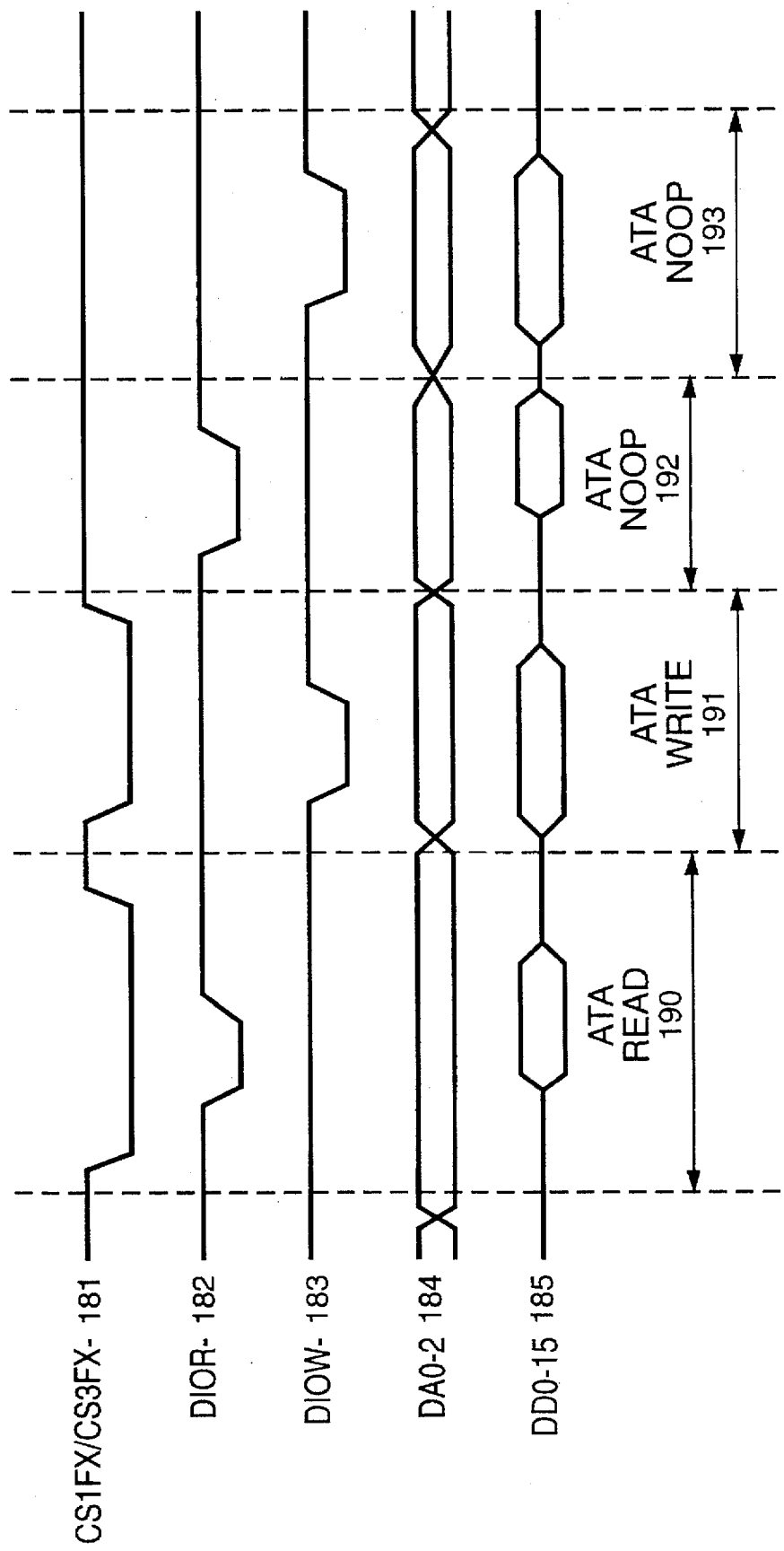
FIG. 1D illustrates a waveform timing diagram showing signal transitions and operating cycles of prior art systems.
Figure 2A:
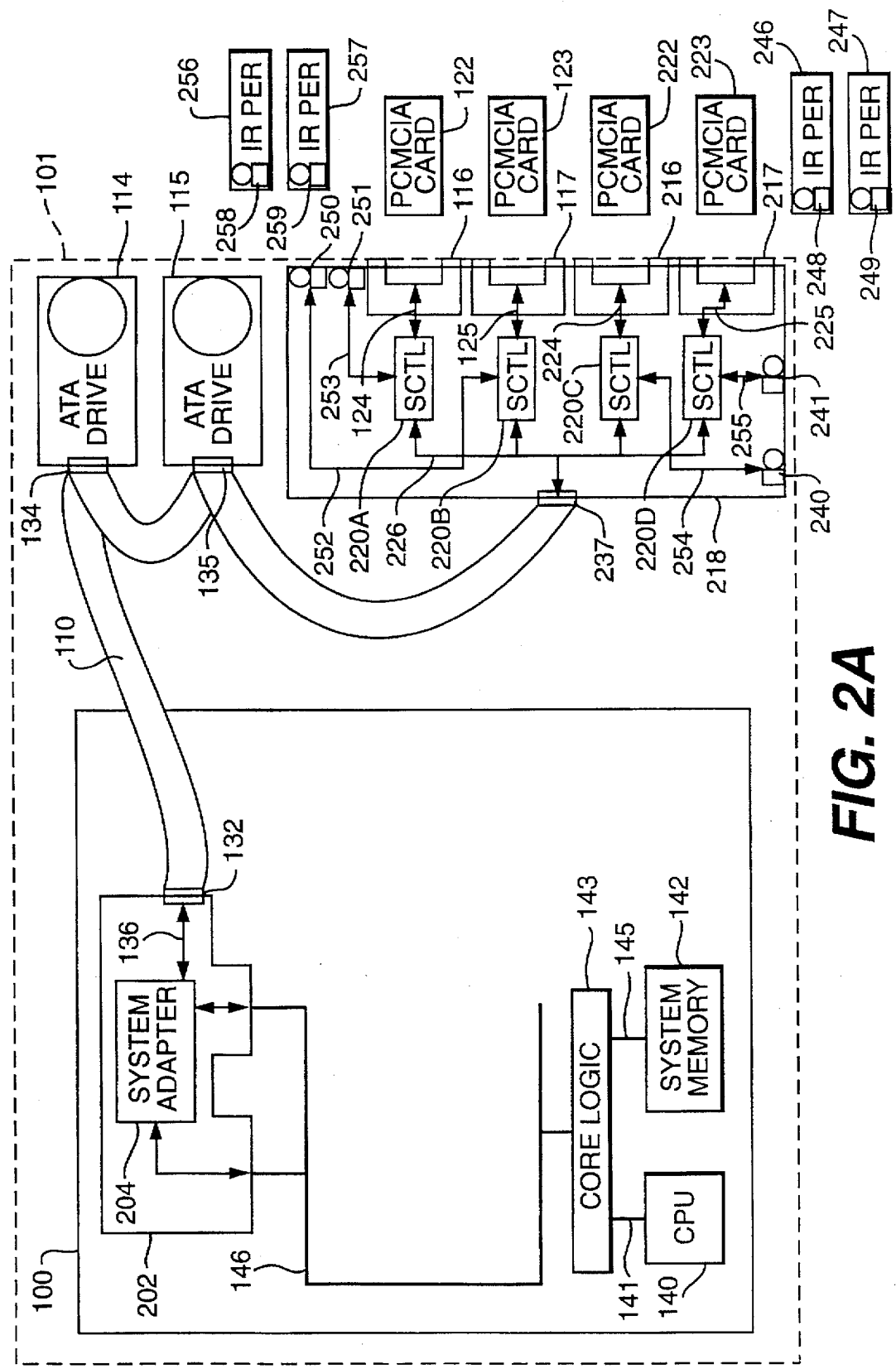
FIGS. 2A and 2B illustrate block diagram schematics for desktop computer systems according to the present invention which include a system adapter integrated circuit and a socket controller integrated circuit.
Figure 2B:
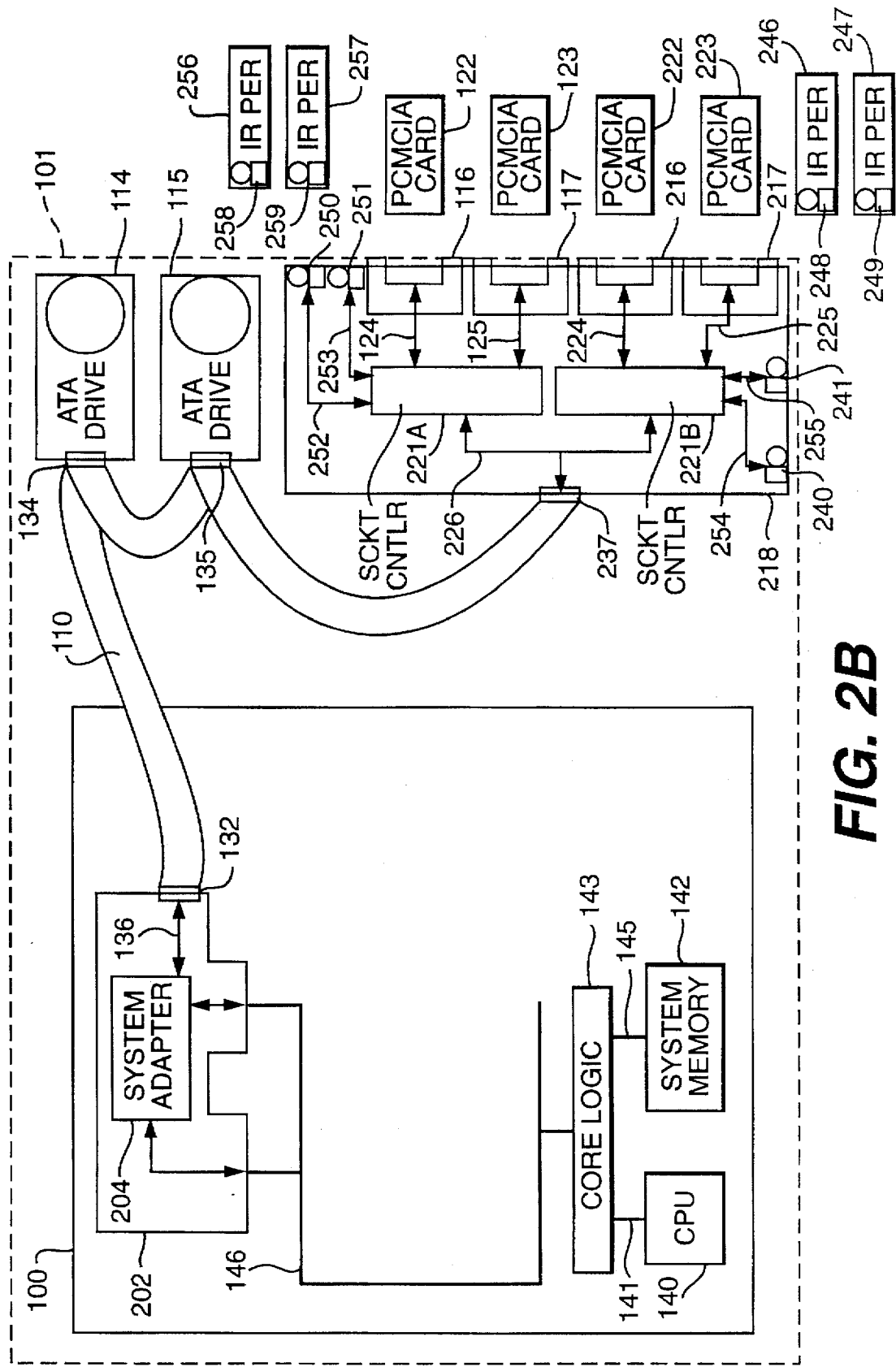

A block diagram schematic for a desktop computer system of the preferred embodiment of the present invention is illustrated in FIGS. 2A and 2B. Infrared peripherals 246, 247,256,and 257 have IR transceivers 248,249,258 and 259 to communicate with the computer using infrared waves. PCMCIA peripheral cards 122,123,222,and 223 may be plugged into the PCMCIA expansion slots or sockets 116, 117,216, or 217 in order to communicate with the computer system. Other subsystems may be similarly connected in order to communicate with the computer. A system adapter interface card 202, including a system adapter integrated circuit 204, is coupled to the motherboard 100. A first ATA disk drive 114 is coupled to the interface card 202 by the cable 110. Cable 110 is preferably an ATA standard 40 signal ribbon cable commonly used to connect ATA disk drives and other subsystems to interface cards or adapter cards. The system adapter integrated circuit 204 is coupled to the connector 132 by the bus 136. The connector 132 is coupled to the connector 134 by the cable 110. The connector 134 is also coupled to the first ATA disk drive 114. The first ATA disk drive 114 and the cable 110 are identical to the disk drive 114 and the cable 110 of FIG. 1. The second ATA disk drive 115 is coupled to the first ATA disk drive 114 by a chain of the cable 110. The cable 110 is coupled to the connector 135 which is coupled to the second disk drive 115. The first and second disk drives 114 and 115 are selected in the same manner as previously described, using the chip select signal lines CS1FX- and CS3FX-.

Figure 9A:
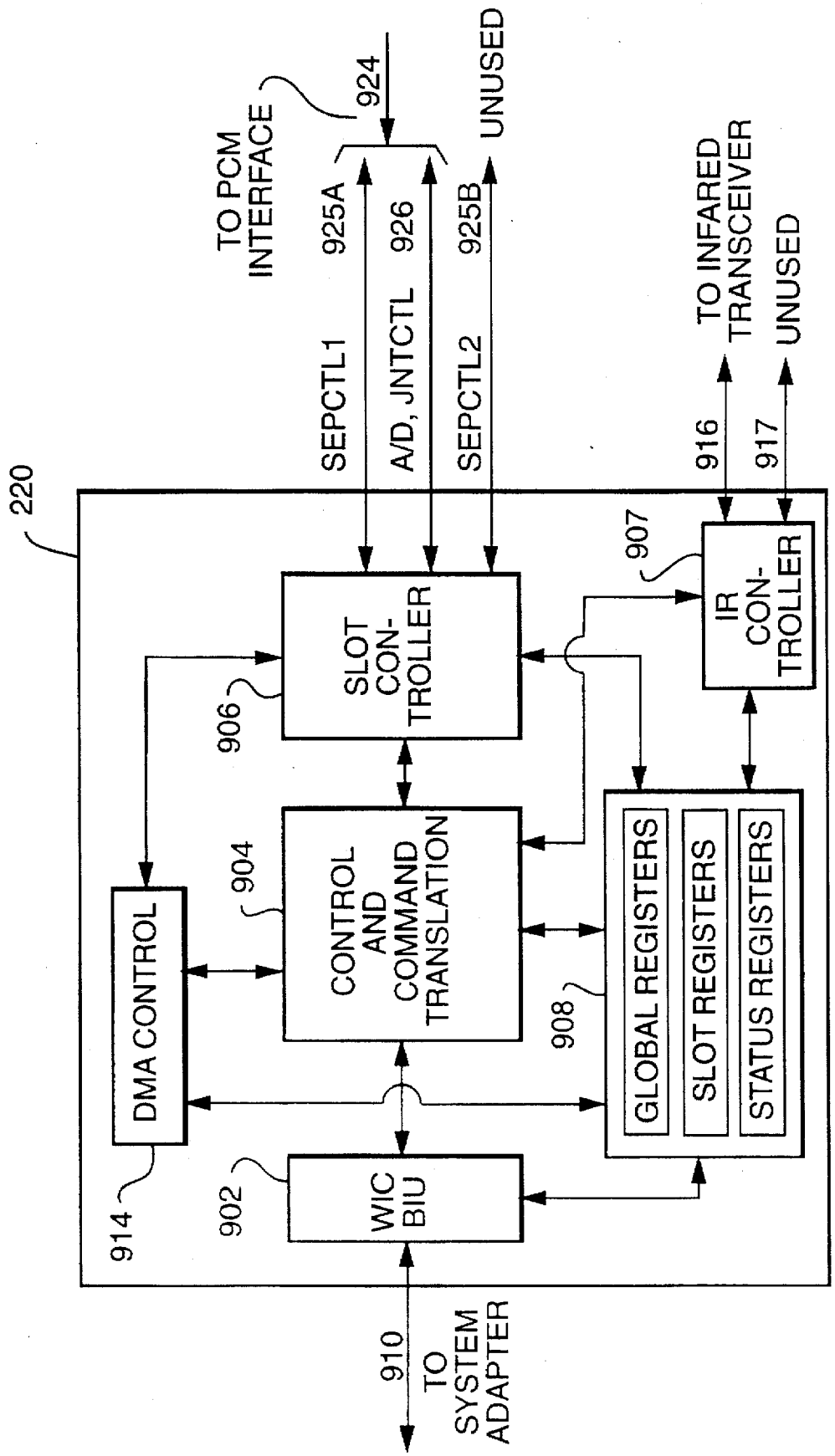
FIG. 9A illustrates a block diagram of a first socket controller of the present invention.
Figure 9B:
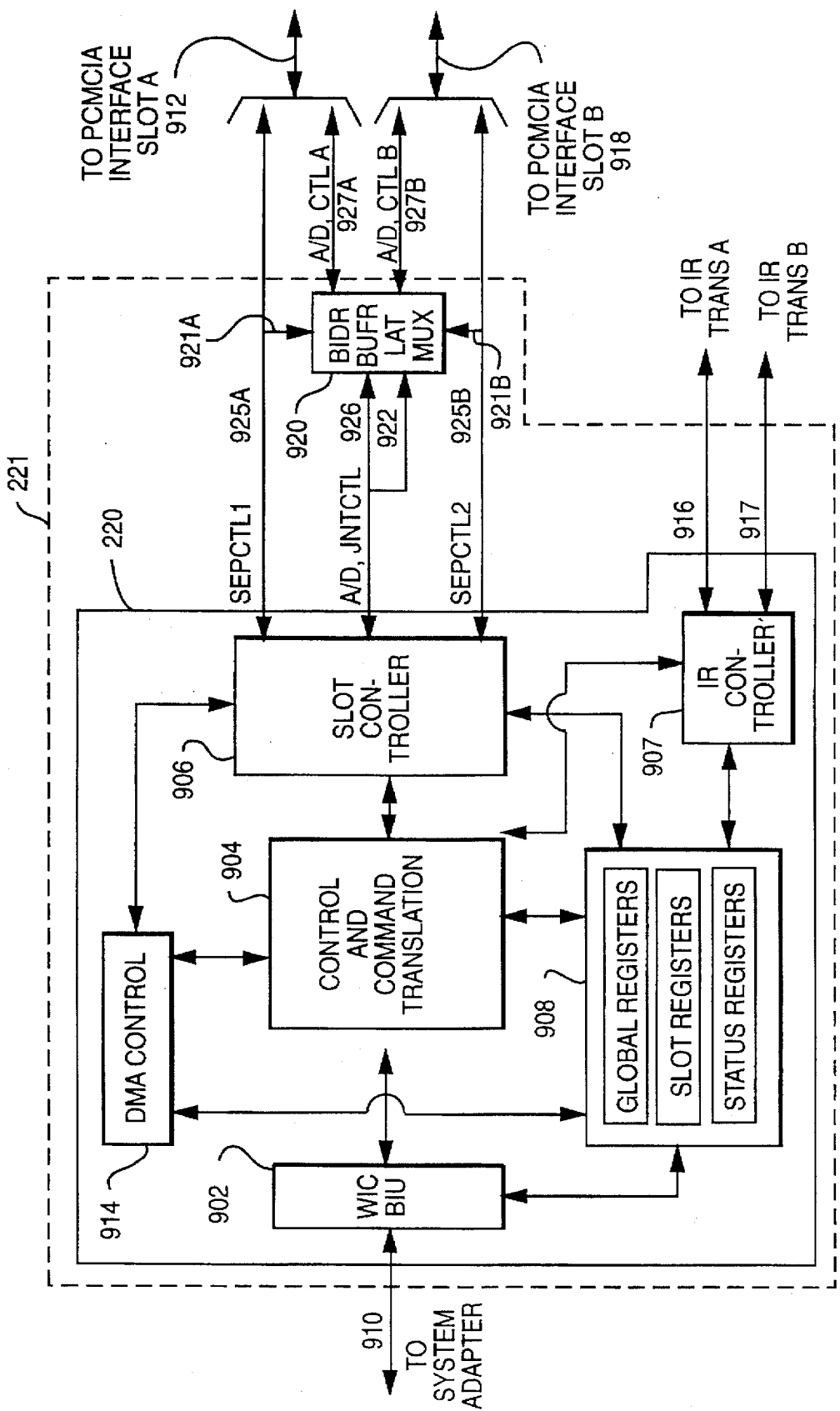
FIG. 9B illustrates a block diagram of a second socket controller of the present invention modified from the first socket controller illustrated in FIG. 9A such that second socket controller supports more than one PCMCIA expansion slot.

The PCMCIA expansion board 218 is also coupled to the second ATA disk drive 115 by a chain of the ATA standard cable 110. The connector 237 is coupled to the PCMCIA expansion board 218 and to the cable 110. In FIG. 2A the socket controllers 220A–D are coupled to the connector 237 by the bus 226, to the first PCMCIA expansion slot 116 by the bus 124, to the second PCMCIA expansion slot 117 by the bus 125, to the third PCMCIA expansion slot 216 by the bus 224, and to the fourth PCMCIA expansion slot 217 by the bus 225. In FIG. 2B the socket controllers 221A and 221B are similarly connected. Socket controllers 221A and 221B include additional circuitry from the socket controllers 220A–D in order that one socket controller 221, as illustrated in FIG. 9B, can support two PCMCIA expansion slots by multiplexing address, data, and common control signals into two slots. FIG. 9B illustrates a block diagram of the socket controller 221, representing socket controllers 221A–B, having an additional circuit 920 adapting the socket controller 220 such that two PCMCIA slot interface busses 912 and 913 may be provided for controlling two slots. FIG. 9A illustrates a block diagram of the socket controller 220, representing the socket controllers 220A–D, that provides support for one PCMCIA slot through the PCMCIA slot interface bus 924. Discussion of the socket controllers 220A–D is generally applicable to the socket controllers 221A–B. The socket controllers 220A–D monitor the signals on the cable 110 in order to determine when a peripheral coupled to the PCMCIA expansion slots 116, 117, 216, and 217 is desired to be accessed by the system adapter integrated circuit 204.

In the preferred embodiment of the present invention access to the PCMCIA expansion slots is somewhat similar as the access to ATA disk drives. Within each socket controller 220A–D there is a register referred to as the index register which all of the socket controllers must modify and monitor whenever it is written. Upon reset and power up a set of multifunction signal lines coupled to each socket controller configure a given socket controller with one or two slot IDs numbered zero through three in order to control one or two slots. For example in FIG. 2A, at reset, socket controller 220A may be initialized to control a single slot 116 having a slot ID number of zero. For example in FIG. 2B, at reset, socket controller 221A may be initialized to control two slots 116 and 117 having slot ID numbers zero and one. The slot ID along with other information is written into the index register of each socket controller to select the actual PCMCIA slot interface 116,117,216,or 217 which will be active. Each socket controller compares the slot IDs that were received upon initialization with the slot ID that was written into the index register. If there is a match then that socket controller having one or more slots will be actively communicating with the system adapter. Thereafter, the PCMCIA slot and socket controller having the matching slot ID written into the index register may respond to slot read and write cycles. Also the socket controller having a matching slot ID will thereafter respond to register read and write cycles into other registers contained with the given socket controller. Further discussion describing the read and write operation between a system adapter and a selected socket controller is described below.

DEVICE AND R/W SELECTION OVER ATA INTERFACE

Because the socket controller and the hard disk drive controller of the ATA hard disk drives are connected to the same cable, a socket controller must determine when the PCMCIA slot interfaces are being accessed as opposed to ATA drives. In the preferred embodiment of the invention the ATA signal lines designated CS1FX-, CS3FX-, DIOR-, and DIOW- which are active low signals may be used. Prior art systems having an ATA interface retransmit nearly all of the signals of the ATA interface directly to or from the host CPU system bus (ISA). In prior art systems CS1FX- and CS3FX- are generated by a Programmable Array Logic (PAL) circuit or other similar circuitry when the unique addresses for ATA interfaces are decoded. In prior art systems IOW- and IOR- signals from the ISA bus are only qualified by address enable, designated as AEN, to respectively generate DIOW- and DIOR-. This causes DIOR- and DIOW- to constantly change state for keyboard, modem, UART, PIA, or other system read and write operations that are not accessing the ATA drives. Thus ATA drives are designed to not respond to a DIOR- or DIOW- active low transition unless a CS1FX- or CS3FX- line is active. In the ATA protocol this condition or cycle, illustrated as ATA NOOP cycles 192 and 193 in FIG. 1D, falls within conditions which ATA disk drives must treat as being undefined and is to be ignored. In the present invention it is desirable to use these ATA NOOP conditions or cycles as accesses to other peripheral devices as illustrated by the SOCKET READ 412 and SOCKET WRITE 413 cycles of FIG. 4. The system adapter 204 further qualifies accesses to the ATA hard disk drives and the socket controller such that unwanted transitions in DIOR- and DIOW- such as those illustrated in cycles 192 and 193 of FIG. 1D are not present.

In the preferred embodiment of the present invention the system adapter 204 interfaces the host CPU bus to the ATA drives 114 and 115 and the socket controllers 220A-D, such that more control can be taken of the DIOR- and DIOW- lines. Therefore, the DIOR- and DIOW- lines can be used for additional device selection in conjunction with the CS1FX- and CS3FX- lines. In the present invention the generation of DIOR- and DIOW- signals by the system adapter are different from prior art systems. The generation of these signals are further qualified by addresses on the system bus such that DIOR- and DIOW- only change state when an ATA READ cycle 410, ATA WRITE cycle 411, SOCKET READ cycle 412, or SOCKET WRITE cycle 413 occurs having the appropriate address on the system bus to access either the ATA drive or other peripheral device such as a PCMCIA slot or other subsystem. If the appropriate ATA drive address or peripheral device address is not present DIOR-, DIOW-, CS1FX-, and CS3FX- signals are not generated by the socket adapter as indicated by the ATA/SOCKET NOOP cycle 414 in FIG. 4. Table 1 below indicates the active signal logic levels for cycles of operations that occur across the interface of the present invention. DIOR- and DIOW- signals indicate when a read or write operation on the cable will actually occur. For a selected ATA drive, read and write operations into command block registers or control block registers may occur as indicated by Table 1. The read and write cycles for a socket as shown in Table 1 are further discussed below with reference to FIGS. 7A-G.

TABLE 1

| CS1FX- | CS3FX- | DIOR- | DIOW- | Description |
| --- | --- | --- | --- | --- |
| 0 | 1 | 0 | 1 | Rd CMD Blk Reg. from sel. ATA drive |
| 1 | 0 | 0 | 1 | Rd CNTL Blk Reg. from sel. ATA drive |
| 0 | 1 | 1 | 0 | Wt CMD Blk Reg. from sel. ATA drive |
| 1 | 0 | 1 | 0 | Wt CNTL Blk Reg. from sel. ATA drive |
| 1 | 1 | 0 | 1 | Read from other peripheral device |

TABLE 1-continued

| CS1FX- | CS3FX- | DIOR- | DIOW- | Description |
| --- | --- | --- | --- | --- |
| 1 | 1 | 1 | 0 | Write to other peripheral device |
| 1 | 1 | 1 | 1 | no op.for ATA or other per. device |

Figure 4:
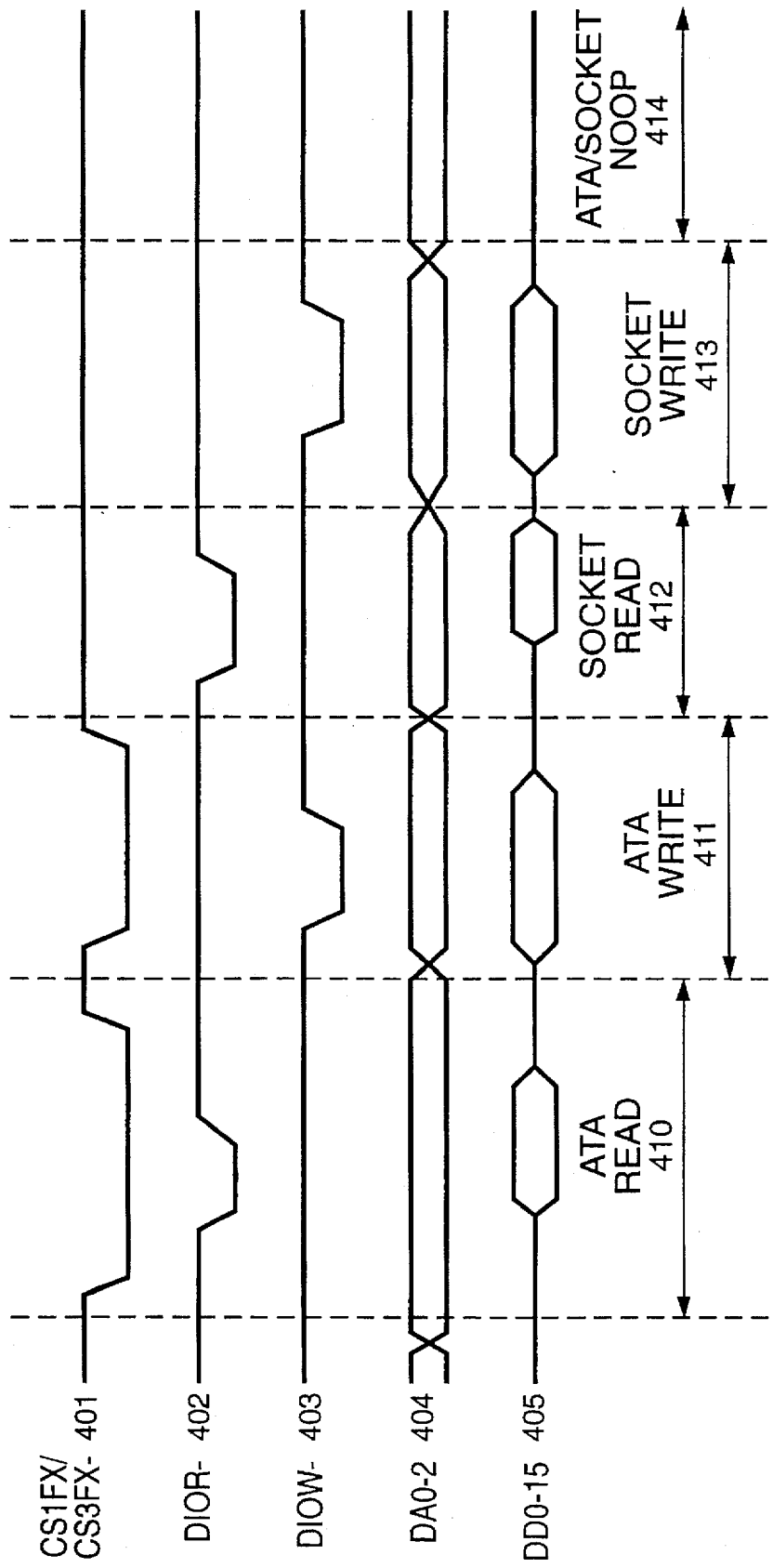
FIG. 4 illustrates a waveform diagram showing how additional communication over an ATA bus or cable may be provided by the present invention.

Referring to FIG. 4, four types of command cycles are shown whereby the system adapter may communicate with either of two selected ATA drives or any one of a plurality of socket controllers on cable 110. In the first cycle 410 a read operation is performed to the ATA drive. The active ATA drive 114 or 115 would have been determined by a prior write to the device ID register as previously explained. Note that one but not both CS1FX- or CS3FX- signals represented by the CS1FX-/CS3FX- waveform 401 is active low during this cycle and DIOR- 402 goes active low. ATA WRITE cycle 411 shows a write operation being performed to one of the ATA drives where either CS1FX- or CS3FX- but not both are active and DIOW- 403 is active low.

The next cycle is a SOCKET READ cycle 412 where both CS1FX- and CS3FX- represented by the waveform CS1FX-/CS3FX- 401 are inactive. The inactivity in signals CS1FX- and CS3FX- and an active transition in the signal DIOR- can be decoded by the socket controller 220 as a read operation for the socket controller and other peripheral devices connected to the socket controller. Since DIOR- 402 and DIOW- 403 are controlled by the system adapter so as to go active only during actual cycles to either hard disk drives or the socket controller and its associated peripherals, the socket controller 220 can observe the CS1FX- and CS3FX- 401 lines along with the DIOR- 402 and DIOW- 403 lines to unambiguously recognize whether cycles are intended for it or not.

The SOCKET WRITE cycle 413 indicates a write command cycle for a peripheral device such as a PCMCIA slot interface where both signals CS1FX- and CS3FX- are inactive in a high state represented by the waveform CS1FX-/CS3FX- 401.

Registers within the system adapter may be programmed to translate specific system read and write operations into corresponding patterns of SOCKET READ 412 and SOCKET WRITE 413 cycles to the intended socket controller. Each socket controller is configured with a separate device ID or socket IDs by hardware configuration pins or other known methods to facilitate its unique addressing by the system adapter.

INTERRUPTS AND SERVICE REQUESTS ACROSS THE ATA INTERFACE

Since there is only one interrupt signal line INTRQ available on an ATA cable such as cable 110 and hard disk drives within the prior art use this line at unpredictable times, INTRQ is preferably not used in the present invention for other peripheral interrupt signalling. It is preferred that a different signal within the ATA cable, unused during periods when the chip select signals CS1FX-/CS3FX- are inactive, be selected as an interrupt signal line for the present invention. The preferred signal to indicate a service request for the present invention is the host 16 bit I/O signal IOCS16-. ATA hard disk drives in the prior art use the signal IOCS16- to indicate to the system that the current transfer is to be completed using a word having a 16 bit data width. ATA hard disk drives only assert IOCS16- during system transfers of data when either CS1FX- and CS3FX- are active. IOCS16- is not asserted by ATA hard disk drives when CS1FX- and CS3FX- are inactive. Thus IOCS16- can be used by the socket controller 220 to communicate a service request to the system adapter 204 during periods when CS1FX- and CS3FX- are inactive. The system adapter 204 recognizes interrupts or service requests and once such a signal has been received the system adapter will query the other peripherals on cable 110 by performing a broadcast read of all other peripherals. Each of these peripherals will be assigned a bit based on their uniquely configured device ID to return if they are in fact generating the interrupt, service request, or DMA request. Once the type of service and what socket controller or associated peripheral has requested service is determined, the system adapter 204 can then return the appropriate information to the system bus 146 such that the host CPU can process and respond to the service request.

WINDOWED-INTERCHIP-COMMUNICATION PROTOCOL

The system adapter 204 is also coupled to the system bus 146 in order to monitor and control any communication which the CPU 140 is required to have with any of the peripherals or subsystems which are coupled to the interface card 202. When an address appears on the system bus 146 which is in the range of addresses used to access any of the peripherals or subsystems coupled to the interface card 202, the system adapter 204 determines whether it is an ATA drive 114,115, PCMCIA Card 122,123,222,223, IR (infrared) peripheral 246,247,256,257, or other peripheral or subsystem that the host CPU desires to communicate with. The system adapter 204 then activates the appropriate ATA drive 0 or 1, socket controller 220 or other peripheral or subsystem. Because the socket controller 220 controls a plurality of PCMCIA Card peripherals 122,123,222,223 and IR peripherals 246,247,256,257 over the limited signal lines specified by the ATA specification and contained within the standard ATA cable, a new protocol is required for the system adapter 204 and the socket controllers 220A-D to communicate to one another. Amongst other things, the system adapter 204 bidirectionally translates the signals from the system bus 146 into ATA command signals designated by the ATA specification for the ATA disk drives 114,115 or the system adapter 204 bidirectionally translates the signals from the system bus 146 into a windowed-interchip-communication (WIC) protocol for communication to the socket controllers 220A-D. Amongst other things, the socket controllers 220A-D bidirectionally perform translation of WIC protocol signals into PCMCIA protocol signals of the PCMCIA standard for the PCMCIA peripherals coupled through the PCMCIA expansion slots 116, 117, 216, and 217. Additionally the socket controllers 220A-D bidirectionally translate the WIC protocol signals into a plurality of serial inputs and serial outputs in order to communicate to IR peripherals 246,247,256,257. The WIC protocol is used by the system adapter 204 and socket controllers 220A-D as well as socket controllers 221A-B. Other peripherals or subsystems may use the WIC protocol with slight modification which should be obvious to one of ordinary skill in the art. The WIC protocol uses the inactivity of CS1FX- and CS3FX- signals to perform a series of SOCKET READ 412 or SOCKET WRITE 413 cycles using DIOR- 402 and DIOW- 403 without causing an access of an ATA disk drive as discussed above with reference to FIG. 4.

As previously mentioned the WIC protocol is used because of the limited signal count within an ATA standard cable, the plurality of PCMCIA or IR peripherals, and the differing control and address requirements between the PCMCIA standard [26 Address bits (A0–25); 16 Data bits (D0–15)] and the ATA standard [3 Address bits (DA0–2); 16 Data bits (DD0–15)]. To accommodate these differences a combination of more than one SOCKET READ or SOCKET WRITE cycle as illustrated in FIG. 4 may be used to implement an operation using the WIC protocol. FIGS. 7A–7G illustrate waveform timing diagrams for the communication operations that are performed using the WIC protocol. The WIC protocol utilizes a minimum number of signals from those available within an ATA standard cable in order to minimize the use of pins and achieve a low cost socket controller and system adapter. Operations performed using the WIC protocol include long or short slot read or write, register read or write, DMA read or write, and service request. In each of FIGS. 7A–7G the signals CS1FX- and CS3FX- are held high as illustrated by waveform 401 in FIG. 4 during the SOCKET READ 412 or SOCKET WRITE 413 cycles and is assumed to be the case in the discussion of these figures below.

FIG. 7A illustrates a timing diagram for a long slot write operation. Table 2 below provides the operational cycle for a long slot write or read operation.

TABLE 2

| DD bit# | 15 14 13 | 12 11 | 10 | 9 8 | 7 6 5 4 3 2 1 0 |
|---------|----------|--------|-------|-----|-----------------|
| Cycle 1 | window#  | socket# | Short | ------address9-0------ | |
| Cycle 2 | ----------------address25-10---------------------- | | | | |
| Cycle 3 | ----16 bit word or single byte of slot data-------- | | | | |

In the first cycle 711 for the long slot write operation the PCMCIA window number is provided on data lines (DD13–15), the PCMCIA socket number, also referred to as slot number, indicating which slot or socket is to be communicated with is provided on data lines (DD11–12), the short bit value (set to zero) indicating a short slot operation if a logical one and a long slot operation if a logical zero is provided on data line (DD10), and the 10 least significant address bits (A0–9) of the PCMCIA window address are provided on data lines (DD0–9). In the case that a transfer that is directed to a register or other operation within a socket controller and not a register, memory, or other operation within a PCMCIA peripheral card, the PCMCIA window number is set to 7 hexadecimal (111 binary) which is a special window number having a value greater than the highest window number that is presently available in the system adapter for interface with a PCMCIA peripheral card. The window number 7 hexadecimal can also indicate that a non-card-memory type or I/O access type of WIC operation is to be performed such as a register access, card DMA read or write or service request operation. The system adapter provides these values onto the 16 data lines (DD0–15) of the ATA adapter during the first cycle 711 and strobes the DIOW- 703 keeping CS1FX- and CS3FX- signals inactive high such that the socket controller captures this information off the cable starting on the negative edge of the DIOW- strobe. The PCMCIA window number (DD13–15) indicates the number corresponding to windowed areas of address space that the host CPU attempts to access a PCMCIA card. The PCMCIA socket number (DD11–12) indicates which slot 116, 117, 216, or 217 that the host CPU is to communicate with. The use of the window number and socket number within the WIC protocol are designed to limit the amount of information that is to be transferred between the system adapter and socket controller to access a PCMCIA peripheral. The short bit value (DD10) indicates whether or not the slot read or slot write operation is a long or short slot read or write. If the operation is a short slot read or write then the upper address bits remain the same as that which were previously used and only the lower order address bits need be provided. In most transfers of data, rarely do the most significant bits of address change. The 10 least significant address bits (A0–9) on the data lines (DD0–9) indicate the lower order address pointing to the desired PCMCIA window address space for the PCMCIA peripheral. The strobe of DIOW- 703 within a first cycle of the WIC protocol further indicates that a write operation is being performed to the socket controller, PCMCIA peripheral, or IR peripheral. If DIOR- were strobed within a first cycle of the WIC protocol then this would indicate that a read operation is being performed from the socket controller, PCMCIA peripheral, or IR peripheral. If DIOR- were strobed within a first cycle of the WIC protocol then the negative edge of the DIOR- strobe allows the socket controller to capture the address information placed on the data lines (DD0–15) of the ATA interface. Note that even though DIOR- is activated data may still flow from the system adapter to the socket controller.

In the second cycle 712 of the long slot write operation, the 16 most significant bits (A10–25) of the PCMCIA window address are provided onto the data lines (DD0–15) of the ATA interface. In a short slot write or short slot read operation the second cycle of the long slot write operation providing the MSBs for the PCMCIA window address are not needed and thus the data transfer operation for a short slot write or read operation would occur during the second cycle. In the third cycle of the long slot write operation a two byte word of 16 bits or a single byte of 8 bits of data are provided onto the 16 data lines (DD0–15) of the ATA cable. The two byte word transfer consisting of 16 bits of data is indicated by the IORDY signal during the first cycle of the long or short slot read or write operation or a DMA read or write operation. In the case of these operations of the WIC protocol if IORDY is inactive low at the negative edge of either the DIOW- or DIOR- strobe then the data transfer is a two byte word of 16 bits. If IORDY remains in the active high state by being pulled up by a passive resistor pullup, then upon the negative edge of DIOW- or DIOR- the data transfer is a single byte of 8 bits. In either case whether 16 or 8 bits of data transfer is indicated, the system adapter ceases to drive the IORDY signal which may then be asserted by the socket controller after a small delay. After this data width transfer indication, the IORDY signal may be asserted by a socket controller to indicate control of the bus. The socket controller can continue to drive IORDY low and extend the duty cycle beyond the minimum in order to complete an operation using more time. The first cycle in each operation has a fixed minimum pulse width and duty cycle but can be extended by IORDY if necessary. After the socket controller has completed the operation and communication desired by the system adapter within the given cycle, the socket controller stops driving IORDY low and allows it to be pulled into its high state by a pullup resistor. Once the system adapter detects that IORDY has reached its high state, it drives DIOW- or DIOR-, whichever was asserted active low, into its inactive high state and prepares for a next cycle. In this manner the socket controller can keep IORDY at a low voltage level which extends the duty cycle until it has completed the operation and any associated communication.

FIG. 7B illustrates a timing diagram for the short slot write operation. Table 3 below illustrates the operational cycles for a short slot write or read operation.

TABLE 3

| DD bit# | 15 14 13 | 12 11 | 10 | 9 8 | 7 6 5 4 3 2 1 0 |
|---|---|---|---|---|---|
| Cycle 1 | window# | socket# | Short | ------address9-0------ | |
| Cycle 2 | ------16 bit word or single byte of slot data-------- | | | | |

Similar to the long slot write operation, the system adapter provides within the first cycle the PCMCIA window number, PCMCIA socket number, short bit value (set to one), and the 10 least significant address bits (A0–9) of the PCMCIA window address onto the 16 data lines (DD0–15) of the ATA interface and cable. In the second cycle a 16 bit word or single 8 bit byte of data is provided onto the data lines (DD0–15) of the ATA interface by the system adapter as was previously discussed in the explanation of the third cycle of the long slot write operation.

FIG. 7C illustrates a timing diagram for a long slot read operation. Table 2 above illustrates the operational cycles for a long slot read operation. As discussed above during the first cycle of the long slot write operation, the system adapter provides the PCMCIA window number, PCMCIA socket number, short bit value (set to zero), and the 10 least significant address bits (A0–9) of the PCMCIA window address onto the data lines (DD0–15) of the ATA interface. DIOR- is strobed active low indicating that a read operation is to be performed from the PCMCIA to the host CPU. Note that even though DIOR- is asserted, data may flow from the system adapter to the socket controller. The negative edge of the DIOR- strobe allows the socket controller to capture the address information placed on the data lines (DD0–15) of the ATA interface. In the second cycle for a long slot read operation the 16 most significant bits (A10–25) of the PCMCIA window address are provided onto the data lines (DD0–15) of the ATA interface by the system adapter. DIOW- is used during the second cycle to strobe the 16 MSBs of address information into the socket controller. Once this address is received by the socket controller it can start accessing data from the PCMCIA slot/card in preparation for the next cycle. In the third cycle the system adapter provides an additional DIOR- strobe so that the socket adapter can drive the data lines (DD0–15) with the data associated with the desired PCMCIA window address.

FIG. 7D illustrates a timing diagram for a short slot read operation. Table 3 above illustrates the operational cycles for a short slot read operation. Similar to the first cycle 731 of the long slot read operation, the system adapter 204 provides within the first cycle 741 the PCMCIA window number, PCMCIA socket number, short bit value (set to one), and the 10 least significant address bits (A0–9) of the PCMCIA window address onto the 16 data lines (DD0–15) 705 of the ATA interface and cable. The short bit value being set to one indicates a short slot read operation where the 16 most significant address bits (A10–A25) of the PCMCIA window address is the same as the 16 most significant address bits of the previous access. Thus the second cycle 732 associated with the long slot read operation of FIG. 7C is not needed. In the second cycle 742 a 16 bit word or single 8 bit byte of data is provided onto the data lines (DD0–15) 705 of the ATA interface by the system adapter as was discussed above in the third cycle 733 of the long slot read operation.

DMA read and write operations for I/O type peripherals where there is no associated PCMCIA window memory address, slightly modify the short slot read and write operations of the WIC protocol that are illustrated by FIGS. 7B and 7D. Table 4 below illustrates the cycles that are performed for a DMA read and write operation.

TABLE 4

| DD bit# | 15 14 13 | 12 11   | 10 | 9 8 7 6 5 4 3 2 1 0 |
|---------|----------|---------|----|----------------------|
| Cycle 1 | 1 1 1    | socket# | TC | 1 0 0 0 0 0 0 0 0 0  |
| Cycle 2 | ----16 bit word or single byte of slot data---------- | | | |

Examples of I/O type peripherals that may use the DMA operations are hard disk drives, silicon disk drives, floppy disk drives, sound cards, and fax/data modems. Examples of memory type peripherals which may not support DMA operations and require standard methods of addressing are flash memory PCMCIA cards, static RAM PCMCIA cards, and DRAM PCMCIA cards. During the first cycle a DMA op code where Bits 8 and 9 (DD8–9) are set to zero and one respectively are provided which designate the cycle as a DMA access while bits 13–15 are all set to logical ones or 7 hexadecimal representing the special window number. During the first cycle for a DMA read or write operation the lower order address bits (A0–9) are unused and thus bits 0–7 (DD0–7) are set to zero. Bit 10 (DD10) that represents the terminal count bit is set to a logical one value when the system adapter wishes to pass a DMA terminal count condition to the PCMCIA peripheral. The socket or slot number being accessed is represented by bits 11 and 12 (DD11–12). If during the first cycle of the DMA operation the signal IORDY is asserted to a logical low then the DMA transfer is a 16 bit word DMA access. During the second cycle for a DMA read or write operation the data is actually transferred by respectively using a DIOR- or DIOW- strobe.

FIGS. 7E and 7F illustrate waveform timing diagrams for register read and write operations for registers contained within the PCMCIA peripheral, IR peripheral, or the registers 908 within a socket controller 220 or 221 as illustrated in FIGS. 9A and 9B. Table 5A below represents the operational cycle performed for a register read or write operation. Prior to a standard register read or write operation within a given socket controller, an index register write operation may occur to properly address a desired register. In this case the cycle of operations as illustrated in Table 5B is applicable. When the index register bit is set to a logical one value the register write operation is a global operation to all index registers within each socket controller. The socket number zero through three is indicated by bits 7 and 6 while the pointer or register address for a given register or register set is indicated by bits 0–5 during the index register write operation. In the second cycle as indicated by Table 5B or in an independent cycle as indicated by Table 5A wherein the index register bit is set to logical zero, a register read or write operation may occur to a register pointed to by the value that is presently stored within the index register. For the register read operation information simultaneously flows from system adapter to the socket controller and from the socket controller to the system adapter during the same cycle and using the same bus of data signal lines. The system adapter drives the socket number and other information on data signal lines (DD8–15) while the socket controller drives data onto data signal lines DD0–7 in response.

TABLE 5A

| DD bit# | 15 14 13 | 12 11   | 10    | 9 8 7 6 5 4 3 2 1 0    |
|---------|----------|---------|-------|-------------------------|
| Cycle 1 | 1 1 1    | socket# | index | 0 0 -register data7-0-  |

TABLE 5B

| DD bit# | 15 14 13 | 12 11   | 10      | 9 8 7 6 5 4 3 2 1 0   |
|---------|----------|---------|---------|------------------------|
| Cycle 1 | 1 1 1    | socket# | index=1 | 0 0 sckt -reg address- |
| Cycle 2 | 1 1 1    | socket# | index=0 | 0 0 -register data7-0- |

Referring to Table 5A, in the first cycle 751 of a register write operation, the system adapter 204 provides within the first cycle 741 the special window number 7 hexadecimal on data lines (DD13–15) indicating that it is not a memory or I/O operation to the PCMCIA peripheral, an op code 00 onto the data lines (DD8–9) which indicates a register operation, PCMCIA socket number on data lines (DD11–12), and index register bit on data line (DD10). Actual data to be stored into the register is provided by the system adapter on data lines (DD0–7) and DIOW- is strobed to signal the socket controller to capture this data into the selected register or registers. If the index register bit is set to a logical one value a global write operation can occur wherein the data on data lines (DD0–7) is written into each index register of each socket controller. For each socket controller the index register is globally written and individually read by the system adapter. The value stored in the index register represents a pointer into what register set and what slot or socket number is to be accessed. If the value of bits 7 and 6 written to a given index register within a socket controller match the one or two unique device ID or slot numbers that may have been given upon the reset configuration of a socket controller as previously discussed, then the given socket controller having a matching slot number will be accessed. Otherwise if the value of bits 7 and 6 do not match the initial one or two slot numbers provided upon initialization to the given socket controller, then the socket controller does not respond. The value of bits 7 and 6 of the index register represent which register set related to the corresponding socket number are to be accessed.

FIG. 7F illustrates a timing diagram for a register read operation. During the first cycle 761 of a register read operation, the system adapter 204 provides the special window number 7 hexadecimal on data lines (DD13–15) indicating that it is not a memory or I/O operation to the PCMCIA peripheral, an op code 00 onto the data lines (DD8–9) which indicates a register operation, if applicable the PCMCIA socket number on data lines (DD11–12) indicating access to a register set corresponding to the socket number, and the register index bit on data line (DD10) representing whether the index register within the socket controller is to be read. DIOR- is strobed by the system adapter to signal the socket controller to drive data lines (DD0–7) with the contents of the selected register. During the register read operation information simultaneously flows from system adapter to the socket controller and from the socket controller to the system adapter during the same cycle and using the same bus of data signal lines.

FIG. 7G illustrates a timing diagram for a service request operation. A computer system may have a plurality of socket controllers on a given cable. The ATA hard drives do not assert IOCS16- unless either CS1FX- or CS3FX- are active low. When both CS1FX- and CS3FX- are inactive high the socket controller can request a service request by driving IOCS16- 706 active low to a logical zero. IOCS16- is released by the socket controller after the socket requesting service has been polled and there are no other sockets requesting service. In FIG. 7G IOCS16- is released by the socket controller after the fourth socket has been polled and it was determined that this was the last socket requesting service. The system adapter 204 polls each peripheral within each socket to determine what peripherals may have requested service. The number of cycles required by the polling process for the service request may vary from one to four cycles 771–774 for a given system adapter and socket controllers 220A–D or 221A–B because each PCMCIA peripheral within a socket or socket interface needs to be polled to determine whether it has requested service. Table 6 below illustrates the operational cycle that may be repeated until all service requests are acknowledged.

TABLE 6

| DD bit# | 15 14 13 | 12 11 | 10 | 9 8 7 6 5 4 3 | 2 | 1 | 0 |
|---|---|---|---|---|---|---|---|
| cycle 1 | 1 1 1 | socket# | index | 01 000 ir spkr | card | mgt | dma |

During each cycle 771–774 of a service request operation, the system adapter 204 provides a service request op code 10 respectfully onto the data lines (DD8–9), the PCMCIA socket number on data lines (DD11–12), and the special window number 7 hexadecimal (111 binary) on data lines (DD13–15) of the ATA interface and cable. After the system adapter 204 drives this information on the data lines (DD8–15) it drives DIOR- 702 active low to have one of the socket controllers 220A–D drive out on data lines (DD0–7) what type of service request may be requested by one of the peripherals. Data line (DD0) indicates if a peripheral within a given socket is requesting direct memory access (DMA) in order to write or read data directly from the array of system memory. Data line (DD1) indicates if a peripheral is requesting a management service request resulting from a change of socket status such as card removal or insertion. Data line (DD2) indicates whether a card service request is pending. Data line (DD3) indicates if a speaker level service request for the PCMCIA peripheral is pending. Data line (DD4) indicates if an infrared peripheral service request is pending. Data lines (DD5–7) are reserved bits and all are presently driven to a logical zero state. If any of these types of service requests are needed by the peripheral within the given slot the data lines (DD0–4) are driven to a logical one state within the cycle. The system adapter upon receiving the type of service requests passes the service request type to the host CPU or DMA controller in the case of a DMA request. The host CPU interrupts itself at an appropriate moment and goes out to perform the operations necessary to satisfy the type of service requested. The service request operation is similar to the register read operation in that information simultaneously flows from system adapter to the socket controller and from the socket controller to the system adapter during the same cycle and using the same bus of data signal lines. The system adapter drives the socket number and other information on data signal lines (DD8–15) while the socket controller drives data onto data signal lines DD0–7 in response.

Future enhancements and expansion of the WIC protocol are available through use of the reserved bits. One such enhancement is the capability to burst data across the ATA cable between the system adapter 204 and a socket controller 220A–D. In this case the first cycle would set an initial starting address and thereafter a continuous set of cycles would directly burst a number of bytes of data across the ATA cable until an indication that the transfer was complete. Other enhancements would provide support for other types of peripheral devices such as a wireless transceiver.

Figure 3A:
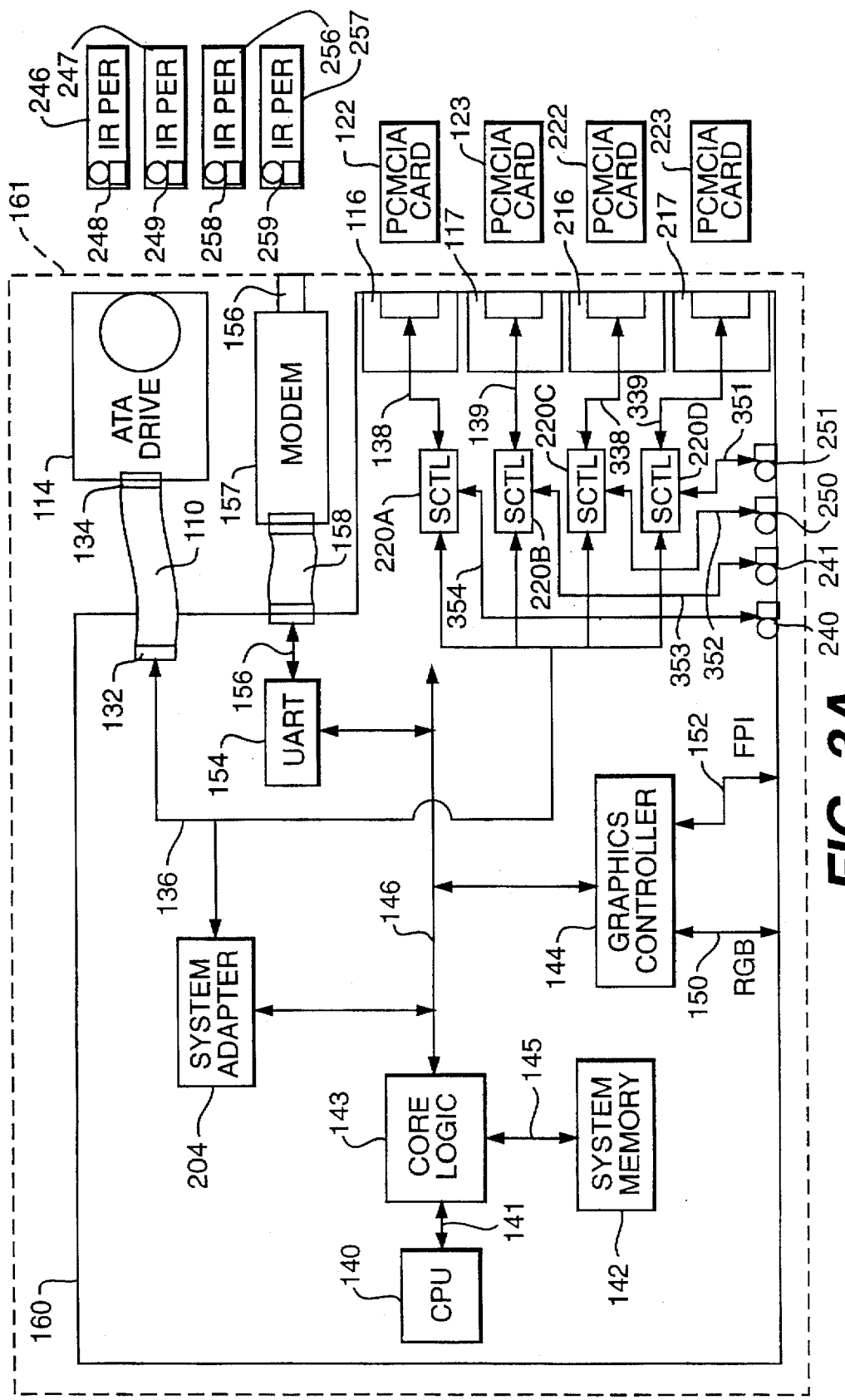
FIGS. 3A and 3B illustrate block diagram schematics for portable computer systems according to the present invention which include a system adapter integrated circuit and a socket controller integrated circuit.
Figure 3B:
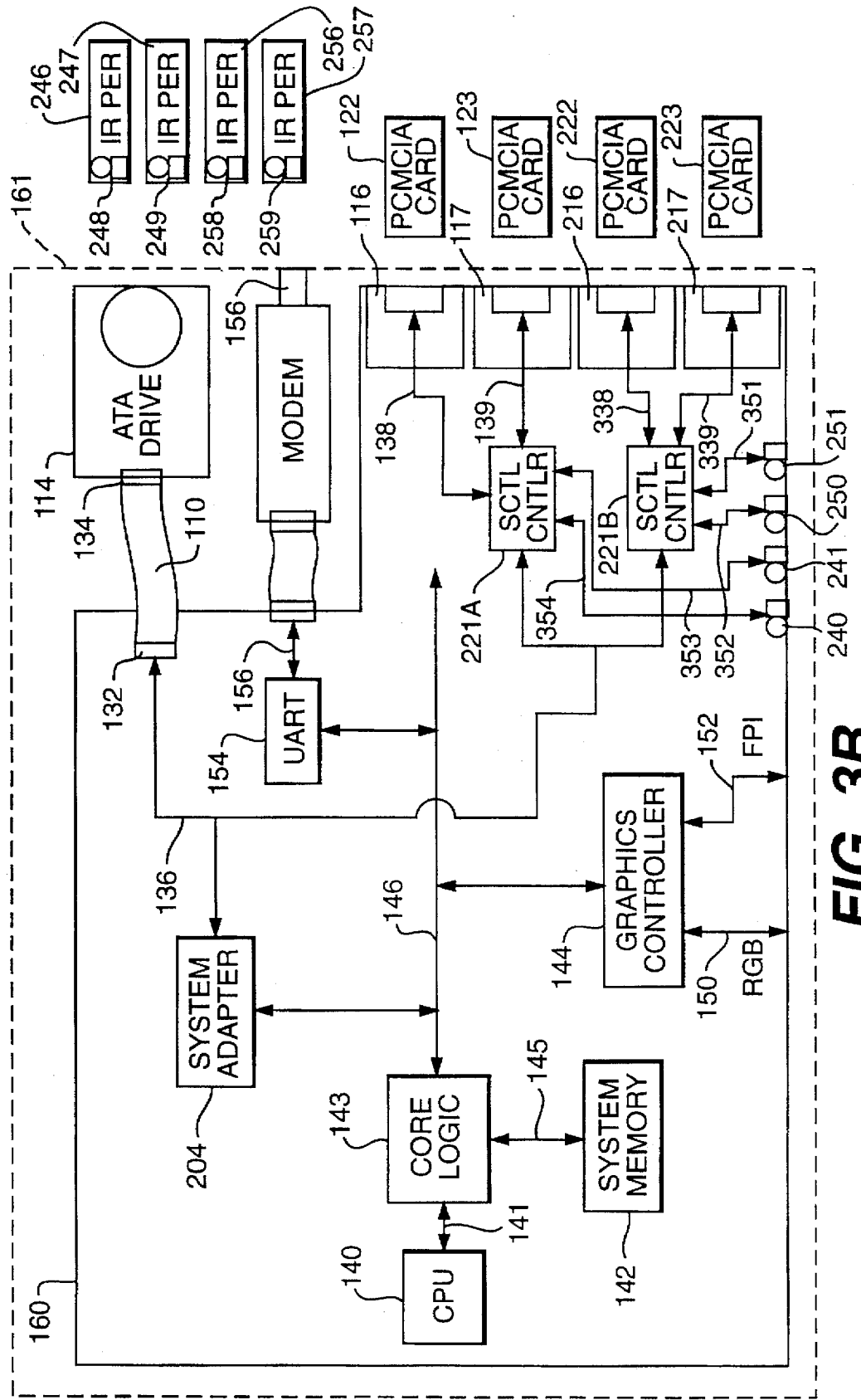

A block diagram schematic for a portable computer system according to the present invention is illustrated in FIGS. 3A–B, which include a system adapter 204 and socket controllers 220A–D or 221A–B, all of which may be integrally coupled to the motherboard 160. Alternatively the socket controllers may be coupled to a daughter board and coupled to the motherboard through either a socket connector, a cable, or a flexible printed circuit board. The system adapter may also be alternatively coupled to the motherboard. The system adapter 204 is coupled to the ATA disk drive 114 and to socket controllers 220A–D or 221A–B by the bus of signal traces 136. Socket controller 220A is coupled to the first PCMCIA expansion slot 116 by the bus of signal traces 138, socket controller 220B is coupled to the second PCMCIA expansion slot 117 by the bus of signal traces 139, socket controller 220C is coupled to the third PCMCIA expansion slot 216 by the group of signal traces 338, and socket controller 220D is coupled to the fourth PCMCIA expansion slot 217 by the bus of signal traces 339. FIG. 3B illustrates a block diagram schematic similar to FIG. 3A but utilizing socket controllers 221A and 221B that are capable of supporting more than one slot. Socket controller 221A is coupled to the first PCMCIA expansion slot 116 and the second PCMCIA expansion slot 117. Socket controller 221B is coupled to the third PCMCIA expansion slot 216 and the fourth PCMCIA expansion slot 217. The following discussion with respect to socket controllers 220A–D of FIG. 3A is generally applicable to the socket controllers 221A–B of FIG. 3B. With respect to the functions and operations of the system adapter 204, the ATA disk drive 114 and socket controller 220A–D, the operation of the portable computer system illustrated in FIGS. 3A and 3B is nearly identical to the operation of the desktop computer system illustrated in FIGS. 2A and 2B that was described above. Block diagrams of the system adapter 204, socket controllers 220A–D, and socket controllers 221A–B are respectively illustrated in FIG. 8A, FIG. 9A, and FIG. 9B.

Figure 8A:
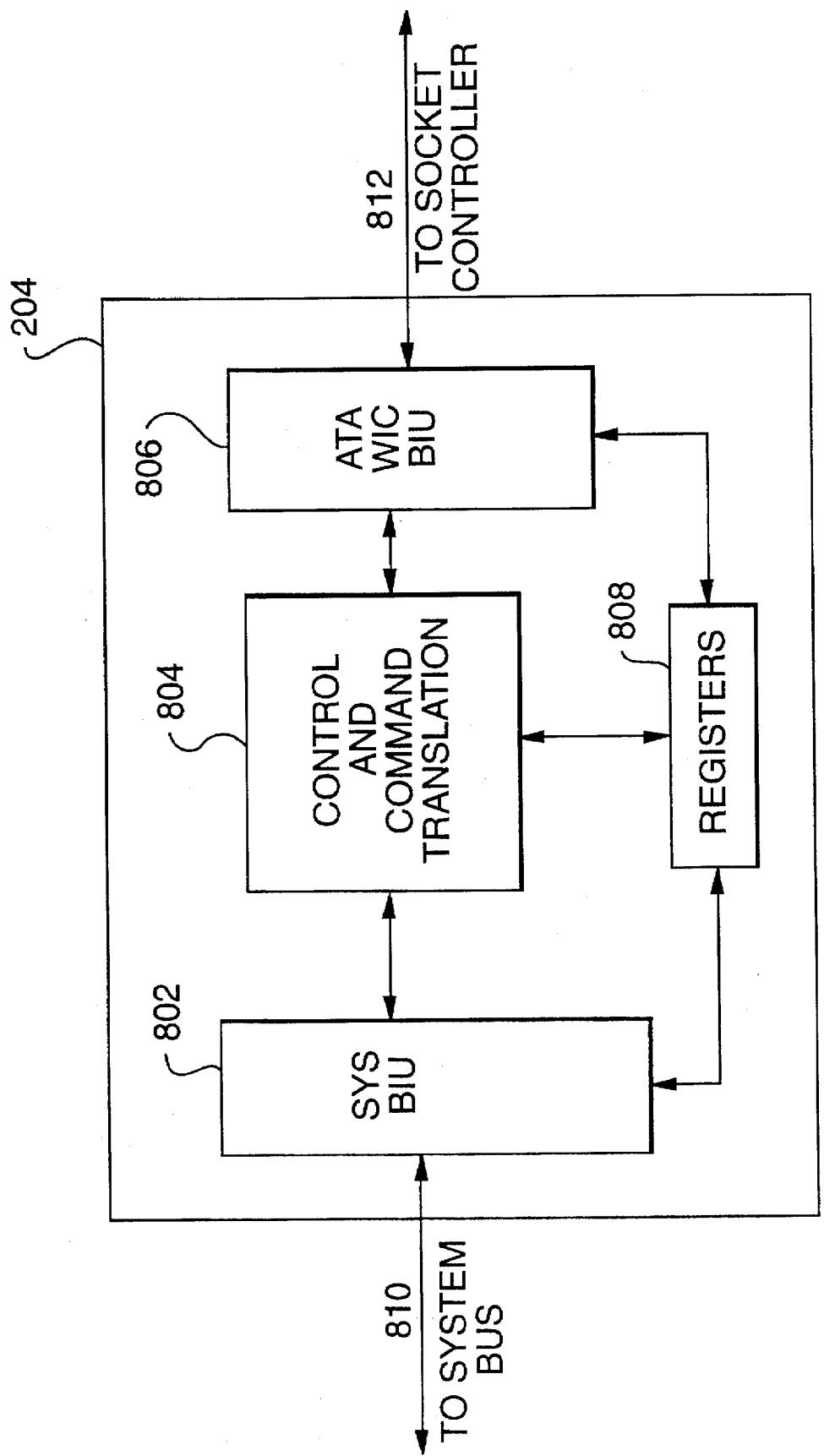
FIG. 8A illustrates a block diagram of a system adapter of the present invention for communication to a CPU as well as for communication to a hard disk drive and a socket controller using a multipurpose bus.
Figure 8B:
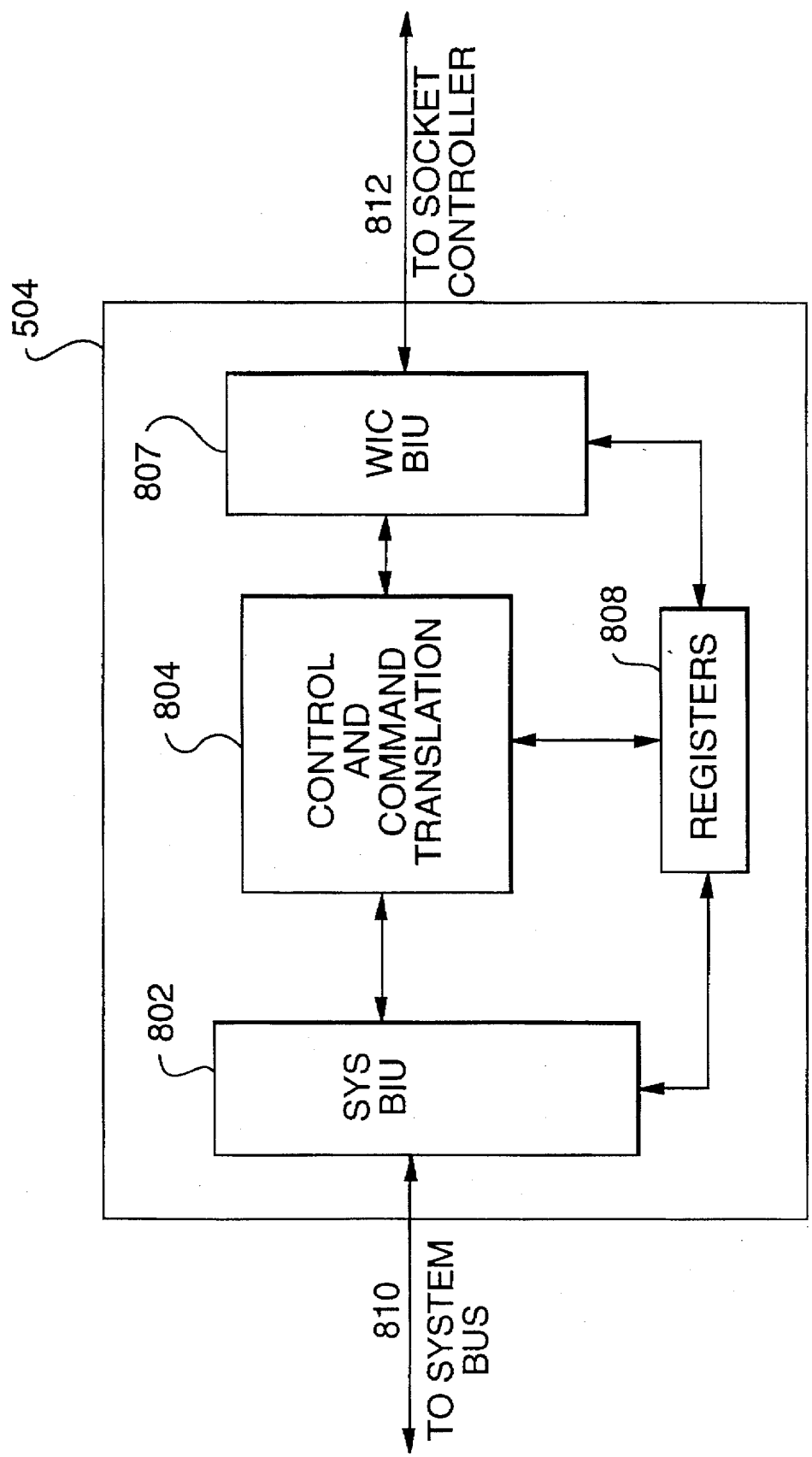
FIG. 8B illustrates a block diagram of a system adapter of the present invention for communication to a CPU and a socket controller.

Referring to FIG. 8A, a block diagram of the system adapter 204 of the present invention is illustrated having a system bus interface unit (SYSTEM BIU) 802, control and command translation circuit 804, ATA/WIC bus interface unit (ATA/WIC BIU) 806, and registers 808. FIG. 8B illustrates a block diagram of the system adapter 504 of the present invention which may be used in FIGS. 5 and 6. The ATA/WIC BIU 806 of FIG. 8A is modified to be a WIC bus interface unit (WIC BIU) 807 in FIG. 8B. Otherwise the following discussion regarding the system adapter 204 of FIG. 8A is generally applicable to the system adapter 504 as illustrated in FIG. 8B. The SYSTEM BIU 802 couples to a system bus that may be of various types such as ISA, LOCAL, or a PCI bus through bus 810. The SYSTEM BIU 802 is further coupled to the control and command translation circuit 804 and registers 808 within the system adapter 204. The command and control translation circuit 804 is coupled to the ATA/WIC BIU 806 or WIC BIU 807 as the case may be, registers 808, and the SYSTEM BIU 802. The ATA/WIC BIU 806 is coupled to an ATA cable, ATA signal lines, or an ATA equivalent bus through bus 812. The WIC BIU 807 is coupled to an ATA equivalent cable or bus via bus 812. The ATA/WIC BIU 806 implements both the ATA communications protocol as specified in the ATA specification and the WIC communications protocol previously described while the WIC BIU 807 only implements the WIC communications protocol. Registers 808 within the system adapter 204 assist in control of the data transfer, provide temporary storage for data that is being communicated if either bus 810 or 812 is busy, and provide status information to the host CPU for conditions that are monitored by the system adapter. Registers 808 consist of individually addressable registers for control and status and a FIFO for buffering the flow of data.

Data communicated between the host CPU and an ATA hard disk drive is accomplished by communication between the system adapter 204 and a hard disk drive 114 or 115 but this communication is not performed by the system adapter 504. Within the system adapter 204, data is transmitted and received to or from the host CPU 140 by the SYSTEM BIU 802 using the relevant bus communication standard. The SYSTEM BIU 802 bidirectionally transfers data to the control and command translation circuit 804 which then bidirectionally transfers data to the ATA/WIC BIU 806. The ATA/WIC BIU 806 transmits and receives data from the appropriate hard drive using ATA communication standards.

Data communicated between the host CPU and a PCMCIA or IR peripheral is accomplished by communication between the system adapter 204 or 504 and a socket controller. Within the system adapter 204, data is transmitted and received to or from the host CPU 140 by the SYSTEM BIU 802 using the relevant bus communication standard. The SYSTEM BIU 802 bidirectionally transfers data to the control and command translation circuit 804 which then bidirectionally transfers data to the ATA/WIC BIU 806 or WIC BIU 807 as the case may be. The ATA/WIC BIU 806 or WIC BIU 807 transmit and receive data from the appropriate socket controller using the WIC communication protocol.

FIG. 9A illustrates a block diagram of the socket controller 220 of the present invention having a WIC bus interface unit (WIC BIU) 902, registers 908, a control and command translation circuit 904, a DMA control circuit 914, an infrared (IR) controller circuit 907, and a slot controller circuit 906. FIG. 9B illustrates a block diagram of the socket controller 221 of the present invention which modifies the socket controller 220 to include the interface circuit 920. The interface circuit 920 includes bidirectional tristate buffers, a plurality of latches and multiplexors. The WIC BIU 902 couples to the ATA cable, ATA signal lines or an ATA equivalent bus through bus 910. The WIC BIU 902 is further coupled to the registers 908 and the control and command translation circuit 904 within the socket controller.

In the case where socket controller 221 illustrated in FIG. 9B, represents the socket controllers 221A-B in FIGS. 2B, 3B, 5 and 6, two PCMCIA sockets and two IR transceivers are controlled by the given socket controller. The slot controller circuit 906 bidirectionally communicates address, data, joint control and joint status signals on bidirectional bus 926. On bus 925A the slot controller circuit 906 bidirectionally communicates separate control signals and separate status signals that are dedicated to socket number one. On bus 925B the slot controller circuit 906 bidirectionally communicates separate control signals and separate status signals that are dedicated to socket number two. Interface circuit 920 includes bidirectional tristate buffers, multiple latches and multiplexors in order to multiplex bus 926 into the two busses 927A and 927B. Address, data, and control signals intended for socket number one and driven onto bus 927A are selected from bus 926 when a signal on the data direction line 922 is selecting output and a signal on the select A line 921A is active. Address, data, and control signals intended for socket number two and driven onto bus 927B are selected from bus 926 when a signal on the data direction line 922 is selecting output and a signal on the select B line 921B is active. Address, data, status, and control signals from socket number one driven onto bus 926 are selected from bus 927A by the interface circuit 920 when a signal on the data direction line 922 is selecting input and a signal on the select A line 921A is active. Address, data, status, and control signals from socket number one driven onto bus 926 are selected from bus 927B by the interface circuit 920 when a signal on the data direction line 922 is selecting input and a signal on the select B line 921B is active. Bus 927A is combined with bus 925A to create a larger bus 912 to interface with socket number one. Bus 927B is combined with bus 925B to create a larger bus 913 to interface with socket number two. The IR controller 907 bidirectionally communicates with the IR transceiver number one on bus 916 and with IR transceiver number two on bus 917.

In the case where socket controller 220 illustrated in FIG. 9A, represents socket controllers 220A–D in FIGS. 2A and 3A, only one socket and one IR transceiver are being controlled by the given socket controller. The slot controller circuit 906 bidirectionally communicates address, data, control and status signals on bidirectional bus 926. On bus 925A the slot controller circuit 906 bidirectionally communicates separate control signals and separate status signals that are dedicated to slot or socket number one. Bus 925B from the slot controller circuit 906 is unused. Busses 925A and 926 are combined into one bus 924 to interface to the PCMCIA socket and only one bus 916 is used to interface to the IR transceiver while the busses 917 and 925B are unused.

In either case the slot controller circuit 906 is further coupled to the registers 908 and the control and command translation circuit 904. The control and command translation circuit 904 is coupled to the WIC BIU 902, the DMA control circuit 914, the registers 908, the infrared controller circuit 907, and the slot controller circuit 906 within the socket controller 220. The infrared controller circuit 907 may be coupled to IR transceivers 240,241,250,251 through bus 916 or bus 917. The infrared controller circuit 907 is further coupled to the control and command translation circuit 904 and the registers 908 within the socket controllers 220 and 221. The DMA controller 914 is coupled to the control and command translation circuit 904, the registers 908, and the slot controller 906 within the socket controllers 220 and 221.

The socket controllers 221 and 220 communicate with the system adapter 204 through bus 910 using the WIC protocol, with the PCMCIA peripheral devices either through busses 912 and 913, or bus 924 using the PCMCIA communication protocol, and with the IR peripheral devices through either or both busses 916 and 917 using a serial input and output communications format such as non-return to zero (NRZ). The WIC protocol described above is implemented by the WIC BIU 902. The slot controller 906 implements the communication with PCMCIA cards using the PCMCIA standards.

Data communicated between the host CPU 140 and the PCMCIA peripherals is accomplished by communication between the system adapter 204 and a socket controller 220 or 221. Within the system adapter 204, data is transmitted and received to or from the host CPU 140 by the SYSTEM BIU 802 using the relevant system bus communication standard. The SYSTEM BIU 802 bidirectionally transfers data to the control and command translation circuit 804 which then bidirectionally transfers data to the ATA/WIC BIU 806. The ATA/WIC BIU 806 transmits and receives data to or from the socket controller using the WIC protocol. If data needs to be buffered, a FIFO within the registers 808 may also temporarily hold data that is communicated between the CPU and the PCMCIA peripheral. Within the socket controller 220 or 221, data is transmitted and received to or from system adapter 204 by the WIC BIU 902 using the WIC protocol. The WIC BIU 902 bidirectionally transfers data to the control and command translation circuit 904 which then bidirectionally transfers data to the slot controller circuit 906 which then transmits and receives data from the appropriate slot and PCMCIA peripheral using PCMCIA communication standards. If data needs to be buffered, a FIFO within the registers 908 may also temporarily hold data that is communicated between the CPU and the PCMCIA peripheral.

Data communicated between system memory 142 and a PCMCIA peripheral for a DMA read or write operation is similar to the communication between the host CPU and a PCMCIA peripheral. In a system having an ISA system bus the DMA read or write operation is initiated by an external DMA controller device where the system adapter 204 responds by bidirectionally transferring data to or from system memory 142 instead of the host CPU 140. In a system having a PCI or VLBus system bus the system adapter has the responsibility for generating memory addresses into system memory and carries out the remaining DMA controller operations as required for the system busses. Within the system adapter 204, data is transmitted and received to or from the system memory 142 by the SYSTEM BIU 802 using the relevant system bus communication standard. The SYSTEM BIU 802 bidirectionally transfers data to the control and command translation circuit 804 which then bidirectionally transfers data to the ATA/WIC BIU 806. The ATA/WIC BIU 806 transmits and receives data to or from the socket controller using the WIC protocol. Within the socket controller 220 data is transmitted to or received from system adapter 204 by the WIC BIU 902 using the WIC protocol. In the case of a DMA read or write operation the DMA control circuit 914 assists the control and command translation circuit 904 in communicating data between the system memory 142 and the PCMCIA peripheral. As in host CPU to PCMCIA peripheral communication the slot controller circuit 906 transmits and receives data from the appropriate slot and PCMCIA peripheral using PCMCIA communication standards. If data needs to be buffered, a FIFO within the registers 908 may also temporarily hold data that is communicated between the system memory and the PCMCIA peripheral.

Data communicated between the host CPU and the IR peripherals is accomplished by communication between the system adapter 204 and the socket controller 220. Within the system adapter 204, data is transmitted and received to or from the host CPU 140 by the SYSTEM BIU 802 using the relevant bus communication standard. The SYSTEM BIU 802 bidirectionally transfers data to the control and command translation circuit 804 which then bidirectionally transfers data to the ATA/WIC BIU 806. The ATA/WIC BIU 806 transmits and receives data to or from the socket controllers 220 or 221 using the WIC protocol. Within socket controller 220 or 221 data is transmitted and received to or from system adapter 204 and then to the host CPU by the WIC BIU 902 using the WIC protocol. The WIC BIU 902 bidirectionally transfers data to the control and command translation circuit 904 which then bidirectionally transfers data to the IR controller circuit 907. The IR controller circuit 907 converts parallel data from the control and command translation circuit 904 into serial data to drive the IR transceivers 240, 241, 250, or 251. The IR controller circuit 907 also converts serial data from the transceiver 240,241, 250, or 251 into parallel data for communication to the control and command translation circuit 904. Included within the IR controller circuit 907 is a buffer such as a register or FIFO in order to properly match the speed of serial communication with that of the parallel communication.

The host CPU via the system adapter 204 may read data from or store data into the registers 908 which consist of an index register, global registers, slot registers, status registers, and may also consist of a FIFO. Amongst other things the index register activates a given socket controller and socket number through the methods described above. Registers designated as global registers assist in controlling portions of the entire socket adapter. The slot registers assist in controlling portions of the interface to each individual slot. The status registers monitor conditions within the socket controller and provide status information that can be read by the host CPU. Data communicated between the host CPU and the PCMCIA peripheral cards flows through the WIC BIU 902, the control and command translation circuit, and the slot controller circuit 906. If data needs to be buffered, a FIFO within the registers 908 may also temporarily hold data that is communicated between the host CPU and the PCMCIA peripheral cards as well as other communication paths.

The socket controller as described above combines the functions of a PCMCIA host adapter and IR interface controller into a single device which saves space and conserves power consumption in a computer system. The combination of the socket controller and system adapter as described above reduces the connections and cables within the computer system case and allows more peripherals to be coupled to a computer system.

ALTERNATE EMBODIMENT

Figure 5:
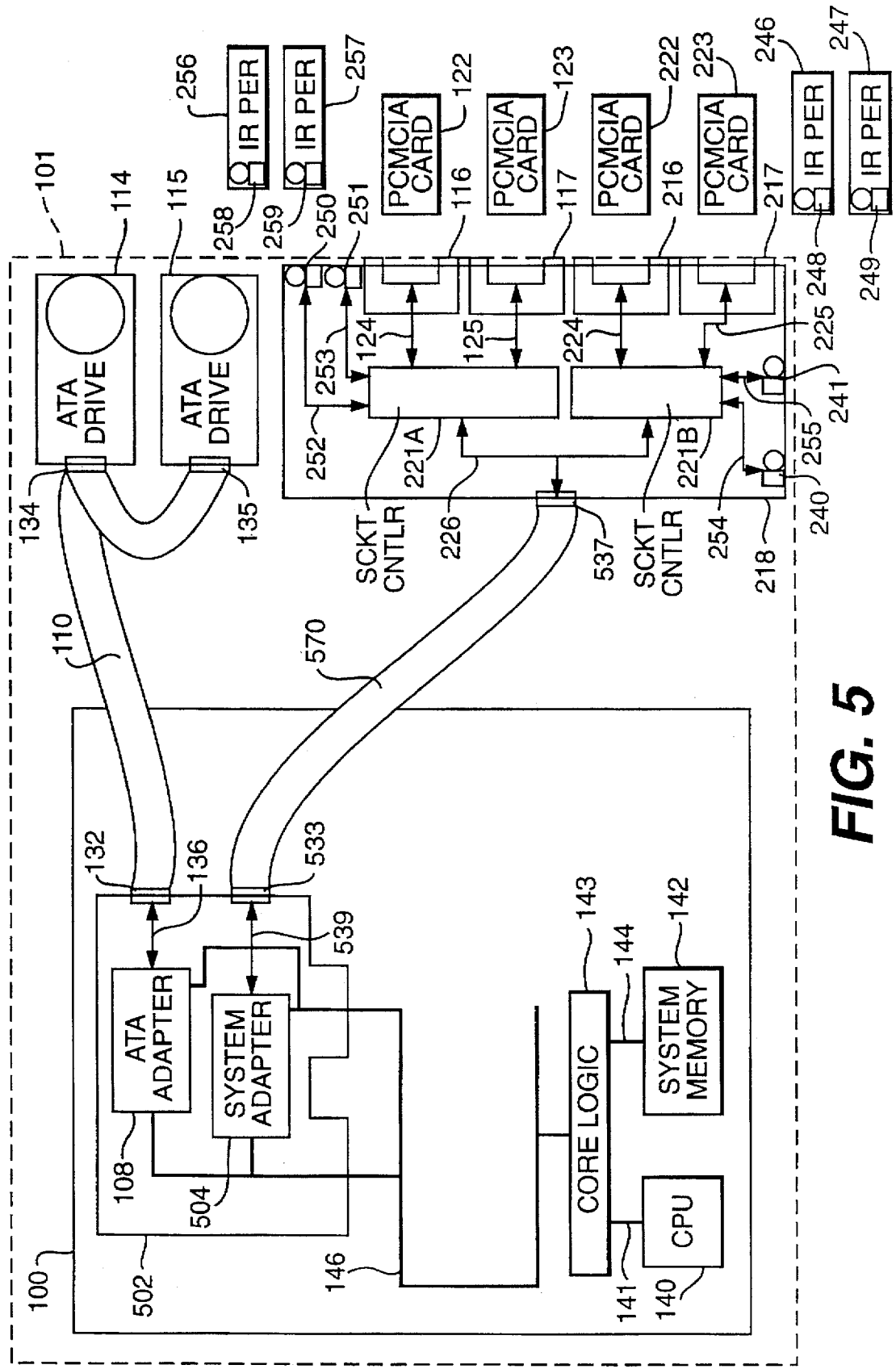
FIG. 5 illustrates a block diagram schematic for a desktop computer system according to the present invention which includes a system adapter integrated circuit and a socket controller integrated circuit. The expansion board 502 has a separate ATA adapter integrated circuit and a separate system adapter integrated circuit and is connected to separate cables for communication to the hard disk drives and the socket controllers respectively.
Figure 6:
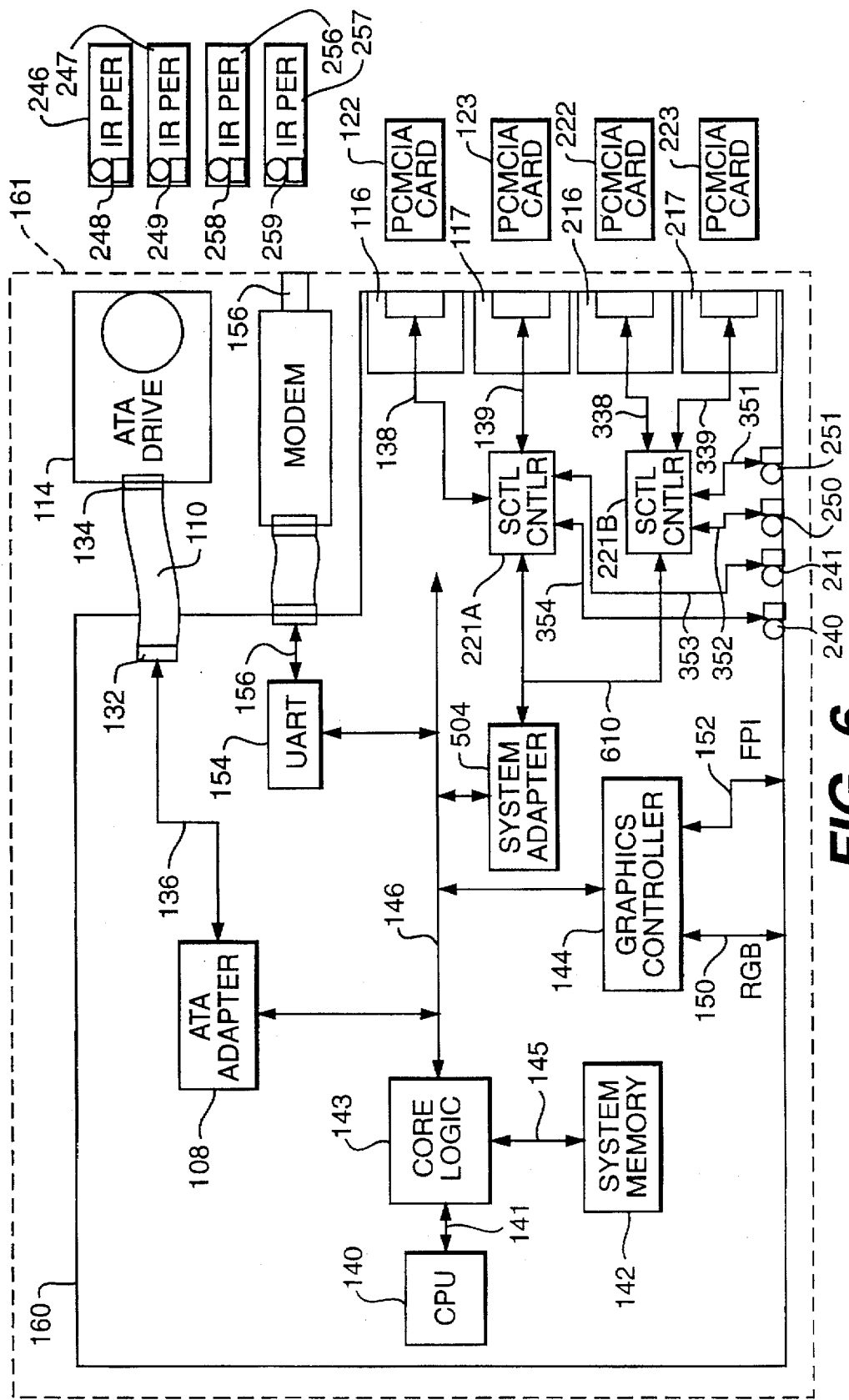
FIG. 6 illustrates a block diagram schematic for a portable computer system according to the present invention which includes a system adapter integrated circuit and a socket controller integrated circuit. The motherboard 160 has a separate ATA adapter integrated circuit and a separate system adapter integrated circuit which are connected to separate busses for communication to the hard disk drives and the socket controllers respectively.

In the system of the preferred embodiment as described above the PCMCIA and ATA functions have always been combined onto one system adapter 204. In some systems it may not be desirable to combine the ATA and PCMCIA functions together onto one piece of silicon or communicate across one cable. It may be desirable to separate the peripheral interface system into a specialized PCMCIA interface system and an ATA interface system. The specialized PCMCIA interface system would continue to use a system adapter integrated circuit, a peripheral communication bus or cable, and socket controller integrated circuits in order to facilitate the bidirectional communication between a host CPU and other peripheral devices. FIG. 5 illustrates a desktop computer system 101 having a separate ATA interface system and a separate specialized PCMCIA interface system. FIG. 6 illustrates a portable computer system 161 having the separate interface systems. In FIG. 5 the specialized PCMCIA interface system includes a plug in card such as interface card 502, system adapter integrated circuit 504, PCMCIA board 218, PCMCIA sockets 116, 117, 216, 217, socket controllers 221A and 221B, IR transceivers 240, 241, 250, 251, cable 570 and associated connectors 533, 537. The ATA interface system in FIG. 5 includes a plug in card that may be similar to interface card 502, an ATA adapter 108, a cable 110 and associated connectors 134, 132, and an ATA drive 114 and its associated hard disk driver controller (not illustrated). Referring to FIG. 6, the system adapter 504 interfaces to the system bus 146 and to the socket controllers 221A–B via bus 610. The socket controllers 221A–B interface to PCMCIA peripherals 122, 123,222, 223 through the PCMCIA sockets 116, 117, 216, 217 by way of busses 138, 139, 338, 339. The socket controllers further interface to IR peripherals 246, 247, 256, 257 through the transceivers 240, 241, 250, 251 by way of the busses 351–354.

The separation of the interface systems and use of separate busses or cables may be preferable as compared to a single bus in order to improve performance or to provide other functionality such as employing other disk drive protocols within the system. This separate specialized PCMCIA interface system may use the same protocol, logic and control as described above in the preferred embodiment wherein the ATA cable, system adapter integrated circuit, and interface card were shared. Alternatively a different cable and other interface system hardware may be adapted to better support PCMCIA cards. For example a standard ATA cable requires a 40 signal ribbon cable while the signal line requirements for communication using the WIC protocol requires only a 22 signal ribbon cable. Furthermore, the system adapter 504 need only communicate using the WIC protocol and not use the additional signals within the ATA standard and thus can have a reduced pin count as well as a reduced die size when the circuitry for ATA support is removed. Thus the special PCMCIA interface system allows a system designer to use a minimum cable size and a minimum chip pin count to support PCMCIA slots.

While in the system of the preferred embodiment, only ATA and PCMCIA peripherals have been described, the present invention is not intended to be so limited. It is foreseeable that future hard disk drive technology will introduce new interface systems between the system bus and the hard disk drive and that the system adapter and socket controllers described herein can be adapted to the future interface systems and share certain hardware resources such as a cable or a bus of signal lines in order to support additional peripherals or subsystems such as PCMCIA cards or IR peripherals at a minimal cost. It should also be apparent to one skilled in the art that the principles of the present invention could be used with other types of peripherals or other types of subsystems which operate under different sets of standards and specifications, by modifying the system adapters 204 or 504 and the socket controllers 220 or 221. Other improvements and modifications which become apparent to persons of ordinary skill in the art only after reading this disclosure, the drawings and the appended claims are deemed within the spirit and scope of the present invention.

Express Mail Label No. TB299228754US
08/266975
United States Patent Application
Attorney Docket No.: CIRRUS00905
METHOD AND APPARATUS FOR INTERFACING BETWEEN PERIPHERALS OF MULTIPLE FORMATS AND A SINGLE SYSTEM BUS
APPENDIX 1
"Information Technology -
AT Attachment Interface
for
Disk Drives"

WORKING DRAFT

X3T9.2
791D

Revision 4
17-MAR-93

Information technology -
AT Attachment Interface for Disk Drives

This is a draft proposed American National Standard of Accredited Standards Committee X3. As such this is not a completed standard. The X3T9 Technical Committee may modify this document as a result of comments received during public review and its approval as a standard. Use of the information contained herigh is at your own risk.

Permission is granted to members of X3, its technical committees, and their associated task groups to reproduce this document for the purposes of X3 standardization activities without further permission, provided this notice is included. All other rights are reserved. Any commercial or for-profit use is strictly prohibited.

ASC X3T9.2 Technical Editor:

Lawrence J. Lamers
Maxtor Corporation
150 River Oaks Parkway
San Jose, CA 95134-1983
USA Telephone: 408-432-3889
Facsimile: 408-432-3833
Email:     71540.2756@compuserve.com

Reference number
ISO/IEC ***** : 199x
ANSI X3.221 - 199x
Printed March, 19, 1993 1:24pm X3T9.2/791D revision 4

POINTS OF CONTACT:

X3T9.2 Chair
John B. Lohmeyer
NCR Corporation
1635 Aeroplaza Drive
Colo Spgs, CO 80916

Tel: (719) 596-5795 x362
Fax: (719) 597-8225
Email: john.lohmeyer@ftcollinsco.ncr.com

X3 Secretariat
Lynn Barra
Administrator Standards Processing
X3 Secretariat
1250 Eye Street, NW Suite 200
Washington, DC 20005

X3T9.2 Vice-Chair
I. Dal Allan
ENDL
14426 Black Walnut Court
Saratoga, CA 95070

Tel: (408) 867-6630
Fax: (408) 867-2115
Email: 2501752@mcimail.com

Telephone: 202-626-5738
Facsimile: 202-638-4922

SCSI Reflector
Internet address for subscription to the SCSI reflector: scsiadm@wichitaks.ncr.com
Internet address for distribution via SCSI reflector: scsi@wichitaks.ncr.com

SCSI Bulletin Board
719-574-0424

Document Distribution
Global Engineering
15 Inverness Way East
Englewood, CO 80112-5704

Telephone: 303-792-2181 or
800-854-7179
Facsimile: 303-792-2192

ABSTRACT

This standard defines the AT Attachment Interface. This standard defines an integrated bus interface between disk drives and host processors. It provides a common point of attachment for systems manufacturers, system integrators, and suppliers of intelligent peripherals.

PATENT STATEMENT

The developers of this standard have requested that holder's of patents that may be required for the implementation of the standard, disclose such patents to the publisher. However neither the developers nor the publisher have undertaken a patent search in order to identify which if any patents may apply to this standard.

No position is taken with respect to the validity of any claim or any patent rights that may have been disclosed. Details of submitted statements may be obtained from the publisher concerning any statement of patents and willingness to grant a license under these rights on reasonable and nondiscriminatory terms and conditions to applicants desiring to obtain such a license.

working draft AT Attachment Interface for Disk Drives

X3T9.2/791D revision 4

DOCUMENT STATUS

Revision 4 - developed as a result of comments received on X3T9.2 letter ballot.
Revision 3.3 - developed as a result of the comments received during public review.
Revision 3.1 - forwarded in August 1991 from X3T9.2 to X3T9 for further processing as an American National Standard.

X3T9.2/791D revision 4

Contents

|   | Page |
|---|---|
| Contents | iii |
| Annexes | vii |
| Figures | viii |
| Tables | ix |
| Foreword | xi |
| Introduction | xii |
| 1 Scope | 1 |
| 2 Normative references | 1 |
| 3 Definitions, symbols, and abbreviations | 1 |
|   3.1 Definitions | 1 |
|   3.2 Symbols and abbreviations | 2 |
| 4 General | 2 |
|   4.1 Structure | 2 |
|   4.2 Conventions | 2 |
| 5 Interface cabling requirements | 3 |
|   5.1 Configuration | 3 |
|   5.2 Addressing considerations | 4 |
|   5.2.1 DC cable and connector | 4 |
|   5.2.2 4-pin power | 4 |
|   5.2.3 3-pin power | 5 |
|   5.2.4 Device grounding | 5 |
|   5.3 I/O connector | 5 |
|   5.4 I/O cable | 6 |
| 6 Physical interface | 6 |
|   6.1 Signal conventions | 6 |
|   6.2 Signal summary | 6 |
|   6.3 Signal descriptions | 7 |
|   6.3.1 CS1FX- (drive chip select 0) | 8 |
|   6.3.2 CS3FX- (drive chip select 1) | 8 |
|   6.3.3 DA0-2 (Drive address bus) | 8 |
|   6.3.4 DASP- (Drive active/drive 1 present) | 8 |
|   6.3.5 DD0-DD15 (Drive data bus) | 9 |
|   6.3.6 DIOR- (Drive I/O read) | 9 |
|   6.3.7 DIOW- (Drive I/O write) | 9 | working draft AT Attachment Interface for Disk Drives

X3T9.2/791D revision 4

6.3.8 DMACK- (DMA acknowledge) (Optional) .................... 9
6.3.9 DMARQ (DMA request) (Optional) .......................... 9
6.3.10 INTRQ (Drive interrupt) ................................. 9
6.3.11 IOCS16- (Drive 16-bit I/O) ............................. 10
6.3.12 IORDY (I/O channel ready) (Optional) .................... 10
6.3.13 PDIAG- (Passed diagnostics) ............................ 10
6.3.14 RESET- (Drive reset) ................................... 11
6.3.15 SPSYNC:CSEL (Spindle synchronization/cable select) (Optional) .. 11
6.3.16 SPSYNC (Spindle synchronization) (Optional) ............. 11
6.3.17 CSEL (Cable select) (Optional) ......................... 12

7 Logical interface ............................................ 12
  7.1 General .................................................. 12
    7.1.1 Bit conventions ..................................... 12
    7.1.2 Environment ......................................... 12
  7.2 I/O register descriptions ................................ 13
    7.2.1 Alternate status register ............................ 14
    7.2.2 Command register .................................... 14
    7.2.3 Cylinder high register ............................... 14
    7.2.4 Cylinder low register ................................ 15
    7.2.5 Data register ........................................ 15
    7.2.6 Device control register .............................. 15
    7.2.7 Drive address register ............................... 15
    7.2.8 Drive/head register .................................. 16
    7.2.9 Error register ....................................... 16
    7.2.10 Features register .................................. 17
    7.2.11 Sector count register .............................. 17
    7.2.12 Sector number register ............................. 17
    7.2.13 Status register .................................... 17

8 Programming requirements .................................... 18
  8.1 Reset response ........................................... 18
  8.2 Translate mode ........................................... 19
  8.3 Power conditions ......................................... 19
  8.4 Error posting ............................................ 20

9 Command descriptions ......................................... 21
  9.1 Acknowledge media change (removable) ..................... 24
  9.2 Boot - post-boot (removable) ............................. 24
  9.3 Boot - pre-boot (removable) .............................. 24
  9.4 Check power mode ......................................... 24
  9.5 Door lock (removable) .................................... 24
  9.6 Door unlock (removable) .................................. 24
  9.7 Execute drive diagnostic ................................. 24
  9.8 Format track ............................................. 25
  9.9 Identify drive ........................................... 26
    9.9.1 Word 1: Number of cylinders ......................... 28
    9.9.2 Word 3: Number of heads ............................. 28
    9.9.3 Word 4: Number of unformatted bytes per track ....... 28
    9.9.4 Word 5: Number of unformatted bytes per sector ...... 28
    9.9.5 Word 6: Number of sectors per track ................. 28
    9.9.6 Word 10-19: Serial Number ........................... 28

9.9.7 Word 20: Buffer Type ................................................. 28
9.9.8 Word 22: ECC bytes available on read/write long commands ...... 28
9.9.9 Word 23-26: Firmware revision ................................. 28
9.9.10 Word 27-46: Model number ................................... 29
9.9.11 Word 51: PIO data transfer cycle timing mode ................. 29
9.9.12 Word 52: DMA data transfer cycle timing mode ................ 29
9.9.13 Word 54: Number of current cylinders ........................ 29
9.9.14 Word 55: Number of current heads ........................... 29
9.9.15 Word 56: Number of current sectors per track ................. 29
9.9.16 Word 57-58: Current capacity in sectors ..................... 29
9.9.17 Word 59: Multiple sector setting ............................. 29
9.9.18 Word 60-61: Total number of user addressable sectors ......... 29
9.9.19 Word 62: Single word DMA transfer .......................... 30
9.9.20 Word 63: Multiword DMA transfer ........................... 30
9.10 Idle ............................................................ 30
9.11 Idle immediate .................................................. 30
9.12 Initialize drive parameters ...................................... 30
9.13 NOP ........................................................... 30
9.14 Read buffer .................................................... 31
9.15 Read DMA ..................................................... 31
9.16 Read long ..................................................... 31
9.17 Read multiple command ........................................ 31
9.18 Read sector(s) ................................................. 32
9.19 Read verify sector(s) ........................................... 33
9.20 Recalibrate ................................................... 33
9.21 Seek .......................................................... 33
9.22 Set features ................................................... 33
9.23 Set multiple mode ............................................. 34
9.24 Sleep ......................................................... 35
9.25 Standby ....................................................... 35
9.26 Standby immediate ............................................. 35
9.27 Write buffer ................................................... 35
9.28 Write DMA .................................................... 35
9.29 Write long .................................................... 36
9.30 Write multiple command ........................................ 36
9.31 Write same ................................................... 36
9.32 Write sector(s) ................................................ 37
9.33 Write verify ................................................... 37

10 Protocol overview .................................................... 37
10.1 PIO data in commands .......................................... 38
10.1.1 PIO read command .......................................... 38
10.1.2 PIO Read aborted command ................................. 38
10.2 PIO data out commands ........................................ 39
10.2.1 PIO write command ......................................... 39
10.2.2 PIO write aborted command ................................. 39
10.3 Non-data commands ............................................ 40
10.4 Miscellaneous commands ....................................... 40
10.5 DMA data transfer commands (optional) ....................... 40
10.5.1 Normal DMA transfer ....................................... 41
10.5.2 Aborted DMA transfer ...................................... 41
10.5.3 Aborted DMA Command ..................................... 41

X3T9.2/791D revision 4

| | |
|---|---|
| 11 Timing | 42 |
| 11.1 Deskewing | 42 |
| 11.2 Symbols | 42 |
| 11.3 Terms | 42 |
| 11.4 Data Transfers | 43 |
| 11.5 Power on and hard reset | 46 |

Annexes

|  | Page |
|---|---|
| Annex A | 47 |
| Diagnostic and reset considerations | 47 |
| Annex B | 51 |
| Diagnostic and reset considerations | 51 |
| Annex C | 56 |
| Small Form Factor Connectors | 56 |

X3T9.2/791D revision 4

Figures

| | Page |
|---|---|
| Figure 1 - ATA interface to embedded bus peripherals | 3 |
| Figure 2 - Host bus adapter and peripheral devices | 3 |
| Figure 3 - ATA interface to controller and peripheral devices | 4 |
| Figure 4 - 40-pin connector mounting | 5 |
| Figure 5 - Cable select | 12 |
| Figure 6 - PIO data transfer to/from drive | 43 |
| Figure 7 - IORDY timing requirements | 43 |
| Figure 8 - Single word DMA data transfer | 44 |
| Figure 9 - Multiword DMA data transfer | 45 |
| Figure 10 - Reset sequence | 46 |

X3T9.2/791D revision 4

Tables

|   | Page |
|---|---|
| Table 1 - DC interface | 4 |
| Table 2 - DC interface | 5 |
| Table 3 - Cable parameters | 6 |
| Table 4 - Interface signals | 7 |
| Table 5 - Interface signals description | 8 |
| Table 6 - I/O port functions/selection addresses | 13 |
| Table 7 - Power conditions | 19 |
| Table 8 - Register contents | 20 |
| Table 9 - Command codes and parameters | 22 |
| Table 10 - Diagnostic codes | 25 |
| Table 11 - Identify drive information | 27 |
| Table 13 - Set feature register definitions | 33 |
| Table 14 - Signal assignments for ATA | 56 |

X3T9.2/791D revision 4 x                                                              working draft AT Attachment Interface for Disk Drives X3T9.2/791D revision 4

Foreword

This standard, ISO/IEC ***** does not replace any existing standard. This standard encompasses the following:

Clause 1 describes the scope.

Clause 2 lists the normative references.

Clause 3 provides a glossary common to the whole document.

Clause 4 provides descriptions and conventions.

Clause 5 contains the electrical and mechanical characteristics; covering the interface cabling requirements of the DC, data cables and connectors.

Clause 6 contains the signal descriptions of the AT Attachment Interface.

Clause 7 contains descriptions of the registers of the AT Attachment Interface.

Clause 8 describes the programming requirements of the AT Attachment Interface.

Clause 9 contains descriptions of the commands of the AT Attachment Interface.

Clause 10 contains an overview of the protocol of the AT Attachment Interface.

Clause 11 contains the interface timing diagrams.

Annex A is informative.

Annex B is informative.

Annex C is informative.

PATENTS: The developers of this standard have requested that holders of patents that may be required for the implementation of the standard, disclose such patents to the publisher. However, neither the developers nor the publisher have undertaken a patent search in order to identify which if any patents apply to this standard.

No position is taken with respect to the validity of any claim or any patent rights that may have been disclosed. Details of submitted statements may be obtained from the publisher concerning any statement of patents and willingness to grant a license under these rights on reasonable and nondiscriminatory terms and conditions to applicants desiring to obtain such a license.

X3T9.2/791D revision 4

Introduction

When the first IBM PC (Personal Computer) (tm) was introduced, there was no hard disk capability for storage. Successive generations of product resulted in the inclusion of a hard disk as the primary storage device. When the PC AT (tm) was developed, a hard disk was the key to system performance, and the controller interface became a de facto industry interface for the inclusion of hard disks in PC ATs.

The price of desktop systems has declined rapidly because of the degree of integration to reduce the number of components and interconnects required to build a product. A natural outgrowth of this integration was the inclusion of controller functionality into the hard disk.

In October 1988 a number of peripheral suppliers formed the Common Access Method Committee to encourage an industry-wide effort to adopt a common software interface to dispatch input/output requests to SCSI peripherals. Although this was the primary objective, a secondary goal was to specify what is known as the AT Attachment interface.

X3T9.2/791D revision 4

Information Processing Systems -- AT Attachment Interface for Disk Drives

1 Scope

This standard defines the AT Attachment Interface. This standard defines an integrated bus interface between disk drives and host processors. It provides a common point of attachment for systems manufacturers, system integrators, and suppliers of intelligent peripherals.

2 Normative references

None.

3 Definitions, symbols, and abbreviations

For the purposes of this International Standard, the following definitions apply.

3.1 Definitions

3.1.1 ATA (AT attachment): ATA defines a compatible register set and a 40-pin connector and its associated signals.

3.1.2 CHS (Cylinder-head-sector): This term defines the addressing mode of the drive as being by physical address.

3.1.3 Data block: This term describes a data transfer, and is typically a single sector, except when declared otherwise by use of the Set Multiple command.

3.1.4 DMA (Direct memory access): A means of data transfer between peripheral and host memory without processor intervention.

3.1.5 LBA (Logical block address): This term defines the addressing mode of the drive as being by the linear mapping of sectors from 1 to $n$.

3.1.6 Optional: his term describes features which are not required by the standard. However, if any feature defined by the standard is implemented, it shall be done in the same way as defined by the standard. Describing a feature as optional in the text is done to assist the reader. If there is a conflict between text and tables on a feature described as optional, the table shall be accepted as being correct.

3.1.7 PIO (Programmed input/output): A means of data transfer that requires the use of the host processor.

3.1.8 Reserved: Where this term is used for bits, bytes and fields; the bits, bytes and fields are set aside for future standardization, and shall be zero.

3.1.9 VU (Vendor unique): This term is used to describe bits, bytes, fields, code values and features which are not described in this standard, and may be used in a way that varies between vendors.

X3T9.2/791D revision 4

3.2 Symbols and abbreviations

AWG  American Wire Gauge
LSB  Least significant bit
LUN  Logical unit number
MSB  Most significant bit

4 General

The application environment for the AT Attachment Interface is any computer which uses an AT Bus or 40-pin ATA interface.

The PC AT Bus (tm) is a widely used and implemented interface for which a variety of peripherals have been manufactured. As a means of reducing size and cost, a class of products has emerged which embed the controller functionality in the drive. These new products utilize the AT Bus fixed disk interface protocol, and a subset of the AT bus. Because of their compatibility with existing AT hardware and software this interface quickly became a de facto industry standard.

The purpose of the ATA standard is to define the de facto implementations.

Software in the Operating System dispatches I/O (Input/Output) requests via the AT Bus to peripherals which respond to direct commands.

4.1 Structure

This standard relies upon specifications of the mechanical and electrical characteristics of the AT Bus and a subset of the AT Bus specifically developed for the direct attachment of peripherals.

Also defined are the methods by which commands are directed to peripherals, the contents of registers and the method of data transfers.

4.2 Conventions

Certain words and terms used in this International Standard have a specific meaning beyond the normal English meaning. These words and terms are defined either in clause 3 or in the text where they first appear. Names of signals, phases, messages, commands, statuses, sense keys, additional sense codes, and additional sense code qualifiers are in all uppercase (e.g. REQUEST SENSE). Lower case is used for words having the normal English meaning.

Fields containing only one bit are usually referred to as the "name" bit instead of the "name" field.

Numbers that are not immediately followed by lower-case "b" or "h" are decimal values.

Numbers immediately followed by lower-case "b" (xxb) are binary values.

Numbers immediately followed by lower-case "h" (xxh) are hexadecimal values.

X3T9.2/791D revision 4

5 Interface cabling requirements

5.1 Configuration

This standard provides the capability of operating on the AT Bus in a daisy chained configuration with a second drive that operates in accordance with these standards. One drive (selected as Drive 0) has been referred to as the master in industry terms and the second (selected as Drive 1) has been referred to as the slave (see figure 3).

The designation as Drive 0 or Drive 1 may be made in a number of ways:

- a switch on the drive
- a jumper plug on the drive
- use of the Cable Select (CSEL) pin Data is transferred in parallel (8 or 16 bits) either to or from host memory to the drive's buffer under the direction of commands previously transferred from the host. The drive performs all of the operations necessary to properly write data to, or read data from, the disk media. Data read from the media is stored in the drive's buffer pending transfer to the host memory and data is transferred from the host memory to the drive's buffer to be written to the media.

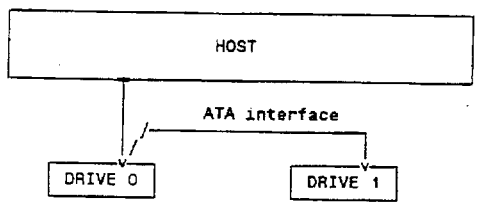

Figure 1 - ATA interface to embedded bus peripherals

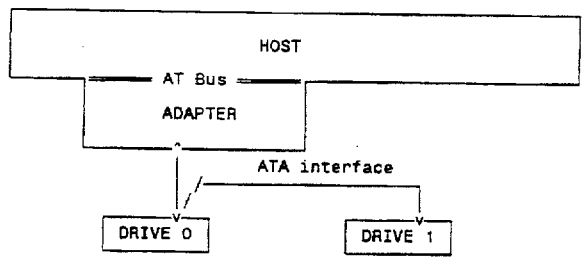

Figure 2 - Host bus adapter and peripheral devices

X3T9.2/791D revision 4

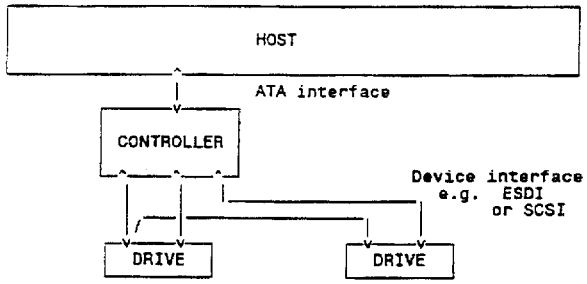

Figure 3 - ATA interface to controller and peripheral devices

5.2 Addressing considerations

In traditional controller operation, only the selected controller receives commands from the host following selection. In this standard, the register contents go to both drives (and their embedded controllers). The host discriminates between the two by using the DRV bit in the Drive/Head Register.

5.2.1 DC cable and connector

The drive receives DC power through a 4-pin or a low-power application 3-pin connector.

A drive designed for 3.3V applications may be plugged into a receptacle designed to accept a drive designed for 5V applications, with 12V lines for additional power. It is not required that the drive operate, but it is recommended that precautions be taken to prevent damage to the drive.

A drive designed for 5V applications may be plugged into a receptacle designed to accept a drive designed for 3.3V applications, with 5V lines for additional power. It is not anticipated that damage could occur to the drive, but it is likely to fail in an undetermined manner.

5.2.2 4-pin power

The pin assignments are shown in table 1. Recommended part numbers for the mating connector to 18 AWG cable are shown below, but equivalent parts may be used.

Connector (4 pin)    AMP 1-480424-0 or equivalent.
    Contacts (loose piece)    AMP 60619-4 or equivalent.
    Contacts (strip)    AMP 61117-4 or equivalent.

Table 1 - DC Interface

| Power line designation | Pin number |
|---|---|
| +12V | 1-01 |
| +12V Return | 1-02 |
| +5V Return | 1-03 |
| +5V | 1-04 |

X3T9.2/791D revision 4

5.2.3 3-pin power

The pin assignments are shown in table 2. Recommended part numbers for the mating connector to 18 AWG cable are shown below, but equivalent parts may be used.

Connector (3 pin)    Molex 5484 39-27-0032 or equivalent.

Table 2 - DC interface

| Power line designation | | Pin number |
|---|---|---|
| +5V | +3,3V | 1-01 |
| +12V | +5V | 1-02 |
| Ground | Ground | 1-03 |

5.2.4 Device grounding

System ground may be connected to a "quick-connect" terminal equivalent to:

Drive connector terminal    AMP 61664-1 or equivalent.
    Cable connector terminal    AMP 62137-2 or equivalent.

Provision for tying the DC logic ground and the chassis ground together or for separating these two ground planes is vendor specific.

5.3 I/O connector

The I/O connector is a 40-pin connector as shown in figure 4, with pin assignments as shown in table 4. The connector should be keyed to prevent the possibility of installing it upside down. A key is provided by the removal of pin 20. The corresponding pin on the cable connector should be plugged.

The pin locations are governed by the cable plug, not the receptacle. The way in which the receptacle is mounted on the printed circuit board affects the pin positions, and pin 1 should remain in the same relative position. This means the pin numbers of the receptacle may not reflect the conductor number of the plug. The header receptacle is not polarized, and all the signals are relative to pin 20, which is keyed.

By using the plug positions as primary, a straight cable can connect drives. As shown in figure 4, conductor 1 on pin 1 of the plug has to be in the same relative position no matter what the receptacle numbering looks like. If receptacle numbering was followed, the cable would have to twist 180 degrees between a drive with top-mounted receptacles, and a drive with bottom-mounted receptacles.

Figure 4 - 40-pin connector mounting working draft AT Attachment Interface for Disk Drives

X3T9.2/791D revision 4

Recommended part numbers for the mating connector are shown below, but equivalent parts may be used.

| | |
|---|---|
| Connector (40 pin) | 3M 3417-7000 or equivalent. |
| Strain relief | 3M 3448-2040 or equivalent. |
| Flat cable (stranded 28 AWG) | 3M 3365-40 or equivalent. |
| Flat cable (stranded 28 AWG) | 3M 3517-40 (shielded) or equivalent. |

5.4 I/O cable

The cable specifications affect system integrity and the maximum length that can be supported in any application.

Table 3 - Cable parameters

| Cable length of 0,46m (18 inches) * | Min | Max |
|---|---|---|
| Driver IoL sink current for 5V operation | 12mA | |
| Driver IoL sink current for 3,3V operation | 8mA | |
| Driver IoH source current | | -400uA |
| Cable capacitive loading | | 200pF |
| * This distance may be exceeded in circumstances where the characteristics of both ends of the cable can be controlled. | | |

6 Physical interface

6.1 Signal conventions

Signal names are shown in all upper case letters. Signals can be asserted (active, true) in either a high (more positive voltage) or low (less positive voltage) state. A dash character (-) at the beginning or end of a signal name indicates it is asserted at the low level (active low). No dash or a plus character (+) at the beginning or end of a signal name indicates it is asserted high (active high). An asserted signal may be driven high or low by an active circuit, or it may be allowed to be pulled to the correct state by the bias circuitry.

Control signals that are asserted for one function when high and asserted for another function when low are named with the asserted high function name followed by a slash character (/), and the asserted low function name followed with a dash (-) e.g. BITENA/BITCLR- enables a bit when high and clears a bit when low. All signals are TTL compatible unless otherwise noted. Negated means that the signal is driven by an active circuit to the state opposite to the asserted state (inactive, or false) or may be simply released (in which case the bias circuitry pulls it inactive, or false), at the option of the implementor.

Control signals that may be used for two mutually exclusive functions are identified with their two names separated by a colon e.g. SPSYNC:CSEL can be used for either the Spindle Sync or the Cable Select functions.

6.2 Signal summary

The physical interface consists of single ended TTL compatible receivers and drivers communicating through a 40-conductor flat ribbon non-shielded cable using an asynchronous interface protocol. The pin numbers and signal names are shown in table 4. Reserved signals shall be left unconnected.

X3T9.2/791D revision 4

Table 4 - Interface signals

| Host I/O connector | | | | Drive I/O connector |
|---|---|---|---|---|
| HOST RESET | 1 | ----- RESET- ---------> | 1 |
| | 2 | ----- Ground -------- | 2 |
| HOST DATA BUS BIT 7 | 3 | <----- DD7 ------------> | 3 |
| HOST DATA BUS BIT 8 | 4 | <----- DD8 ------------> | 4 |
| HOST DATA BUS BIT 6 | 5 | <----- DD6 ------------> | 5 |
| HOST DATA BUS BIT 9 | 6 | <----- DD9 ------------> | 6 |
| HOST DATA BUS BIT 5 | 7 | <----- DD5 ------------> | 7 |
| HOST DATA BUS BIT 10 | 8 | <----- DD10 -----------> | 8 |
| HOST DATA BUS BIT 4 | 9 | <----- DD4 ------------> | 9 |
| HOST DATA BUS BIT 11 | 10 | <----- DD11 -----------> | 10 |
| HOST DATA BUS BIT 3 | 11 | <----- DD3 ------------> | 11 |
| HOST DATA BUS BIT 12 | 12 | <----- DD12 -----------> | 12 |
| HOST DATA BUS BIT 2 | 13 | <----- DD2 ------------> | 13 |
| HOST DATA BUS BIT 13 | 14 | <----- DD13 -----------> | 14 |
| HOST DATA BUS BIT 1 | 15 | <----- DD1 ------------> | 15 |
| HOST DATA BUS BIT 14 | 16 | <----- DD14 -----------> | 16 |
| HOST DATA BUS BIT 0 | 17 | <----- DD0 ------------> | 17 |
| HOST DATA BUS BIT 15 | 18 | <----- DD15 -----------> | 18 |
| | 19 | ----- Ground -------- | 19 |
| | 20 | ----- (keypin) ------ | 20 |
| DMA REQUEST | 21 | <----- DMARQ --------- | 21 |
| | 22 | ----- Ground -------- | 22 |
| HOST I/O WRITE | 23 | ----- DIOW- ----------> | 23 |
| | 24 | ----- Ground -------- | 24 |
| HOST I/O READ | 25 | ----- DIOR- ----------> | 25 |
| | 26 | ----- Ground -------- | 26 |
| I/O CHANNEL READY | 27 | <----- IORDY --------- | 27 |
| SPINDLE SYNC or CABLE SELECT | 28 | *----- SPSYNC:CSEL ------* | 28 |
| DMA ACKNOWLEDGE | 29 | ----- DMACK- ---------> | 29 |
| | 30 | ----- Ground -------- | 30 |
| HOST INTERRUPT REQUEST | 31 | <----- INTRQ --------- | 31 |
| HOST 16 BIT I/O | 32 | <----- IOCS16- -------- | 32 |
| HOST ADDRESS BUS BIT 1 | 33 | ----- DA1 ------------> | 33 |
| PASSED DIAGNOSTICS | 34 | *----- PDIAG- ----------* | 34 |
| HOST ADDRESS BUS BIT 0 | 35 | ----- DA0 ------------> | 35 |
| HOST ADDRESS BUS BIT 2 | 36 | ----- DA2 ------------> | 36 |
| HOST CHIP SELECT 0 | 37 | ----- CS1FX- ---------> | 37 |
| HOST CHIP SELECT 1 | 38 | ----- CS3FX- ---------> | 38 |
| DRIVE ACTIVE/DRIVE 1 PRESENT | 39 | <----- DASP- ----------* | 39 |
| | 40 | ----- Ground -------- | 40 |

*Drive intercommunication signals

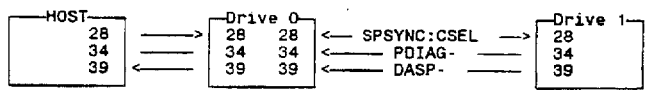

6.3 Signal descriptions

The interface signals and pins are described in more detail than shown in table 4. The signals are listed according to function, rather than in numerical connector pin order. Table 5 lists signal name mnemonic, connector pin number, whether input to (I) or output from (O) the drive, and full signal name.

X3T9.2/791D revision 4

Table 5 - Interface signals description

| Signal | Pin | I/O | |
|--------|-----|-----|---|
| CS1FX- | 37 | I | Drive chip select 0 |
| CS3FX- | 38 | I | Drive chip select 1 |
| DA0 | 35 | I | Drive address bus - bit 0 |
| DA1 | 33 | I | - bit 1 |
| DA2 | 36 | I | - bit 2 |
| DASP- | 39 | I/O | Drive active/drive 1 present |
| DD0 | 17 | I/O | Drive data bus - bit 0 |
| DD1 | 15 | I/O | - bit 1 |
| DD2 | 13 | I/O | - bit 2 |
| DD3 | 11 | I/O | - bit 3 |
| DD4 | 9 | I/O | - bit 4 |
| DD5 | 7 | I/O | - bit 5 |
| DD6 | 5 | I/O | - bit 6 |
| DD7 | 3 | I/O | - bit 7 |
| DD8 | 4 | I/O | - bit 8 |
| DD9 | 6 | I/O | - bit 9 |
| DD10 | 8 | I/O | - bit 10 |
| DD11 | 10 | I/O | - bit 11 |
| DD12 | 12 | I/O | - bit 12 |
| DD13 | 14 | I/O | - bit 13 |
| DD14 | 16 | I/O | - bit 14 |
| DD15 | 18 | I/O | - bit 15 |
| DIOR- | 25 | I | Drive I/O read |
| DIOW- | 23 | I | Drive I/O write |
| DMACK- | 29 | I | DMA acknowledge |
| DMARQ | 21 | O | DMA request |
| INTRQ | 31 | O | Drive interrupt |
| IOCS16- | 32 | O | Drive 16-bit I/O |
| IORDY | 27 | O | I/O channel ready |
| PDIAG- | 34 | I/O | Passed diagnostics |
| RESET- | 1 | I | Drive reset |
| SPSYNC: | 28 | - | Spindle sync |
| CSEL | 28 | - | Cable select |
| keypin | 20 | - | Pin used for keying the interface connector |

6.3.1 CS1FX- (drive chip select 0)

This is the chip select signal decoded from the host address bus used to select the Command Block Registers.

6.3.2 CS3FX- (drive chip select 1)

This is the chip select signal decoded from the host address bus used to select the Control Block Registers.

6.3.3 DA0-2 (Drive address bus)

This is the 3-bit binary coded address asserted by the host to access a register or data port in the drive.

6.3.4 DASP- (Drive active/drive 1 present)

This is a time-multiplexed signal which indicates that a drive is active, or that Drive 1 is present. This signal shall be an open collector output and each drive shall have a 10K ohm pull-up resistor.

During power on initialization or after RESET- is negated, DASP- shall be asserted by Drive 1 within 400 msec to indicate that Drive 1 is present.

X3T9.2/791D revision 4

Drive 0 shall allow up to 450 msec for Drive 1 to assert DASP-. If Drive 1 is not present, Drive 0 may assert DASP- to drive an activity LED.

DASP- shall be negated following acceptance of the first valid command by Drive 1 or after 31 seconds, whichever comes first.

Any time after negation of DASP-, either drive may assert DASP- to indicate that a drive is active.

> NOTE 1 Prior to the development of this standard, products were introduced which did not time multiplex DASP-. Some used two jumpers to indicate to Drive 0 whether Drive 1 was present. If such a drive is jumpered to indicate Drive 1 is present it should work successfully with a Drive 1 which complies with this standard. If installed as Drive 1, such a drive may not work successfully because it may not assert DASP- for a long enough period to be recognized. However, it would assert DASP-to indicate that the drive is active.

6.3.5 DD0-DD15 (Drive data bus)

This is an 8- or 16-bit bi-directional data bus between the host and the drive. The lower 8 bits are used for 8-bit transfers e.g. registers, ECC bytes and, if the drive supports the Features Register capability to enable 8-bit-only data transfers (see 9.21).

6.3.6 DIOR- (Drive I/O read)

This is the Read strobe signal. The falling edge of DIOR- enables data from a register or the data port of the drive onto the host data bus, DD0-DD7 or DD0-DD15. The rising edge of DIOR- latches data at the host.

6.3.7 DIOW- (Drive I/O write)

This is the Write strobe signal. The rising edge of DIOW- clocks data from the host data bus, DD0-DD7 or DD0-DD15, into a register or the data port of the drive.

6.3.8 DMACK- (DMA acknowledge) (Optional)

This signal shall be used by the host in response to DMARQ to either acknowledge that data has been accepted, or that data is available.

6.3.9 DMARQ (DMA request) (Optional)

This signal, used for DMA data transfers between host and drive, shall be asserted by the drive when it is ready to transfer data to or from the host. The direction of data transfer is controlled by DIOR- and DIOW-. This signal is used in a handshake manner with DMACK- i.e. the drive shall wait until the host asserts DMACK- before negating DMARQ, and re-asserting DMARQ if there is more data to transfer.

When a DMA operation is enabled, IOCS16-, CS1FX- and CS3FX- shall not be asserted and transfers shall be 16-bits wide.

> NOTE 2 ATA products with DMA capability require a pull-down resistor on this signal to prevent spurious data transfers. This resistor may affect driver requirements for drives sharing this signal in systems with unbuffered ATA signals.

6.3.10 INTRQ (Drive interrupt)

This signal is used to interrupt the host system. INTRQ is asserted only when the drive has a pending interrupt, the drive is selected, and the host has cleared nIEN in the Device Control Register. If nIEN=1, or the drive is not selected, this output is in a high impedance state, regardless of the presence or absence of a pending interrupt.

working draft AT Attachment Interface for Disk Drives

X3T9.2/791D revision 4

INTRQ shall be negated by:
- assertion of RESET- or
- the setting of SRST of the Device Control Register, or
- the host writing the Command Register or
- the host reading the Status Register NOTE 3 Some drives may negate INTRQ on a PIO data transfer completion, except on a single sector read or on the last sector of a multi-sector read.

On PIO transfers, INTRQ is asserted at the beginning of each data block to be transferred. A data block is typically a single sector, except when declared otherwise by use of the Set Multiple command. An exception occurs on Format Track, Write Sector(s), Write Buffer and Write Long commands - INTRQ shall not be asserted at the beginning of the first data block to be transferred.

On DMA transfers, INTRQ is asserted only once, after the command has completed.

6.3.11 IOCS16- (Drive 16-bit I/O)

Except for DMA transfers, IOCS16- indicates to the host system that the 16-bit data port has been addressed and that the drive is prepared to send or receive a 16-bit data word. This shall be an open collector output.

- When transferring in PIO mode, if IOCS16- is not asserted, transfers shall be 8-bit using DD0-7.
- When transferring in PIO mode, if IOCS16- is asserted, transfers shall be 16-bit using DD0-15.
- When transferring in DMA mode, the host shall use a 16-bit DMA channel and IOCS16- shall not be asserted.

6.3.12 IORDY (I/O channel ready) (Optional)

This signal is negated to extend the host transfer cycle of any host register access (Read or Write) when the drive is not ready to respond to a data transfer request. When IORDY is not negated, IORDY shall be in a high impedance state.

6.3.13 PDIAG- (Passed diagnostics)

This signal shall be asserted by Drive 1 to indicate to Drive 0 that it has completed diagnostics. A 10K ohm pull-up resistor shall be used on this signal by each drive.

Following a power on reset, software reset or RESET-, Drive 1 shall negate PDIAG- within 1 msec (to indicate to Drive 0 that it is busy). Drive 1 shall then assert PDIAG- within 30 seconds to indicate that it is no longer busy, and is able to provide status. If Drive 1 is present, then Drive 0 shall wait for up to 31 seconds from power-on reset, software reset or RESET- for Drive 1 to assert PDIAG-. If Drive 1 fails to assert PDIAG-, Drive 0 shall set bit 7 to 1 in the Error Register to indicate that Drive 1 failed. After the assertion of PDIAG-, Drive 1 may be unable to accept commands until it has finished its reset procedure and is Ready (DRDY=1).

Following the receipt of a valid Execute Drive Diagnostics command, Drive 1 shall negate PDIAG- within 1 msec to indicate to Drive 0 that it is busy and has not yet passed its drive diagnostics. Drive 1 shall then assert PDIAG- within 5 seconds to indicate that it is no longer busy, and is able to provide status. Drive 1 should clear BSY before asserting PDIAG-. If Drive 1 is present then Drive 0 shall wait for up to 6 seconds from the receipt of a valid Execute Drive Diagnostics command for Drive 1 to assert PDIAG-. If Drive 1 fails to assert PDIAG-, Drive 0 shall set bit 7 to 1 in the Error Register to indicate that Drive 1 failed.

working draft AT Attachment Interface for Disk Drives

If DASP- was not asserted by Drive 1 during reset initialization, Drive 0 shall post its own status immediately after it completes diagnostics, and clear the Drive 1 Status Register to 00h. Drive 0 may be unable to accept commands until it has finished its reset procedure and is Ready (DRDY=1).

6.3.14 RESET- (Drive reset)

This signal from the host system shall be asserted for at least 25 usec after voltage levels have stabilized during power on and negated thereafter unless some event requires that the drive(s) be reset following power on.

6.3.15 SPSYNC:CSEL (Spindle synchronization/cable select) (Optional)

This signal shall have a 10K ohm pull-up resistor.

This is a dual purpose signal and either or both functions may be implemented. If both functions are implemented then they cannot be active concurrently: the choice as to which is active is made by a vendor-defined switch.

All drives connected to the same cable should have the same function active at the same time. If SPSYNC and CSEL are mixed on the same cable, then drive behavior is undefined.
Prior to the introduction of this standard, this signal was defined as DALE (Drive Address Latch Enable), and used for an address valid indication from the host system. If used, the host address and chip selects, DA0 through DA2, CS1FX-, and CS3FX- were valid at the negation of this signal and remained valid while DALE was negated, therefore, the drive did not need to latch these signals with DALE.

6.3.16 SPSYNC (Spindle synchronization) (Optional)

This signal may be either input or output to the drive depending on a vendor-defined switch. If a drive is set to Master the signal is output, and if a drive is set to slave the signal is input.

There is no requirement that each drive implementation be plug-compatible to the extent that a multiple vendor drive subsystem be operable. Mix and match of different manufacturers drives is unlikely because rpm, sync fields, sync bytes etc need to be virtually identical. However, if drives are designed to match the following recommendation, controllers can operate drives with a single implementation.

There can only be one master drive at a time in a configuration. The host or the drive designated as master can generate SPSYNC at least once per rotation, but may be at a higher frequency.

SPSYNC received by a drive is used as the synchronization signal to lock the spindles in step. The time to achieve synchronization varies, and is indicated by the drive setting DRDY i.e. if the drive does not achieve synchronization following power on or a reset, it shall not set DRDY.

A master drive or the host generates SPSYNC and transmits it.

A slave drive does not generate SPSYNC and is responsible to synchronize its index to SPSYNC.

If a drive does not support synchronization, it shall ignore SPSYNC.

In the event that a drive previously synchronized loses synchronization, but is otherwise operational, it does not clear DRDY.

X3T9.2/791D revision 4

6.3.17 CSEL (Cable select) (Optional)

The drive is configured as either Drive 0 or Drive 1 depending upon the value of CSEL:
- If CSEL is grounded then the drive address is 0
- If CSEL is open then the drive address is 1

Special cabling can be used by the system manufacturer to selectively ground CSEL e.g. CSEL of Drive 0 is connected to the CSEL conductor in the cable, and is grounded, thus allowing the drive to recognize itself as Drive 0. CSEL of Drive 1 is not connected to CSEL because the conductor is removed, thus the drive can recognize itself as Drive 1.

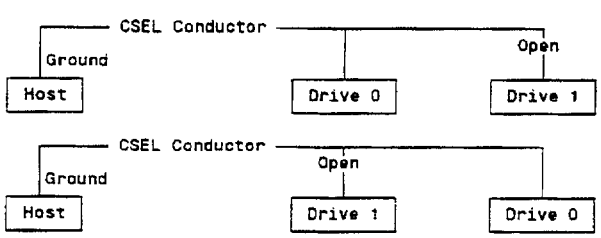

Figure 5 - Cable select

7 Logical interface

7.1 General

7.1.1 Bit conventions

Bit names are shown in all upper case letters except where a lower case n precedes a bit name. This indicates that when nBIT=0 (bit is zero) the action is true and when nBIT=1 (bit is one) the action is false. If there is no preceding n, then when BIT=1 it is true, and when BIT=0 it is false.

A bit can be set to one or cleared to zero and polarity influences whether it is to be interpreted as true or false:

|       | BIT   | nBIT  |
|-------|-------|-------|
| True  | BIT=1 | nBIT=0 |
| False | BIT=0 | nBIT=1 |

7.1.2 Environment

The drives using this interface shall be programmed by the host computer to perform commands and return status to the host at command completion. When two drives are daisy chained on the interface, commands are written in parallel to both drives, and for all except the Execute Diagnostics command, only the selected drive executes the command. On an Execute Diagnostics command addressed to Drive 0, both drives shall execute the command, and Drive 1 shall post its status to Drive 0 via PDIAG-.

Drives are selected by the DRV bit in the Drive/Head Register (see 7.2.8), and by a jumper or switch on the drive designating it as either a Drive 0 or as Drive 1. When DRV=0, Drive 0 is selected. When DRV=1, Drive 1 is X3T9.2/791D revision 4 selected. When drives are daisy chained, one shall be set as Drive 0 and the other as Drive 1. When a single drive is attached to the interface it shall be set as Drive 0.

Prior to the adoption of this standard, some drives may have provided jumpers to indicate Drive 0 with no Drive 1 present, or Drive 0 with Drive 1 present. Throughout this document, drive selection always refers to the state of the DRV bit, the position of the Drive 0/Drive 1 jumper or switch, or use of the CSEL pin.

A drive can operate in either of two addressing modes, CHS or LBA, on a command by command basis. A drive which can support LBA mode indicates this in the Identify Drive Information. If the host selects LBA mode in the Drive/Head register, Sector Number, Cylinder Low, Cylinder High and HS3-HS0 of the Drive/Head Register contains the zero based-LBA.

In LBA mode, the sectors on the drive are assumed to be linearly mapped with an initial definition of:
LBA 0 = Cylinder 0/head 0/sector 1.

Irrespective of translate mode geometry set by the host, the LBA address of a given sector does not change:
LBA = [ (Cylinder * no of heads + heads) * sectors/track ] + (Sector-1)

7.2 I/O register descriptions

Communication to or from the drive is through an I/O Register that routes the input or output data to or from registers (selected) by a code on signals from the host (CS1FX-, CS3FX-, DA2, DA1, DA0, DIOR- and DIOW-).*

The Command Block Registers are used for sending commands to the drive or posting status from the drive.

The Control Block Registers are used for drive control and to post alternate status.

Table 6 lists these registers and the addresses that select them.

Logic conventions are:   A = signal asserted
N = signal negated
x = does not matter which it is working draft AT Attachment Interface for Disk Drives X3T9.2/791D revision 4

Table 6 - I/O port functions/selection addresses

| Addresses | | | | | Functions | |
|---|---|---|---|---|---|---|
| CS1FX- | CS3FX- | DA2 | DA1 | DA0 | READ (DIOR-) | WRITE (DIOW-) |
| | | | | | Control block registers | |
| N | N | x | x | x | Data bus high imped | Not used |
| N | A | 0 | x | x | Data bus high imped | Not used |
| N | A | 1 | 0 | x | Data bus high imped | Not used |
| N | A | 1 | 1 | 0 | Alternate status | Device control |
| N | A | 1 | 1 | 1 | Drive address | Not used |
| | | | | | Command block registers | |
| A | N | 0 | 0 | 0 | Data | Data |
| A | N | 0 | 0 | 1 | Error register | Features |
| A | N | 0 | 1 | 0 | Sector count | Sector count |
| A | N | 0 | 1 | 1 | Sector number | Sector number |
| A | N | 0 | 1 | 1 | * LBA bits 0- 7 | * LBA bits 0- 7 |
| A | N | 1 | 0 | 0 | Cylinder low | Cylinder low |
| A | N | 1 | 0 | 0 | * LBA bits 8-15 | * LBA bits 8-15 |
| A | N | 1 | 0 | 1 | Cylinder high | Cylinder high |
| A | N | 1 | 0 | 1 | * LBA bits 16-23 | * LBA bits 16-23 |
| A | N | 1 | 1 | 0 | Drive/head | Drive/head |
| A | N | 1 | 1 | 0 | * LBA bits 24-27 | * LBA bits 24-27 |
| A | N | 1 | 1 | 1 | Status | Command |
| A | A | x | x | x | Invalid address | Invalid address |
| * Mapping of registers in LBA mode | | | | | | |

7.2.1 Alternate status register

This register contains the same information as the Status Register in the command block. The only difference being that reading this register does not imply interrupt acknowledge or clear a pending interrupt.

| 7 | 6 | 5 | 4 | 3 | 2 | 1 | 0 |
|---|---|---|---|---|---|---|---|
| BSY | DRDY | DWF | DSC | DRQ | CORR | IDX | ERR |

See 7.2.13 for definitions of the bits in this register.

7.2.2 Command register

This register contains the command code being sent to the drive. Command execution begins immediately after this register is written. The executable commands, the command codes, and the necessary parameters for each command are listed in table 9.

7.2.3 Cylinder high register

This register contains the high order bits of the starting cylinder address for any disk access. At the end of the command, this register is updated to reflect the current cylinder number. The most significant bits of the cylinder address shall be loaded into the cylinder high Register.

In LBA Mode this register contains Bits 16-23. At the end of the command, this register is updated to reflect the current LBA Bits 16-23.

working draft AT Attachment Interface for Disk Drives

X3T9.2/791D revision 4

NOTE 4 Prior to the introduction of this standard, only the lower 2 bits of this register were valid, limiting cylinder address to 10 bits i.e. 1024 cylinders.

7.2.4 Cylinder low register

This register contains the low order 8 bits of the starting cylinder address for any disk access. At the end of the command, this register is updated to reflect the current cylinder number.

In LBA Mode this register contains Bits 8-15. At the end of the command, this register is updated to reflect the current LBA Bits 8-15.

7.2.5 Data register

This 16-bit register is used to transfer data blocks between the device data buffer and the host. It is also the register through which sector information is transferred on a Format Track command. Data transfers may be either PIO or DMA.

7.2.6 Device control register

The bits in this register are as follows:

| 7 | 6 | 5 | 4 | 3 | 2 | 1 | 0 |
|---|---|---|---|---|---|---|---|
| x | x | x | x | 1 | SRST | nIEN | 0 |

- SRST is the host software reset bit. The drive is held reset when this bit is set. If two disk drives are daisy chained on the interface, this bit resets both simultaneously. Drive 1 is not required to execute the DASP-handshake procedure.

- nIEN is the enable bit for the drive interrupt to the host. When nIEN=0, and the drive is selected, INTRQ shall be enabled through a tri-state buffer. When nIEN=1, or the drive is not selected, the INTRQ signal shall be in a high impedance state.

7.2.7 Drive address register

This register contains the inverted drive select and head select addresses of the currently selected drive. The bits in this register are as follows:

| 7 | 6 | 5 | 4 | 3 | 2 | 1 | 0 |
|---|---|---|---|---|---|---|---|
| HiZ | nWTG | nHS3 | nHS2 | nHS1 | nHS0 | nDS1 | nDS0 |

- HiZ shall always be in a high impedance state.
- nWTG is the Write Gate bit. When writing to the disk drive is in progress, nWTG=0.
- nHS3 through nHS0 are the one's complement of the binary coded address of the currently selected head. For example, if nHS3 through nHS0 are 1100b, respectively, head 3 is selected. nHS3 is the most significant bit.
- nDS1 is the drive select bit for drive 1. When drive 1 is selected and active, nDS1=0.
- nDS0 is the drive select bit for drive 0. When drive 0 is selected and active, nDS0=0.

working draft AT Attachment Interface for Disk Drives

X3T9.2/791D revision 4

NOTE 5 Care should be used when interpreting these bits, as they do not always represent the expected status of drive operations at the instant the status was put into this register. This is because of the use of caching, translate mode and the Drive 0/Drive 1 concept with each drive having its own embedded controller.

7.2.8 Drive/head register

This register contains the drive and head numbers. The contents of this register define the number of heads minus 1, when executing an Initialize Drive Parameters command.

| 7 | 6 | 5 | 4 | 3 | 2 | 1 | 0 |
|---|---|---|---|---|---|---|---|
| 1 | L | 1 | DRV | HS3 | HS2 | HS1 | HS0 |

- L is the binary encoded address mode select. When L=0, addressing is by CHS mode. When L=1, addressing is by LBA mode.
- DRV is the binary encoded drive select number. When DRV=0, Drive 0 is selected. When DRV=1, Drive 1 is selected.
- If L=0, HS3 through HS0 contain the binary coded address of the head to be selected e.g. if HS3 through HS0 are 0011b, respectively, head 3 will be selected. HS3 is the most significant bit. At command completion, these bits are updated to reflect the currently selected head.
- If L=1, HS3 through HS0 contain bits 24-27 of the LBA. At command completion, these bits are updated to reflect the current LBA bits 24-27.

7.2.9 Error register

This register contains status from the last command executed by the drive or a Diagnostic Code.

At the completion of any command except Execute Drive Diagnostic, the contents of this register are valid when ERR=1 in the Status Register.

Following a power on, a reset, or completion of an Execute Drive Diagnostic command, this register contains a Diagnostic Code (see table 10).

| 7 | 6 | 5 | 4 | 3 | 2 | 1 | 0 |
|---|---|---|---|---|---|---|---|
| BBK | UNC | MC | IDNF | MCR | ABRT | TKONF | AMNF |

- BBK (Bad Block Detected) indicates a bad block mark was detected in the requested sector's ID field.
- UNC (Uncorrectable Data Error) indicates an uncorrectable data error has been encountered.
- MC (Media Changed) indicates that the removable media has been changed i.e. there has been a change in the ability to access the media.
- IDNF (ID Not Found) indicates the requested sector's ID field could not be found.
- ABRT (Aborted Command) indicates the requested command has been aborted due to a drive status error (Not Ready, Write Fault, etc.) or because the command code is invalid.
- MCR (Media Change Requested) indicates that the release latch on a removable media drive has been pressed. This means that the user wishes to remove the media and requires an action of some kind e.g. have software issue a Media Eject or Door Unlock command.
- TKONF (Track 0 Not Found) indicates track 0 has not been found during a Recalibrate command.

X3T9.2/791D revision 4

- AMNF (Address Mark Not Found) indicates the data address mark has not been found after finding the correct ID field.

7.2.10 Features register

This register is command specific and may be used to enable and disable features of the interface e.g. by the Set Features Command to enable and disable caching.

This register may be ignored by some drives.

Some hosts, based on definitions prior to the completion of this standard, set values in this register to designate a recommended Write Precompensation Cylinder value.

7.2.11 Sector count register

This register contains the number of sectors of data requested to be transferred on a read or write operation between the host and the drive. If the value in this register is zero, a count of 256 sectors is specified.

If this register is zero at command completion, the command was successful. If not successfully completed, the register contains the number of sectors which need to be transferred in order to complete the request.

The contents of this register may be defined otherwise on some commands e.g. Initialize Drive Parameters, Format Track or Write Same commands.

7.2.12 Sector number register

This register contains the starting sector number for any disk data access for the subsequent command. The sector number may be from 1 to the maximum number of sectors per track.

In LBA Mode this register contains Bits 0-7. At the end of the command, this register is updated to reflect the current LBA Bits 0-7.

See the command descriptions for contents of the register at command completion (whether successful or unsuccessful).

7.2.13 Status register

This register contains the drive status. The contents of this register are updated at the completion of each command. When BSY is cleared, the other bits in this register shall be valid within 400 nsec. If BSY=1, no other bits in this register are valid. If the host reads this register when an interrupt is pending, it is considered to be the interrupt acknowledge. Any pending interrupt is cleared whenever this register is read.

NOTE 6 If Drive 1 is not detected as being present. Drive 0 clears the Drive 1 Status Register to 00h (indicating that the drive is Not Ready).

| 7 | 6 | 5 | 4 | 3 | 2 | 1 | 0 |
|---|---|---|---|---|---|---|---|
| BSY | DRDY | DWF | DSC | DRQ | CORR | IDX | ERR |

NOTE 7 Prior to the definition of this standard, DRDY and DSC were unlatched real time signals.

working draft AT Attachment Interface for Disk Drives

X3T9.2/791D revision 4

- BSY (Busy) is set whenever the drive has access to the Command Block Registers. The host should not access the Command Block Register when BSY=1. When BSY=1, a read of any Command Block Register shall return the contents of the Status Register. This bit is set by the drive (which may be able to respond at times when the media cannot be accessed) under the following circumstances:
    a) within 400 nsec after the negation of RESET- or after SRST has been set in the Device Control Register. Following acceptance of a reset it is recommended that BSY be set for no longer than 30 seconds by Drive 1 and no longer than 31 seconds by Drive 0.
    b) within 400 nsec of a host write of the Command Register with a Read, Read Long, Read Buffer, Seek, Recalibrate, Initialize Drive Parameters, Read Verify, Identify Drive, or Execute Drive Diagnostic command.
    c) within 5 usecs following transfer of 512 bytes of data during execution of a Write, Format Track, or Write Buffer command, or 512 bytes of data and the appropriate number of ECC bytes during the execution of a Write Long command.
- DRDY (Drive Ready) indicates that the drive is capable of responding to a command. When there is an error, this bit is not changed until the Status Register is read by the host, at which time the bit again indicates the current readiness of the drive. This bit shall be cleared at power on and remain cleared until the drive is ready to accept a command.
- DWF (Drive Write Fault) indicates the current write fault status. When an error occurs, this bit shall not be changed until the Status Register is read by the host, at which time the bit again indicates the current write fault status.
- DSC (Drive Seek Complete) indicates that the drive heads are settled over a track. When an error occurs, this bit shall not be changed until the Status Register is read by the host, at which time the bit again indicates the current Seek Complete status.
- DRQ (Data Request) indicates that the drive is ready to transfer a word or byte of data between the host and the drive.
- CORR (Corrected Data) indicates that a correctable data error was encountered and the data has been corrected. This condition does not terminate a data transfer.
- IDX (Index) is set once per disk revolution.
- ERR (Error) indicates that an error occurred during execution of the previous command. The bits in the Error Register have additional information regarding the cause of the error.

8 Programming requirements

8.1 Reset response

A reset is accepted within 400 nsec after the negation of RESET- or within 400 nsec after SRST has been set in the Device Control Register.

When the drive is reset by RESET-, Drive 1 shall indicate it is present by asserting DASP- within 400 msec, and DASP- shall remain asserted for 30 seconds or until Drive 1 accepts the first command. See also 6.3.4 and 6.3.13.

When the drive is reset by SRST, the drive shall set BSY=1.

See also 7.2.6.

When a reset is accepted, and with BSY set:
   a) Both drives perform any necessary hardware initialization
   b) Both drives clear any previously programmed drive parameters
   c) Both drives may revert to the default condition
   d) Both drives load the Command Block Registers with their default values
   e) If a hardware reset, Drive 0 waits for DASP- to be asserted by Drive 1

X3T9.2/791D revision 4 f) If operational, Drive 1 asserts DASP-
g) Drive 0 waits for PDIAG- to be asserted if Drive 1 asserts DASP-
h) If operational, Drive 1 clears BSY
i) If operational, Drive 1 asserts PDIAG-
j) Drive 0 clears BSY No interrupt is generated when initialization is complete.

The default values for the Command Block Registers if no self-tests are performed or if no errors occurred are:

| | | | |
|---|---|---|---|
| Error | = 01h | Cylinder Low | = 00h |
| Sector Count | = 01h | Cylinder High | = 00h |
| Sector Number | = 01h | Drive/Head | = 00h |

The Error Register shall contain a Diagnostic Code (see table 10) if a self-test is performed.

Following any reset, the host should issue an Initialize Drive Parameters command to ensure the drive is initialized as desired.

There are three types of reset in ATA. The following is a suggested method of classifying reset actions:

- Power On Reset: the drive executes a series of electrical circuitry diagnostics, spins up the HDA, tests speed and other mechanical parametrics, and sets default values.
- Hardware Reset: the drive executes a series of electrical circuitry diagnostics, and resets to default values.
- Software Reset: the drive resets the interface circuitry according to the Set Features requirement (See 9.21)

8.2 Translate mode

The cylinder, head and sector geometry of the drive as presented to the host may differ from the actual physical geometry. Translate mode is an optional and device specific means of mapping between the two.

8.3 Power conditions

Optional power commands permit the host to modify the behavior of the drive in a manner which reduces the power required to operate.

Table 7 - Power conditions

| Mode | SRST | BSY | DRDY | Interface active | Media |
|---|---|---|---|---|---|
| Sleep | * | x | x | * | 0 |
| Standby | x | 0 | 1 | Yes | 0 |
| Idle | x | 0 | 1 | Yes | 1 |
| Active | x | x | x | Yes | 1 |
| 1 = Active | | 0 = Inactive | | * See 9.23 | |

The lowest power consumption when the drive is powered on occurs in Sleep mode. When in Sleep mode, the drive requires a reset to be activated (see 9.23). The time to respond could be as long as 30 seconds or more.

X3T9.2/791D revision 4

In Standby mode the drive interface is capable of accepting commands, but as the media is not immediately accessible, it could take the drive as long as 30 seconds or more to respond.

In Idle mode the drive is capable of responding immediately to media access requests. A drive in Idle mode may take longer to complete the execution of a command because it may have to activate some circuitry.

In Active mode the drive is capable of responding immediately to media access requests, and commands complete execution in the shortest possible time.

Ready is not a power condition. A drive may post ready at the interface even though the media may not be accessible.

See specific power-related commands.

8.4 Error posting

The errors that are valid for each command are defined in table 8. It is not a requirement that all valid conditions be implemented. See 7.2.9 and 7.2.13 for the definition of the Error Register and Status Register bits.

X3T9.2/791D revision 4

Table 8 - Register contents

|  | Error register | | | | | | Status register | | | | |
|---|---|---|---|---|---|---|---|---|---|---|---|
|  | BBK | UNC | IDNF | ABRT | TKONF | AMNF | DRDY | DWF | DSC | CORR | ERR |
| Acknowledge media chge |  |  |  | V |  |  |  |  |  |  | V |
| Boot - post-boot |  |  |  | V |  |  |  |  |  |  | V |
| Boot - pre-boot |  |  |  | V |  |  |  |  |  |  | V |
| Check power mode |  |  |  | V |  |  | V | V | V |  | V |
| Door lock |  |  | V | V |  |  | V |  |  |  | V |
| Door unlock |  |  |  | V |  |  |  |  |  |  | V |
| Execute drive diags | See 9.7 | | | | | |  |  |  |  | V |
| Format track |  |  | V | V |  |  | V | V | V |  | V |
| Identify drive |  |  |  | V |  |  | V | V | V |  | V |
| Idle |  |  |  | V |  |  | V | V | V |  | V |
| Idle immediate |  |  |  | V |  |  | V | V | V |  | V |
| Initialize drive parms |  |  |  |  |  |  | V | V | V |  |  |
| NOP |  |  |  | V |  |  |  |  |  |  | V |
| Read buffer |  |  |  | V |  |  | V | V | V |  | V |
| Read DMA | V | V | V | V |  | V | V | V | V | V | V |
| Read long | V |  | V | V |  | V | V | V | V |  | V |
| Read multiple | V | V | V | V |  | V | V | V | V | V | V |
| Read sector(s) | V | V | V | V |  | V | V | V | V | V | V |
| Read verify sector(s) | V | V | V | V |  | V | V | V | V | V | V |
| Recalibrate |  |  |  | V |  |  | V | V | V |  | V |
| Seek |  |  | V | V | V |  | V | V | V |  | V |
| Set features |  |  |  | V |  |  | V | V | V |  | V |
| Set multiple mode |  |  |  | V |  |  | V | V | V |  | V |
| Sleep |  |  |  | V |  |  | V | V | V |  | V |
| Standby |  |  |  | V |  |  | V | V | V |  | V |
| Standby immediate |  |  |  | V |  |  | V | V | V |  | V |
| Write buffer |  |  |  | V |  |  | V | V | V |  | V |
| Write DMA | V |  | V | V |  |  | V | V | V |  | V |
| Write long | V |  | V | V |  |  | V | V | V |  | V |
| Write multiple | V |  | V | V |  |  | V | V | V |  | V |
| Write same | V |  | V | V |  |  | V | V | V |  | V |
| Write sector(s) | V |  | V | V |  |  | V | V | V |  | V |
| Write verify | V | V | V | V |  | V | V | V | V | V | V |
| Invalid command code |  |  |  | V |  |  | V | V | V |  | V |
| V = valid on this command | | | | | | | | | | | |

9 Command descriptions

Commands are issued to the drive by loading the pertinent registers in the command block with the needed parameters, and then writing the command code to the Command Register.

The manner in which a command is accepted varies. There are three classes (see table 9) of command acceptance, all predicated on the fact that to receive a command, BSY=0:
- Upon receipt of a Class 1 command, the drive sets BSY within 400 nsec.
- Upon receipt of a Class 2 command, the drive sets BSY within 400 nsec, sets up the sector buffer for a write operation, sets DRQ within 700 usec, and clears BSY within 400 nsec of setting DRQ.
- Upon receipt of a Class 3 command, the drive sets BSY within 400 nsec, sets up the sector buffer for a write operation, sets DRQ within 20 msec, and clears BSY within 400 nsec of setting DRQ.

NOTE 8 DRQ may be set so quickly on Class 2 and Class 3 that the BSY transition is too short for BSY=1 to be recognized.

working draft AT Attachment Interface for Disk Drives

X3T9.2/791D revision 4

The drive shall implement all mandatory commands as identified by an M, and may implement the optional commands identified by an O, in table 9. V indicates a Vendor Specific command code.

If a new command is issued to a drive which has an uncompleted command (subsequently referred to as Old_Command) in progress, the drive shall immediately respond to the new command (Subsequently referred to as New_Command), even if execution of the Old_Command could have been completed.

There shall be no indication given to the system as to the status of the Old_Command which was being executed at the time the New_Command was issued.

X3T9.2/791D revision 4

Table 9 - Command codes and parameters

| Class | | | Command code | Parameters used | | | | |
|---|---|---|---|---|---|---|---|---|
| | | | | FR | SC | SN | CY | DH |
| 1 | Acknowledge media chge | O | DBh | | | | | D |
| 1 | Boot - post-boot | O | DCh | | | | | D |
| 1 | Boot - pre-boot | O | DDh | | | | | D |
| 1 | Check power mode | O | 98h E5h | | y | | | D |
| 1 | Door lock | O | DEh | | | | | D |
| 1 | Door unlock | O | DFh | | | | | D |
| 1 | Execute drive diagnostic | M | 90h | | | | | D* |
| 2 | Format track | M | 50h | * | y | | y | y |
| 1 | Identify drive | O | ECh | | | | | D |
| 1 | Idle | O | 97h E3h | | y | | | D |
| 1 | Idle immediate | O | 95h E1h | | | | | D |
| 1 | Initialize drive parameters | M | 91h | | y | | | y |
| 1 | NOP | O | 00h | | | | | D |
| 1 | Read buffer | O | E4h | | | | | D |
| 1 | Read DMA (w/retry) | O | C8h | | y | y | y | y |
| 1 | Read DMA (w/o retry) | O | C9h | | y | y | y | y |
| 1 | Read long (w/retry) | M | 22 | | y | y | y | y |
| 1 | Read long (w/o retry) | M | 23 | | y | y | y | y |
| 1 | Read multiple | O | C4h | | y | y | y | y |
| 1 | Read sector(s) (w/retry) | M | 20 | | y | y | y | y |
| 1 | Read sector(s) (w/o retry) | M | 21 | | y | y | y | y |
| 1 | Read verify sector(s) (w/retry) | M | 40 | | y | y | y | y |
| 1 | Read verify sector(s) (w/o retry) | M | 41 | | y | y | y | y |
| 1 | Recalibrate | M | 1xh | | | | | D |
| 1 | Seek | M | 7xh | | | y | y | y |
| 1 | Set features | O | EFh | y | | | | D |
| 1 | Set multiple mode | O | C6h | | y | | | D |
| 1 | Sleep | O | 99h E6h | | | | | D |
| 1 | Standby | O | 96h E2h | | y | | | D |
| 1 | Standby immediate | O | 94h E0h | | | | | D |
| 2 | Write buffer | O | E8h | | | | | D |
| 3 | Write DMA (w/retry) | O | CAh | | y | y | y | y |
| 3 | Write DMA (w/o retry) | O | CBh | | y | y | y | y |
| 2 | Write long (w/retry) | M | 32 | * | y | y | y | y |
| 2 | Write long (w/o retry) | M | 33 | * | y | y | y | y |
| 3 | Write multiple | O | C5h | | y | y | y | y |
| 3 | Write same | O | E9h | y | y | y | y | y |
| 2 | Write sector(s) (w/retry) | M | 30 | * | y | y | y | y |
| 2 | Write sector(s) (w/o retry) | M | 31 | * | y | y | y | y |
| 3 | Write verify | O | 3Ch | * | y | y | y | y |
| | Vendor unique | V | 9Ah | | | | | |
| | Vendor unique | V | C0-C3h | | | | | |
| | Vendor unique | V | 8xh | | | | | |
| | Vendor unique | V | F0h-FFh | | | | | |
| | Reserved: all remaining codes | | | | | | | |

CY = Cylinder registers        SC = Sector count register
DH = Drive/head register       SN = Sector number register
FR = Features register (see command descriptions for use)
y - the register contains a valid parameter for this command
    For the drive/head register, y means both the drive and
    head parameters are used.
D - only the drive parameter is valid and not the head parameter.
D* - Addressed to drive 0 but both drives execute it.
* - Maintained for compatibility (see 7.2.9)

working draft AT Attachment Interface for Disk Drives

X3T9.2/791D revision 4

9.1 Acknowledge media change (removable)

If the drive is operating in a mode which requires that the operating system acknowledge a media change, this command clears the Media Change Error so that normal operation can resume. If the drive is not operating in such a mode, this command returns an Abort error.

9.2 Boot - post-boot (removable)

This command provides a means to send vendor-specific information that may be required in order to pass diagnostics which are applicable to non-removable disk drives.

9.3 Boot - pre-boot (removable)

This command is issued to prepare a removable drive to respond to boot.

9.4 Check power mode

This command checks the power mode.

If the drive is in, going to, or recovering from the Standby Mode the drive shall set BSY, set the Sector Count Register to 00h, clear BSY, and generate an interrupt.

If the drive is in the Idle Mode, the drive shall set BSY, set the Sector Count Register to FFh, clear BSY, and generate an interrupt.

9.5 Door lock (removable)

This command locks the door if the drive is Ready and unlocked, otherwise it responds with Not Ready.

9.6 Door unlock (removable)

This command unlocks the door if the drive is Ready and locked, otherwise it responds with Not Ready.

9.7 Execute drive diagnostic

This command shall perform the internal diagnostic tests implemented by the drive. See also 6.3.4 and 6.3.13. The DRV bit is ignored. Both drives, if present, shall execute this command.

If Drive 1 is present:
- Drive 1 asserts PDIAG- within 5 seconds.
- Drive 0 waits up to 6 seconds for Drive 1 to assert PDIAG-.
- If Drive 1 has not asserted PDIAG-, indicating a failure, Drive 0 shall append 80h to its own diagnostic status.
- Both drives shall execute diagnostics.
- If Drive 1 diagnostic failure is detected when Drive 0 status is read, Drive 1 status is obtained by setting the DRV bit, and reading status.

working draft AT Attachment Interface for Disk Drives

X3T9.2/791D revision 4

If there is no Drive 1 present:
- Drive 0 posts only its own diagnostic results.
- Drive 0 clears BSY, and generates an interrupt.

The Diagnostic Code written to the Error Register is a unique 8-bit code as shown in table 10, and not as the single bit flags defined in 7.2.9.

If Drive 1 fails diagnostics, Drive 0 "ORs" 80h with its own status and loads that code into the Error Register. If Drive 1 passes diagnostics or there is no Drive 1 connected, Drive 0 "ORs" 00h with its own status and loads that code into the Error Register.

Table 10 - Diagnostic codes

| Code | |
|------|---|
| 01h | No error detected |
| 02h | Formatter device error |
| 03h | Sector buffer error |
| 04h | ECC circuitry error |
| 05h | Controlling microprocessor error |
| 8xh | Drive 1 failed |

9.8 Format track

The implementation of the Format Track command is vendor specific. The actions may be a physical reformatting of a track, initializing the data field contents to some value, or doing nothing.

The Sector Count Register contains the number of sectors per track.

The track address is specified in the Cylinder High and Cylinder Low Registers, and the number of sectors is specified in the Sector Count Register. When the command is accepted, the drive sets the DRQ bit and waits for the host to fill the sector buffer. When the sector buffer is full, the drive clears DRQ, sets BSY and begins command execution.

The contents of the sector buffer shall not be written to the media, and may be either ignored or interpreted as follows:

| DD15 ---- DD0 | | DD15 ---- DD0 | |
|---|---|---|---|
| First sector descriptor | : : : : : | Last sector descriptor | Remainder of buffer filled with zeros |

One 16-bit word represents each sector, the words being contiguous from the start of a sector. Any words remaining in the buffer after the representation of the last sector are filled with zeros. DD15-8 contain the sector number. If an interleave is specified, the words appear in the same sequence as they appear on the track. DD7-0 contain a descriptor value defined as follows:
  00h - Format sector as good
  20h - Unassign the alternate location for this sector
  40h - Assign this sector to an alternate location
  80h - Format sector as bad working draft AT Attachment Interface for Disk Drives

X3T9.2/791D revision 4

NOTE 9 Some users of the ATA drive expect the operating system partition table to be erased on a Format command. It is recommended that a drive which does not perform a physical format of the track, write a data pattern of all zeros to the sectors which have been specified by the Format Track command.

NOTE 10 It is recommended that implementors resassign data blocks which show repeated errors.

9.9 Identify drive

The Identify Drive command enables the host to receive parameter information from the drive. When the command is issued, the drive sets BSY, stores the required parameter information in the sector buffer, sets DRQ, and generates an interrupt. The host then reads the information out of the sector buffer. The parameter words in the buffer have the arrangement and meanings defined in Table 11. All reserved bits or words shall be zero.

X3T9.2/791D revision 4

Table 11 - Identify drive information

| Word | |
|---|---|
| 0 | General configuration bit-significant information:<br>  15  0   reserved for non-magnetic drives<br>  14  1=format speed tolerance gap required<br>  13  1=track offset option available<br>  12  1=data strobe offset option available<br>  11  1=rotational speed tolerance is > 0,5%<br>  10  1=disk transfer rate > 10 Mbs<br>    9  1=disk transfer rate > 5Mbs but <= 10Mbs<br>    8  1=disk transfer rate <= 5Mbs<br>    7  1=removable cartridge drive<br>    6  1=fixed drive<br>    5  1=spindle motor control option implemented<br>    4  1=head switch time > 15 usec<br>    3  1=not MFM encoded<br>    2  1=soft sectored<br>    1  1=hard sectored<br>    0  0=reserved |
| 1 | Number of cylinders |
| 2 | Reserved |
| 3 | Number of heads |
| 4 | Number of unformatted bytes per track |
| 5 | Number of unformatted bytes per sector |
| 6 | Number of sectors per track |
| 7-9 | Vendor unique |
| 10-19 | Serial number (20 ASCII characters, 0000h=not specified) |
| 20 | Buffer type |
| 21 | Buffer size in 512 byte increments (0000h=not specified) |
| 22 | # of ECC bytes avail on read/write long cmds (0000h=not spec'd) |
| 23-26 | Firmware revision (8 ASCII characters, 0000h=not specified) |
| 27-46 | Model number (40 ASCII characters, 0000h=not specified) |
| 47 | 15-8  Vendor unique<br>7-0   00h = Read/write multiple commands not implemented<br>       xxh = Maximum number of sectors that can be transferred<br>           per interrupt on read and write multiple commands |
| 48 | 0000h = cannot perform doubleword I/O    Included for backwards<br>0001h = can perform doubleword I/O       Compatible VU use |
| 49 | Capabilities<br>15-10  0=reserved<br>    9  1=LBA supported<br>    8  1=DMA supported<br>7- 0  Vendor unique |
| 50 | Reserved |
| 51 | 15-8  PIO data transfer cycle timing mode<br>7-0   Vendor unique |
| 52 | 15-8  DMA data transfer cycle timing mode<br>7-0   Vendor unique |
| 53 | 15-1  Reserved<br>    0  1=the fields reported in words 54-58 are valid<br>       0=the fields reported in words 54-58 may be valid |
| 54 | Number of current cylinders |
| 55 | Number of current heads |
| 56 | Number of current sectors per track |
| 57-58 | Current capacity in sectors |
| 59 | 15-9  Reserved<br>    8  1 = Multiple sector setting is valid<br>7-0   xxh = Current setting for number of sectors that can be<br>          transferred per interrupt on R/W multiple commands |
| 60-61 | Total number of user addressable sectors (LBA mode only) |
| 62 | 15-8  Single word DMA transfer mode active<br>7-0   Single word DMA transfer modes supported (see 11-3a) |
| 63 | 15-8  Multiword DMA transfer mode active<br>7-0   Multiword DMA transfer modes supported (see 11-3b) |
| 64-127 | Reserved |
| 128-159 | Vendor unique |
| 160-255 | Reserved | working draft AT Attachment Interface for Disk Drives

X3T9.2/791D revision 4

The fields described in 9.4.1 through 9.4.5 are not affected by the Initialize Drive Parameters command.

9.9.1 Word 1: Number of cylinders

The number of user-addressable cylinders in the default translation mode.

9.9.2 Word 3: Number of heads

The number of user-addressable heads in the default translation mode.

9.9.3 Word 4: Number of unformatted bytes per track

The number of unformatted bytes per translated track in the default translation mode.

9.9.4 Word 5: Number of unformatted bytes per sector

The number of unformatted bytes per sector in the default translation mode.

9.9.5 Word 6: Number of sectors per track

The number of user-addressable sectors per track in the default translation mode.

9.9.6 Word 10-19: Serial Number

The contents of this field are right justified and padded with spaces (20h).

9.9.7 Word 20: Buffer Type

The contents of the field are determined by the manufacturer.

| | |
|---|---|
| 000h | = not specified. |
| 0001h | = a single ported single sector buffer which is not capable of simultaneous data transfers to or from the host and the disk. |
| 0002h | = a dual ported multi-sector buffer capable of simultaneous data transfers to or from the host and the disk. |
| 0003h | = a dual ported multi-sector buffer capable of simultaneous transfers with a read caching capability. |
| 0004-FFFFh | = reserved |

These codes are typically not used by the operating system, however, they are useful for diagnostic programs which perform initialization routines e.g. a different interleave may be desirable for 0001h vs 0002h or 0003h.

9.9.8 Word 22: ECC bytes available on read/write long commands

If the contents of this field are set to a value other than 4, the only way to use this information is via the Set Features commands.

9.9.9 Word 23-26: Firmware revision

The contents of this field are left justified and padded with spaces (20h).

X3T9.2/791D revision 4

9.9.10 Word 27-46: Model number

The contents of this field are left justified and padded with spaces (20h).

9.9.11 Word 51: PIO data transfer cycle timing mode

The PIO transfer timing for each ATA device falls into categories which have unique parametric timing specifications. To determine the proper device timing category, compare the Cycle Time specified in figure 6 with the contents of this field. The value returned in Bits 15-8 should fall into one of the categories specified in figure 6, and if it does not, then Mode 0 shall be used to serve as the default timing.

9.9.12 Word 52: DMA data transfer cycle timing mode

The DMA transfer timing for each ATA device falls into categories which have unique parametric timing specifications. To determine the proper device timing category, compare the Cycle Time specified in figure 6 with the contents of this field. The value returned in Bits 15-8 should fall into one of the categories specified in figure 6, and if it does not, then Mode 0 shall be used to serve as the default timing.

The contents of this word shall be ignored if Words 62 or 63 are supported.

9.9.13 Word 54: Number of current cylinders

The number of user-addressable cylinders in the current translation mode.

9.9.14 Word 55: Number of current heads

The number of user-addressable heads in the current translation mode.

9.9.15 Word 56: Number of current sectors per track

The number of user-addressable sectors per track in the current translation mode.

9.9.16 Word 57-58: Current capacity in sectors

The current capacity in sectors excludes all sectors used for device-specific purposes. The number of sectors of available capacity may be calculated as:
  (Number of current cylinders * Number of current heads * Number of current sectors per track)

9.9.17 Word 59: Multiple sector setting

If the valid bit is set, then bits 7-0 reflect the number of sectors currently set to transfer on a Read or Write Multiple command.

9.9.18 Word 60-61: Total number of user addressable sectors

If the drive supports LBA Mode, these words reflect the total number of user addressable sectors. This value does not depend on the current drive geometry. If the drive does not support LBA mode, these words shall be set to 0.

working draft AT Attachment Interface for Disk Drives

X3T9.2/791D revision 4

9.9.19 Word 62: Single word DMA transfer

The low order byte identifies by bit all of the Modes which are supported e.g. if Mode 0 is supported, bit 0 is set. The high order byte contains a single bit set to indicate which mode is active.

9.9.20 Word 63: Multiword DMA transfer

The low order byte identifies by bit all of the Modes which are supported e.g. if Mode 0 is supported, bit 0 is set. The high order byte contains a single bit set to indicate which mode is active.

9.10 Idle

This command causes the drive to set BSY, enter the Idle Mode, clear BSY, and generate an interrupt. The interrupt is generated even though the drive may not have fully transitioned to Idle Mode.

If the drive is already spinning, the spinup sequence is not executed.

If the Sector Count Register is non-zero then the automatic power down sequence shall be enabled and the timer begins counting down immediately. If the Sector Count Register is zero then the automatic power down sequence shall be disabled.

9.11 Idle immediate

This command causes the drive to set BSY, enter the Idle Mode, clear BSY, and generate an interrupt. The interrupt is generated even though the drive may not have fully transitioned to Idle Mode.

9.12 Initialize drive parameters

This command enables the host to set the number of sectors per track and the number of heads minus 1, per cylinder. Upon receipt of the command, the drive sets BSY, saves the parameters, clears BSY, and generates an interrupt.

The only two register values used by this command are the Sector Count Register which specifies the number of sectors per track, and the Drive/Head Register which specifies the number of heads minus 1. The DRV bit designates these values to Drive 0 or Drive 1, as appropriate.

The sector count and head values are not checked for validity by this command. If they are invalid, no error will be posted until an illegal access is made by some other command.

9.13 NOP

This command enables a host which can only perform 16-bit register accesses to check drive status. The drive shall respond as it does to an unrecognized command by setting Abort in the Error Register, Error in the Status Register, clearing Busy in the Status Register, and asserting INTRQ.

> NOTE 11 When a 16-bit host writes to the Drive Head Register, one byte contains the Command Register, so the drive sees a new command when the intended purpose is only to select a drive. Both drives may be Busy but not necessarily Ready i.e. Drive 0 may be ready, but not drive 1. To check this possibility a typical sequence for an 8-bit host would be:
> a) Read the Status Register (wait until Busy False)
> b) Select the drive (write to the Drive Head Register)

working draft AT Attachment Interface for Disk Drives

X3T9.2/791D revision 4 c) Read the Status Register (wait until Busy False and Ready True)
    d) Send the command (write to the Command Register).

As a 16-bit host executes 2 and 4 simultaneously, a problem occurs if the drive being selected is Not Ready at the time the command is issued.

9.14 Read buffer

The Read Buffer command enables the host to read the current contents of the drive's sector buffer. When this command is issued, the drive sets BSY, sets up the sector buffer for a read operation, sets DRQ, clears BSY, and generates an interrupt. The host then reads up to 512 bytes of data from the buffer.

The Read Buffer and Write Buffer commands shall be synchronized such that sequential Write Buffer and Read Buffer commands access the same 512 bytes within the buffer.

9.15 Read DMA

This command executes in a similar manner to the Read Sectors command except for the following:
- the host initializes a slave-DMA channel prior to issuing the command
- data transfers are qualified by DMARQ and are performed by the slave-DMA channel
- the drive issues only one interrupt per command to indicate that data transfer has terminated and status is available.

Any unrecoverable error encountered during execution of a Read DMA command results in the termination of data transfer at the sector where the error was detected. The sector in error is not transferred. The drive generates an interrupt to indicate that data transfer has terminated and status is available. The error posting is the same as that of the Read Sectors command.

9.16 Read long

The Read Long command performs similarly to the Read Sectors command except that it returns the data and the ECC bytes contained in the data field of the desired sector. During a Read Long command, the drive does not check the ECC bytes to determine if there has been a data error. Only single sector read long operations are supported.

The transfer of the ECC bytes shall be 8-bits wide.

9.17 Read multiple command

The Read Multiple command performs similarly to the Read Sectors command. Interrupts are not generated on every sector, but on the transfer of a block which contains the number of sectors defined by a Set Multiple command.

Command execution is identical to the Read Sectors operation except that the number of sectors defined by a Set Multiple command are transferred without intervening interrupts. DRQ qualification of the transfer is required only at the start of the data block, not on each sector.

The block count of sectors to be transferred without intervening interrupts is programmed by the Set Multiple Mode command, which shall be executed prior to the Read Multiple command.

working draft AT Attachment Interface for Disk Drives

X3T9.2/791D revision 4

When the Read Multiple command is issued, the Sector Count Register contains the number of sectors (not the number of blocks or the block count) requested.

If the number of requested sectors is not evenly divisible by the block count, as many full blocks as possible are transferred, followed by a final, partial block transfer. The partial block transfer shall be for n sectors, where
   n = Remainder (sector count / block count)

If the Read Multiple command is attempted before the Set Multiple Mode command has been executed or when Read Multiple commands are disabled, the Read Multiple operation shall be rejected with an Aborted Command error.

Disk errors encountered during Read Multiple commands are posted at the beginning of the block or partial block transfer, but DRQ is still set and the data transfer shall take place as it normally would, including transfer of corrupted data, if any.

The contents of the Command Block Registers following the transfer of a data block which had a sector in error are undefined. The host should retry the transfer as individual requests to obtain valid error information.

Subsequent blocks or partial blocks are transferred only if the error was a correctable data error. All other errors cause the command to stop after transfer of the block which contained the error. Interrupts are generated when DRQ is set at the beginning of each block or partial block.

9.18 Read sector(s)

This command reads from 1 to 256 sectors as specified in the Sector Count register. A sector count of 0 requests 256 sectors. The transfer begins at the sector specified in the Sector Number Register. See 10.1 for the DRQ, IRQ and BSY protocol on data transfers.

If the drive is not already on the desired track, an implied seek is performed. Once at the desired track, the drive searches for the appropriate ID field.

If retries are disabled and two index pulses have occurred without error free reading of the requested ID, an ID Not Found error is posted.

If retries are enabled, up to a vendor specific number of attempts may be made to read the requested ID before posting an error.

If the ID is read correctly, the data address mark shall be recognized within a specified number of bytes, or the Address Mark Not Found error is posted.

DRQ is always set prior to data transfer regardless of the presence or absence of an error condition.

At command completion, the Command Block Registers contain the cylinder, head, and sector number of the last sector read.

If an error occurs, the read terminates at the sector where the error occurred. The Command Block Registers contain the cylinder, head, and sector number of the sector where the error occurred.

The flawed data is pending in the sector buffer.

X3T9.2/791D revision 4

9.19 Read verify sector(s)

This command is identical to the Read Sectors command, except that DRQ is never set, and no data is transferred to the host. See 10.3 for protocol. When the command is accepted, the drive sets BSY.

When the requested sectors have been verified, the drive clears BSY and generates an interrupt. Upon command completion, the Command Block Registers contain the cylinder, head, and sector number of the last sector verified.

If an error occurs, the verify terminates at the sector where the error occurs. The Command Block Registers contain the cylinder, head, and sector number of the sector where the error occurred. The Sector Count Register shall contain the number of sectors not yet verified.

9.20 Recalibrate

This command moves the read/write heads from anywhere on the disk to cylinder 0. Upon receipt of the command, the drive sets BSY and issues a seek to cylinder zero. The drive then waits for the seek to complete before updating status, clearing BSY and generating an interrupt.

If the drive cannot reach cylinder 0, a Track Not Found error is posted.

9.21 Seek

This command initiates a seek to the track and selects the head specified in the command block. The drive need not be formatted for a seek to execute properly. See 10.3 for protocol. The drive shall not set DSC=1 until the action of seeking has completed. The drive may return the interrupt before the seek is completed.

If another command is issued to the drive while a seek is being executed, the drive sets BSY=1, waits for the seek to complete, and then begins execution of the command.

9.22 Set features

This command is used by the host to establish the following parameters which affect the execution of certain drive features as shown in table 13.

working draft AT Attachment Interface for Disk Drives

X3T9.2/791D revision 4

Table 13 - Set feature register definitions

| | |
|---|---|
| 01h | Enable 8-bit data transfers (see 6.3.5) |
| 02h | Enable write cache * |
| 03h | Set transfer mode based on value in sector count register |
| 33h | Disable retry * |
| 44h | Vendor unique length of ECC on read long/write long commands |
| 54h | Set cache segments to sector count register value * |
| 55h | Disable read look-ahead feature |
| 66h | Disable reverting to power on defaults (see 9.22) |
| 77h | Disable ECC * |
| 81h | Disable 8-bit data transfers (see 6.3.5) |
| 82h | Disable write cache * |
| 88h | Enable ECC * |
| 99h | Enable retries * |
| AAh | Enable read look-ahead feature |
| ABh | Set maximum prefetch using sector count register value * |
| BBh | 4 bytes of ECC apply on read long/write long commands |
| CCh | Enable reverting to power on defaults (see 9.22) |
| | *These commands are vendor-specified |

See 10.3 for protocol. If the value in the register is not supported or is invalid, the drive posts an Aborted Command error.

At power on, or after a hardware reset, the default mode is the same as that represented by values greater than 80h. A setting of 66h allows settings of greater than 80h which may have been modified since power on to remain at the same setting after a software reset.

A host can choose the transfer mechanism by Set Transfer Mode and specifying a value in the Sector Count Register. The upper 5 bits define the type of transfer and the low order 3 bits encode the mode value.

| | |
|---|---|
| Block transfer (default) | 00000 000 |
| Single word DMA mode x | 00010 0xx |
| Multiword DMA mode 0 | 00100 000 |

See vendor specification for the default mode of the commands which are vendor-specified.

9.23 Set multiple mode

This command enables the drive to perform Read and Write Multiple operations and establishes the block count for these commands. See 10.3 for protocol.

The Sector Count Register is loaded with the number of sectors per block. Drives shall support block sizes of 2, 4, 8, and 16 sectors, if their buffer size is at least 8,192 bytes, and may also support other block sizes. Upon receipt of the command, the drive sets BSY=1 and checks the Sector Count Register.

If the Sector Count Register contains a valid value and the block count is supported, the value is loaded for all subsequent Read Multiple and Write Multiple commands and execution of those commands is enabled. If a block count is not supported, an Aborted Command error is posted, and Read Multiple and Write Multiple commands are disabled.

If the Sector Count Register contains 0 when the command is issued, Read and Write Multiple commands are disabled.

X3T9.2/791D revision 4

At power on, or after a hardware reset, the default mode is Read and Write Multiple disabled. If Disable Default has been set in the Features Register then the mode remains the same as that last established prior to a software reset, otherwise it reverts to the default of disabled.

9.24 Sleep

This command is the only way to cause the drive to enter Sleep Mode. The drive is spun down, and when it is stopped, BSY is cleared, an interrupt is generated, and the interface becomes inactive.

The only way to recover from Sleep mode is with a software reset or a hardware reset.

> NOTE 12 The use of hardware reset to recover from Sleep mode may be incompatible with continued operation of the host system.

A drive shall not power on in Sleep Mode nor remain in Sleep Mode following a reset sequence. If the drive is already spun down, the spin down sequence is not executed.

9.25 Standby

This command causes the drive to enter the Standby Mode. See 10.3 for protocol. The drive may return the interrupt before the transition to Standby Mode is completed.

If the drive is already spun down, the spin down sequence is not executed.

If the Sector Count Register is non-zero then the automatic power down sequence shall be enabled and the timer will begin counting down when the drive returns to Idle mode. If the Sector Count Register is zero then the automatic power down sequence shall be disabled.

9.26 Standby immediate

This command causes the drive to enter the Standby Mode. See 10.3 for protocol. The drive may return the interrupt before the transition to Standby Mode is completed.

If the drive is already spun down, the spin down sequence is not executed.

9.27 Write buffer

This command enables the host to overwrite the contents of the drive's sector buffer with any data pattern desired. See 10.2 for protocol.

The Read Buffer and Write Buffer commands shall be synchronized within the drive such that sequential Write Buffer and Read Buffer commands access the same 512 bytes within the buffer.

9.28 Write DMA

This command executes in a similar manner to Write Sectors except for the following:
- the host initializes a slave-DMA channel prior to issuing the command
- data transfers are qualified by DMARQ and are performed by the slave-DMA channel
- the drive issues only one interrupt per command to indicate that data transfer has terminated and status is available.

working draft AT Attachment Interface for Disk Drives

X3T9.2/791D revision 4

Any error encountered during Write DMA execution results in the termination of data transfer. The drive issues an interrupt to indicate that data transfer has terminated and status is available in the Error Register. The error posting is the same as that of the Write Sectors command.

9.29 Write long

This command is similar to the Write Sectors command except that it writes the data and the ECC bytes directly from the sector buffer; the drive does not generate the ECC bytes itself. Only single sector Write Long operations are supported.

The transfer of the ECC bytes shall be 8-bits wide.

9.30 Write multiple command

This command is similar to the Write Sectors command. The drive sets BSY within 400 nsec of accepting the command, and interrupts are not presented on each sector but on the transfer of a block which contains the number of sectors defined by Set Multiple.

Command execution is identical to the Write Sectors operation except that the number of sectors defined by the Set Multiple command are transferred without intervening interrupts. DRQ qualification of the transfer is required only at the start of the data block, not on each sector.

The block count of sectors to be transferred without intervening interrupts is programmed by the Set Multiple Mode command, which shall be executed prior to the Read Multiple command.

When the Write Multiple command is issued, the Sector Count Register contains the number of sectors (not the number of blocks or the block count) requested.

If the number of requested sectors is not evenly divisible by the block count, as many full blocks as possible are transferred, followed by a final, partial block transfer. The partial block transfer is for n sectors, where
  n = Remainder (Sector count / block count)

If the Write Multiple command is attempted before the Set Multiple Mode command has been executed or when Write Multiple commands are disabled, the Write Multiple operation shall be rejected with an aborted command error.

Disk errors encountered during Write Multiple commands are posted after the attempted disk write of the block or partial block transferred. The Write command ends with the sector in error, even if it was in the middle of a block. Subsequent blocks are not transferred in the event of an error. Interrupts are generated when DRQ is set at the beginning of each block or partial block.

The contents of the Command Block Registers following the transfer of a data block which had a sector in error are undefined. The host should retry the transfer as individual requests to obtain valid error information.

9.31 Write same

This command executes in a similar manner to Write Sectors except that only one sector of data is transferred. The contents of the sector are written to the medium one or more times.

> NOTE 13 The Write Same command allows for initialization of part or all of the medium to the specified data with a single command.

X3T9.2/791D revision 4

If the Features Register is 22h, the drive shall write that part of the medium specified by the sector count, sector number, cylinder and drive/head registers. If the Features Register contains DDh, the drive shall initialize all the user accessible medium. If the register contains a value other than 22h or DDh, the command shall be rejected with an aborted command error.

The drive issues an interrupt to indicate that the command is complete. Any error encountered during execution results in the termination of the write operation. Status is available in the Error Register if an error occurs. The error posting is the same as that of the Write Sectors command.

9.32 Write sector(s)

This command writes from 1 to 256 sectors as specified in the Sector Count Register (a sector count of zero requests 256 sectors), beginning at the specified sector. See 10.1 for the DRQ, IRQ and BSY protocol on data transfers.

If the drive is not already on the desired track, an implied seek is performed. Once at the desired track, the drive searches for the appropriate ID field.

If retries are disabled and two index pulses have occurred without error free reading of the requested ID, an ID Not Found error is posted.

If retries are enabled, up to a vendor specific number of attempts may be made to read the requested ID before posting an error.

If the ID is read correctly, the data loaded in the buffer is written to the data field of the sector, followed by the ECC bytes. Upon command completion, the Command Block Registers contain the cylinder, head, and sector number of the last sector written.

If an error occurs during a write of more than one sector, writing terminates at the sector where the error occurs. The Command Block Registers contain the cylinder, head, and sector number of the sector where the error occurred. The host may then read the command block to determine what error has occurred, and on which sector.

9.33 Write verify

This command is similar to the Write Sectors command, except that each sector is verified immediately after being written. The verify operation is a read without transfer and a check for data errors. Any errors encountered during the verify operation are posted. Multiple sector Write Verify commands write all the requested sectors and then verify all the requested sectors before generating the final interrupt.

10 Protocol overview

Commands can be grouped into different classes according to the protocols followed for command execution. The command classes with their associated protocols are defined below.

For all commands, the host first checks if BSY=1, and should proceed no further unless and until BSY=0. For most commands, the host will also wait for DRDY=1 before proceeding. Those commands shown with DRDY=x can be executed when DRDY=0.

Data transfers may be accomplished in more ways than are described below, but these sequences should work with all known implementations of ATA drives.

working draft AT Attachment Interface for Disk Drives

X3T9.2/791D revision 4

10.1 PIO data in commands

This class includes:
- Identify drive
- Read buffer
- Read long
- Read sector(s)

Execution includes the transfer of one or more 512 byte (>512 bytes on Read Long) sectors of data from the drive to the host.
 a) The host writes any required parameters to the Features, Sector Count, Sector Number, Cylinder and Drive/Head registers.
 b) The host writes the command code to the Command Register.
 c) The drive sets BSY and prepares for data transfer.
 d) When a sector of data is available, the drive sets DRQ and clears BSY prior to asserting INTRQ.
 e) After detecting INTRQ, the host reads the Status Register, then reads one sector of data via the Data Register. In response to the Status Register being read, the drive negates INTRQ.
 f) The drive clears DRQ. If transfer of another sector is required, the drive also sets BSY and the above sequence is repeated from d).

10.1.1 PIO read command

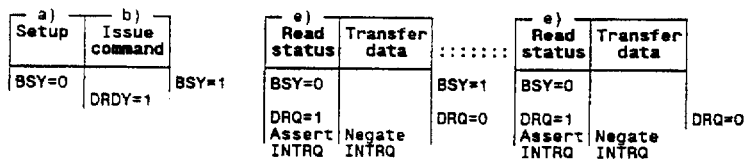

If Error Status is presented, the drive is prepared to transfer data, and it is at the host's discretion that the data is transferred.

10.1.2 PIO Read aborted command

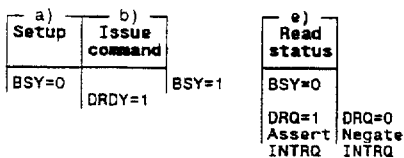

Although DRQ=1, there is no data to be transferred under this condition.

working draft AT Attachment Interface for Disk Drives

X3T9.2/791D revision 4

10.2 PIO data out commands

This class includes:
- Format
- Write buffer
- Write long
- Write sector(s)

Execution includes the transfer of one or more 512 byte (>512 bytes on Write Long) sectors of data from the drive to the host.

a) The host writes any required parameters to the Features, Sector Count, Sector Number, Cylinder and Drive/Head registers.
    b) The host writes the command code to the Command Register.
    c) The drive sets DRQ when it is ready to accept the first sector of data.
    d) The host writes one sector of data via the Data Register.
    e) The drive clears DRQ and sets BSY.
    f) When the drive has completed processing of the sector, it clears BSY and asserts INTRQ. If transfer of another sector is required, the drive also sets DRQ.
    g) After detecting INTRQ, the host reads the Status Register.
    h) The drive clears the interrupt.
    i) If transfer of another sector is required, the above sequence is repeated from d).

10.2.1 PIO write command

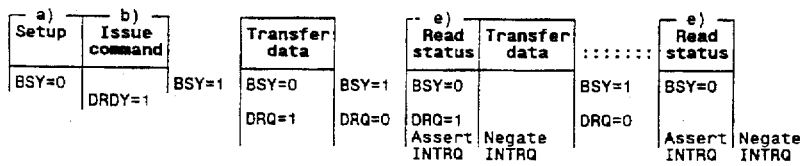

10.2.2 PIO write aborted command

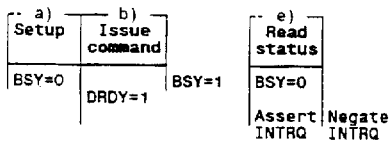

working draft AT Attachment Interface for Disk Drives

X3T9.2/791D revision 4

10.3 Non-data commands

This class includes:
- Execute drive diagnostic (DRDY=x)
- Idle
- Initialize drive parameters (DRDY=x)
- Read power mode
- Read verify sector(s)
- Recalibrate
- Seek
- Set features
- Set multiple mode
- Standby Execution of these commands involves no data transfer.

a) The host writes any required parameters to the Features, Sector Count, Sector Number, Cylinder and Drive/Head registers.
b) The host writes the command code to the Command Register.
c) The drive sets BSY.
d) When the drive has completed processing, it clears BSY and asserts INTRQ.
g) The host reads the Status Register.
h) The drive negates INTRQ.

10.4 Miscellaneous commands

This class includes:
- Read multiple
- Sleep
- Write multiple
- Write same

The protocol for these commands is contained in the individual command descriptions.

10.5 DMA data transfer commands (optional)

This class comprises:
- Read DMA
- Write DMA

Data transfers using DMA commands differ in two ways from PIO transfers:
- data transfers are performed using the slave-DMA channel
- no intermediate sector interrupts are issued on multi-sector commands Initiation of the DMA transfer commands is identical to the Read Sector or Write Sector commands except that the host initializes the slave-DMA channel prior to issuing the command.

The interrupt handler for DMA transfers is different in that:
- no intermediate sector interrupts are issued on multi-sector commands
- the host resets the DMA channel prior to reading status from the drive.

working draft AT Attachment Interface for Disk Drives

X3T9.2/791D revision 4

The DMA protocol allows high performance multi-tasking operating systems to eliminate processor overhead associated with PIO transfers.

a) Command phase
   1) Host initializes the slave-DMA channel
   2) Host updates the Command Block Registers
   3) Host writes command code to the Command Register
b) Data phase - the register contents are not valid during a DMA Data Phase.
   1) The slave-DMA channel qualifies data transfers to and from the drive with DMARQ
c) Status phase
   1) Drive generates the interrupt to the host
   2) Host resets the slave-DMA channel
   3) Host reads the Status Register and Error Register

10.5.1 Normal DMA transfer

| Initialize DMA | Command | | DMA data transfer | | Reset DMA | Status |
|---|---|---|---|---|---|---|
| BSY=0 | | BSY=1 | BSY=x<br>DRQ=x | | BSY=1<br>nIEN=0 | BSY=0 |

10.5.2 Aborted DMA transfer

| Initialize DMA | Command | | DMA data | | Reset DMA | Status |
|---|---|---|---|---|---|---|
| BSY=0 | | BSY=1 | BSY=x<br>DRQ=1 | | BSY=1<br>nIEN=0 | BSY=0 |

10.5.3 Aborted DMA Command

| Initialize DMA | Command | | Reset DMA | Status |
|---|---|---|---|---|
| BSY=0 | | BSY=1 | BSY=1<br>nIEN=0 | BSY=0 |

X3T9.2/791D revision 4

11 Timing

11.1 Deskewing

The host shall provide cable deskewing for all signals originating from the controller. The drive shall provide cable deskewing for all signals originating at the host.

11.2 Symbols

Certain symbols are used in the timing diagrams. These symbols and their respective definitions are listed below.

| | | |
|---|---|---|
| / or \ | - | signal transition (asserted or negated) * |
| < or > | - | data transition (asserted or negated) |
| XXXXXX | - | undefined but not necessarily released |
| . . . | - | the "other" condition if a signal is shown with no change |
| #n | - | used to number the sequence in which events occur e.g. #a, #b |
| _/_/ | - | a degree of uncertainty as to when a signal may be asserted |
| \_\_ | - | a degree of uncertainty as to when a signal may be negated |

\* All signals are shown with the asserted condition facing to the top of the page. The negated condition is shown towards the bottom of the page relative to the asserted condition.

11.3 Terms

The interface uses a mixture of negative and positive signals for control and data. The terms asserted and negated are used for consistency and are independent of electrical characteristics.

In all timing diagrams, the lower line indicates negated, and the upper line indicates asserted e.g. the following illustrates the representation of a signal named TEST going from negated to asserted and back to negated, based on the polarity of the signal.

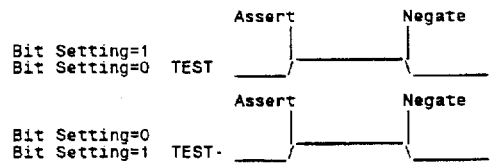

X3T9.2/791D revision 4

11.4 Data Transfers

Figure 6 defines the relationships between the interface signals for both 16-bit and 8-bit data transfers.

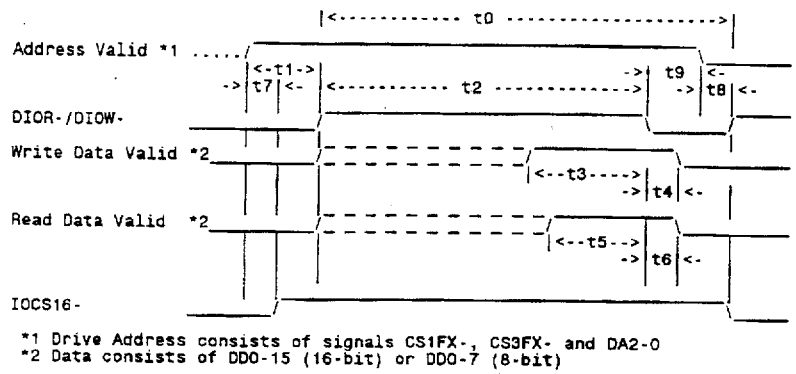

*1 Drive Address consists of signals CS1FX-, CS3FX- and DA2-0
*2 Data consists of DD0-15 (16-bit) or DD0-7 (8-bit)

|    | PIO<br>timing parameters |       | Mode 0<br>nsec | Mode 1<br>nsec | Mode 2<br>nsec |
|----|--------------------------|-------|------|------|------|
| t0 | Cycle time               | (min) | 600  | 383  | 240  |
| t1 | Address valid to DIOR-/DIOW- setup | (min) | 70 | 50 | 30 |
| t2 | DIOR-/DIOW-    16-bit    | (min) | 165  | 125  | 100  |
|    | Pulse width    8-bit     | (min) | 290  | 290  | 290  |
| t3 | DIOW- data setup         | (min) | 60   | 45   | 30   |
| t4 | DIOW- data hold          | (min) | 30   | 20   | 15   |
| t5 | DIOR- data setup         | (min) | 50   | 35   | 20   |
| t6 | DIOR- data hold          | (min) | 5    | 5    | 5    |
| t7 | Addr valid to IOCS16- assertion | (max) | 90 | 50 | 40 |
| t8 | Addr valid to IOCS16- negation | (max) | 60 | 45 | 30 |
| t9 | DIOR-/DIOW- to address valid hold | (min) | 20 | 15 | 10 |

Figure 6 - PIO data transfer to/from drive

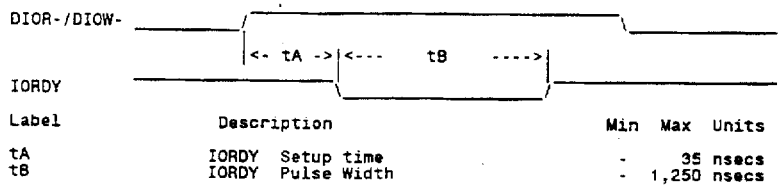

| Label | Description          | Min | Max   | Units |
|-------|----------------------|-----|-------|-------|
| tA    | IORDY Setup time     | -   | 35    | nsecs |
| tB    | IORDY Pulse Width    | -   | 1,250 | nsecs |

WARNING: The use of IORDY for data transfers is a system integration issue which requires control of both ends of the cable.

Figure 7 - IORDY timing requirements

X3T9.2/791D revision 4
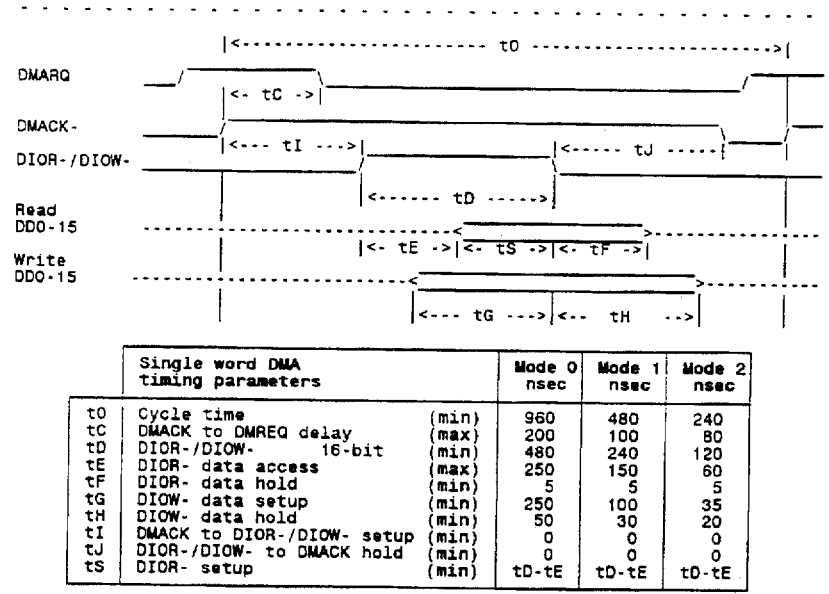
Figure 8 - Single word DMA data transfer
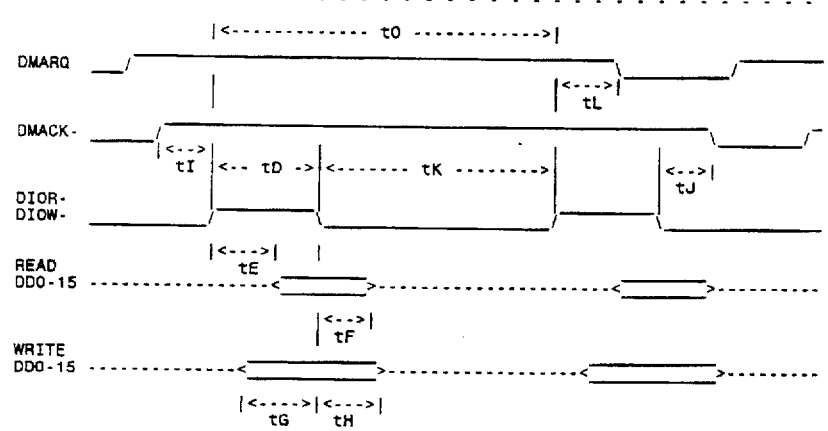
working draft AT Attachment Interface for Disk Drives X3T9.2/791D revision 4

| | Multiword DMA timing parameters | Mode 0 nsec | |
|---|---|---|---|
| | | Min | Max |
| t0 | Cycle time | 480 | --- |
| tC | DMACK to DMREQ delay | | |
| tD | DIOR-/DIOW- 16-bit | 215 | |
| tE | DIOR- data access | | 150 |
| tF | DIOR- data hold | 5 | |
| tF | DIOR- data hold | | 20 |
| tG | DIOW- data setup | 100 | |
| tH | DIOW- data hold | 20 | |
| tI | DMACK to DIOR-/DIOW- setup | 0 | |
| tJ | DIOR-/DIOW- to DMACK hold | 20 | |
| tKr | DIOR- negated pulse width | 50 | |
| tKw | DIOW- negated pulse width | 215 | |
| tLr | DIOR- to DMREQ delay | | 120 |
| tLw | DIOW- to DMREQ delay | | 40 |

Figure 9 - Multiword DMA data transfer working draft AT Attachment Interface for Disk Drives X3T9.2/791D revision 4
11.5 Power on and hard reset
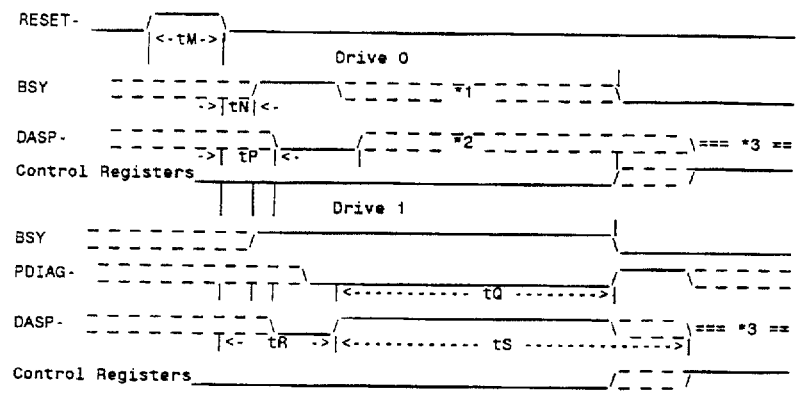
*1 Drive 0 can set BSY=0 if Drive 1 not present
*2 Drive 0 can use DASP- to indicate it is active if Drive 1 is not present
*3 DASP- can be asserted to indicate that the drive is active
| Label | | Units | |
|---|---|---|---|
| tM | (Min) | 25 | usec |
| tN | (Max) | 400 | nsec |
| tP | (Max) | 1 | msec |
| tQ | (Max) | 30 | secs |
| tR Drive 0 | (Max) | 450 | msec |
| tR Drive 1 | (Max) | 400 | msec |
| tS | (Max) | 30,5 | secs |
Figure 10 - Reset sequence X3T9.2/791D revision 4

Annex A
(informative)

Diagnostic and reset considerations

This annex describes the following timing relationships during:
a) Power on and hardware resets
- One drive
- Two drives
b) Software reset
- One drive
- Two drives
c) Diagnostic command execution
- One drive
- Two drives
- Two drives - drive 1 failed The timing assumes the following:
- DASP- is asserted by Drive 1 and received by Drive 0 at power-on or hardware reset to indicate the presence of Drive 1. At all other times it is asserted by Drive 0 and Drive 1 to indicate when a drive is active.
- PDIAG- is asserted by Drive 1 and detected by Drive 0. It is used by Drive 1 to indicate to Drive 0 that it has completed diagnostics and is ready to accept commands from the Host (BSY bit is cleared). This does not indicate that the drive is ready, only that it can accept commands. This line may remain asserted until the next reset occurs or an Execute Diagnostic command is received.
- Unless indicated otherwise, all times are relative to the event that triggers the operation (RESET-, SRST=1, Execute Diagnostic Command).

A.1 Power on and hardware resets

A.1.1 Power on and hardware resets - one drive

- Host asserts RESET- for a minimum of 25 usec.
- Drive 0 sets BSY within 400 nsecs after RESET- is negated.
- Drive 0 negates DASP- within 1 msec after RESET- negated.
- Drive 0 performs hardware initialization
- Drive 0 may revert to its default condition
- Drive 0 waits 1 msec then samples for at least 450 msec for DASP- to be asserted from Drive 1.
- Drive 0 clears BSY when ready to accept commands (within 31 seconds).

A.1.2 Power on and hardware resets - two drives

- Host asserts RESET- for a minimum of 25 usec.
- Drive 0 and Drive 1 set BSY within 400 nsec after RESET- negated.
- DASP- is negated within 1 msec after RESET- is negated.

working draft AT Attachment Interface for Disk Drives 47

X3T9.2/791D revision 4

A.1.2.1 Drive 1

- Drive 1 negates PDIAG- before asserting DASP-.
- Drive 1 asserts DASP- within 400 msecs after RESET- (to show presence).
- Drive 1 performs hardware initialization and executes its internal diagnostics.
- Drive 1 may revert to its default condition
- Drive 1 posts diagnostic results to the Error Register
- Drive 1 clears BSY when ready to accept commands.
- Drive 1 asserts PDIAG- to indicate that it is ready to accept commands (within 30 seconds from RESET-).
- Drive 1 negates DASP- after the first command is received or negates DASP-if no command is received within 31 seconds after RESET-.

A.1.2.2 Drive 0

- Drive 0 performs hardware initialization and executes its internal diagnostics.
- Drive 0 may revert to its default condition
- Drive 0 posts diagnostic results to the Error Register
- After 1 msec, Drive 0 waits at least 450 msec for DASP- to be asserted (from Drive 1). If DASP- is not asserted, no Drive 1 is present (see POWER-ON RESET - One Drive operation).
- Drive 0 waits up to 31 seconds for Drive 1 to assert PDIAG-. If PDIAG- is not asserted, Drive 0 sets Bit 7=1 in the Error Register.
- Drive 0 clears BSY when ready to accept commands (within 31 seconds).

A.2 Software reset

A.2.1A.2.1 Software reset - one drive

- Host sets SRST=1 in the Device Control Register.
- Drive 0 sets BSY within 400 nsec after detecting that SRST=1.
- Drive 0 performs hardware initialization and executes its internal diagnostics.
- Drive 0 may revert to its default condition.
- Drive 0 posts diagnostic results to the Error Register.
- Drive 0 clears BSY when ready to accept commands (within 31 seconds).

A.2.2 Software reset - two drives

- Host sets SRST=1 in the Device Control Register.
- Drive 0 and Drive 1 set BSY within 400 nsec after detecting that SRST=1.
- Drive 0 and Drive 1 perform hardware initialization.
- Drive 0 and Drive 1 may revert to their default condition.

A.2.2.1 Drive 1

- Drive 1 negates PDIAG- within 1 msec.
- Drive 1 clears BSY when ready to accept commands.
- Drive 1 asserts PDIAG- to indicate that it is ready to accept commands (within 30 seconds).

X3T9.2/791D revision 4

A.2.2.2 Drive 0

- Drive 0 waits up to 31 seconds for Drive 1 to assert PDIAG-.
- Drive 0 clears BSY when ready to accept commands (within 31 seconds).

A.3 Diagnostic Command Execution

A.3.1 Diagnostic command execution - one drive (passed)

- Drive 0 sets BSY within 400 nsec after the Execute Diagnostic command was received.
- Drive 0 performs hardware initialization and internal diagnostics.
- Drive 0 resets Command Block registers to default condition.
- Drive 0 posts diagnostic results to the Error Register
- Drive 0 clears BSY when ready to accept commands (within 6 seconds).

A.3.2 Diagnostic command - two drives (passed)

- Drive 0 and Drive 1 set BSY within 400 nsec after the Execute Diagnostic command was received.

A.3.2.1 Drive 1

- Drive 1 negates PDIAG- within 1 msec after command received.
- Drive 1 performs hardware initialization and internal diagnostics.
- Drive 1 resets the Command Block registers to their default condition.
- Drive 1 posts diagnostic results to the Error Register
- Drive 1 clears BSY when ready to accept commands.
- Drive 1 asserts PDIAG- to indicate that it is ready to accept commands (within 5 seconds).

A.3.2.2 Drive 0

- Drive 0 performs hardware initialization and internal diagnostics.
- Drive 0 resets the Command Block registers to their default condition.
- Drive 0 waits up to 6 seconds for Drive 1 to assert PDIAG-.
- Drive 0 posts diagnostic results to the Error Register
- Drive 0 clears BSY when ready to accept commands (within 6 seconds).

A.3.3 Diagnostic command execution - one drive (failed)

- Drive 0 sets BSY within 400 nsec after Diagnostic command received.
- Drive 0 performs hardware initialization and internal diagnostics.
- Drive 0 resets Command Block registers to default condition.
- Drive 0 posts a Diagnostic Code to the Error Register indicating a failure.
- Drive 0 clears BSY when ready to accept commands (within 6 seconds)

A.3.4 Diagnostic command execution - two drives (drive 1 failed)

X3T9.2/791D revision 4

A.3.4.1 Drive 1

- Drive 1 negates PDIAG- within 1 msec after command received.
- Drive 1 performs hardware initialization and internal diagnostics.
- Drive 1 resets the Command Block registers to their default condition.
- Drive 1 posts a Diagnostic Code to the Error Register indicating failure.
- Drive 1 clears BSY.
- Drive 1 does not assert PDIAG-, indicating that it failed diagnostics.

A.3.4.2 Drive 0

- Drive 0 performs hardware initialization and internal diagnostics.
- Drive 0 resets the Command Block registers to their default condition.
- Drive 0 waits 6 seconds for Drive 1 to assert PDIAG- but PDIAG- is not asserted by Drive 1.
- Drive 0 posts a Diagnostic Code to the Error Register setting Bit 7=1 to indicate that Drive 1 failed diagnostics.
- Drive 0 clears BSY when ready to accept commands (within 6 seconds).

NOTE 1 The 6 seconds referenced above is a host-oriented value.

X3T9.2/791D revision 4

Annex B (informative)

Diagnostic and reset considerations

B.1 Power on and hardware reset (RESET-)

ASP- is read by Drive 0 to determine if Drive 1 is present. If Drive 1 is present Drive 0 will read PDIAG- to determine when it is valid to clear BSY and whether Drive 1 has powered on or reset without error, otherwise Drive 0 clears BSY whenever it is ready to accept commands. Drive 0 may assert DASP- to indicate drive activity.

B.2 Software reset

If Drive 1 is present Drive 0 will read PDIAG- to determine when it is valid to clear BSY and whether Drive 1 has reset without any errors, otherwise Drive 0 will simply reset and clear BSY. DASP- is asserted by Drive 0 (and Drive 1 if it is present) in order to indicate drive active.

B.3 Drive diagnostic command

If Drive 1 is present, Drive 0 will read PDIAG- to determine when it is valid to clear BSY and if Drive 1 passed or failed the Execute Drive Diagnostic command, otherwise Drive 0 will simply execute its diagnostics and then clear BSY. DASP- is asserted by Drive 0 (and Drive 1 if it is present) in order to indicate the drive is active.

B.4 Truth table

In all the above cases: Power on, RESET-, software reset, and the Execute Drive Diagnostics command the Drive 0 Error Register is calculated as follows:

| Drive 1 Present? | PDIAG- Asserted? | Drive 0 Passed | Error Register |
|---|---|---|---|
| Yes | Yes | Yes | 01h |
| Yes | Yes | No | 0xh |
| Yes | No | Yes | 81h |
| Yes | No | No | 8xh |
| No | (not read) | Yes | 01h |
| No | (not read) | No | 0xh |

Where x indicates the appropriate Diagnostic Code for the Power on, RESET-, software reset, or drive diagnostics error.

working draft AT Attachment Interface for Disk Drives

X3T9.2/791D revision 4

B.5 Power on or hardware reset algorithm

1) Power on or hardware reset
2) The hardware should automatically do the following:
    a) Set up the hardware to post both Drive 0 and Drive 1 status
    b) Set the Drive 0 Status Register to 80h (set BSY and clear all the other status bits)
    c) Set the Drive 1 Status Register to 80h (set BSY and clear all the other status bits)
3) Read the single Drive 0/Drive 1 jumper and note its state
4) Perform any remaining time critical hardware initialization including starting the spin up of the disk if needed
5) If Drive 1
    a) Negate the PDIAG- signal
    b) Set up PDIAG- as an output
    c) Assert the DASP- output
    d) Set up DASP- as an output if necessary
    e) Set up the hardware so it posts Drive 1 status only and continue to post 80h for Drive 1 status
NOTE 2 all this must happen within 400 msec after power on or RESET- If Drive 0
    a) Set up PDIAG- as an input
    b) Release DASP- and set up DASP- as an input
    c) Test DASP- for 450 msec or until DASP- is asserted by Drive 1
    d) If DASP- is asserted within 450 msec
        i) note that Drive 1 is present
        ii) set up the hardware so it posts Drive 0 status only and continue to post 80h for the Drive 0 status
    If DASP- is not asserted within 450 msec
        i) note that Drive 1 is not present
    e) Assert DASP- to indicate drive activity
6) Complete all the hardware initialization needed to get the drive ready, including:
    a) Set the Sector Count Register to 01h
    b) Set the Sector Number Register to 01h
    c) Set the Cylinder Low Register to 00h
    d) Set the Cylinder High Register to 00h
    e) Set the Drive/Head Register to 00h
7) If Drive 1 and power on, or RESET- is valid
    a) Set the Error Register to Diagnostic Code 01h
    b) Set the Drive 1 Status Register to 00h
    c) Assert PDIAG-
NOTE 3 All this must happen within 30 seconds of power on or the negation of RESET- If Drive 1 and power on or RESET- bad
    a) Set the Error Register to the appropriate Diagnostic Code
    b) Set the Drive 1 Status Register to 00h
NOTE 4 All this must happen within 30 seconds of power on or the negation of RESET- If Drive 0, power on or RESET- valid, and a Drive 1 is present
    a) Test PDIAG- for 31 seconds or until PDIAG- is asserted by Drive 1
    b) If PDIAG- is asserted within 31 seconds
        i) Set the Error Register to Diagnostic Code 01h
    c) If PDIAG- is not asserted within 31 seconds
        i) Set the Error Register to 81h
    d) Set the Drive 0 Status Register to 00h X3T9.2/791D revision 4

If Drive 0, power on or RESET- bad, and a Drive 1 is present
        a) Test PDIAG- for 31 seconds or until PDIAG- is asserted by Drive 1
        b) If PDIAG- is asserted within 31 seconds
            i) Set the Error Register to the appropriate Diagnostic Code
        c) If PDIAG- is not asserted within 31 seconds
            i) Set the Error Register to 80h + the appropriate code
        d) Set the Drive 0 Status Register to 00h
    If Drive 0, power on or RESET- valid, and no Drive 1 is present
        a) Set the Error Register to Diagnostic Code 01h
        b) Set the Drive 1 Status Register to 00h
        c) Set the Drive 0 Status Register to 00h
    If Drive 0, power on or RESET- bad, and no Drive 1 is present
        a) Set the Error Register to the appropriate Diagnostic Code
        b) Set the Drive 1 Status Register to 00h
        c) Set the Drive 0 Status Register to 00h
8) Finish spin up if needed
9) If Drive 1
        a) Set the Drive 1 Status Register to 50h
        b) Negate DASP- if a command is not received within 31 seconds
    If Drive 0 and a Drive 1 is present
        a) Set the Drive 0 Status Register to 50h
        b) Negate DASP-
    If Drive 0 and no Drive 1 is present
        a) Leave the Drive 1 Status Register 00h
        b) Set the Drive 0 Status Register to 50h
        c) Negate DASP-

B.6 Software Reset Algorithm

1) The software reset bit is set
2) If Drive 1
        a) The hardware should set BUSY in the Drive 1 Status Register
        b) Negate the PDIAG- signal
NOTE 5 this must happen within 1 msec of the software reset If Drive 0 and Drive 1 is present
        a) The hardware should set BUSY in the Drive 0 Status Register
    If Drive 0 and there is no Drive 1 the hardware should:
        a) Set BUSY in the Drive 0 Status Register
        b) Set the Drive 1 Status Register to 80h
3) Assert DASP-
4) Finish all the hardware initialization needed to place the drive in reset
5) Wait for the software reset bit to clear
6) Finish all hardware initialization needed to get the drive ready to receive any type of command from the host including:
        a) Set the Sector Count Register to 01h
        b) Set the Sector Number Register to 01h
        c) Set the Cylinder Low Register to 00h
        d) Set the Cylinder High Register to 00h
        e) Set the Drive/Head Register to 00h
7) If Drive 1 and reset valid
        a) Set the Error Register to Diagnostic Code 01h working draft AT Attachment Interface for Disk Drives

X3T9.2/791D revision 4 b) Set the Drive 1 Status Register to 50h
  c) Assert PDIAG-
NOTE 6 All this must happen within 30 seconds of the clearing of the software reset bit If Drive 1 and reset bad
  a) Set the Error Register to the appropriate Diagnostic Code
  b) Set the Drive 1 Status Register to 50h
NOTE 7 All this must happen within 30 seconds of the clearing of the software reset bit If Drive 0, reset valid, and a Drive 1 is present
  a) Test PDIAG- for 31 seconds or until PDIAG- is asserted by Drive 1
  b) If PDIAG- is asserted within 31 seconds
   i) Set the Error Register to Diagnostic Code 01h
  c) If PDIAG- is not asserted within 31 seconds
   i) Set the Error Register to 81h
  d) Set the Drive 0 Status Register to 50h
 If Drive 0, reset bad, and a Drive 1 is present
  a) Test PDIAG- for 31 seconds or until PDIAG- is asserted by Drive 1
  b) If PDIAG- is asserted within 31 seconds
   i) Set the Error Register to the appropriate Diagnostic Code
  c) If PDIAG- is not asserted within 31 seconds
   i) Set the Error Register to 80h + the appropriate code
  d) Set the Drive 0 Status Register to 50h
 If Drive 0, reset valid, and no Drive 1 is present
  a) Set the Error Register to Diagnostic Code 01h
  b) Set the Drive 1 Status Register to 00h
  c) Set the Drive 0 Status Register to 50h
 If Drive 0, reset bad, and no Drive 1 is present
  a) Set the Error Register to the appropriate Diagnostic Code
  b) Set the Drive 1 Status Register to 00h
  c) Set the Drive 0 Status Register to 50h

B.7 Diagnostic Command Algorithm

1) The diagnostics command is received
2) If Drive 1
  a) The hardware should set BUSY in the Drive 1 Status Register
  b) Negate the PDIAG- signal
NOTE 8 this must happen within 1 msec after command acceptance If Drive 0 and Drive 1 is present
  a) The hardware should set BUSY in the Drive 0 Status Register
 If Drive 0 and there is no Drive 1 the hardware should
  a) Set BUSY in the Drive 0 Status Register
  b) Set BUSY in the Drive 1 Status Register
3) Assert DASP-
4) Perform all the drive diagnostics and note their results X3T9.2/791D revision 4

5) Finish all the hardware initialization needed to get the drive ready to receive any type of command from the host including:
   a) Set the Sector Count Register to 01h
   b) Set the Sector Number Register to 01h
   c) Set the Cylinder Low Register to 00h
   d) Set the Cylinder High Register to 00h
   e) Set the Drive/Head Register to 00h
6) If Drive 1 and passed
   a) Set the Error Register to Diagnostic Code 01h
   b) Set the Drive 1 status to 50h
   c) Assert PDIAG- NOTE 9 All this must happen within 5 seconds of the acceptance of the diagnostic command If Drive 1 and did not pass
   a) Set the Error Register to the appropriate Diagnostic Code
   b) Set the Drive 1 status to 50h NOTE 10 All this must happen within 5 seconds of the acceptance of the diagnostic command If Drive 0, passed, and a Drive 1 is present
   a) Test PDIAG- for 6 seconds or until PDIAG- is asserted by Drive 1
   b) If PDIAG- is asserted within 6 seconds
      i) Set the Error Register to Diagnostic Code 01h
   c) If PDIAG- is not asserted within 6 seconds
      i) Set the Error Register to 81h
   d) Set the Drive 0 status to 50h
   e) Issue interrupt to the host
If Drive 0, did not pass, and a Drive 1 is present
   a) Test PDIAG- for 6 seconds or until PDIAG- is asserted by Drive 1
   b) If PDIAG- is asserted within 6 seconds
      i) Set the Error Register to the appropriate Diagnostic Code
   c) If PDIAG- is not asserted within seconds
      i) Set the Error Register to 80h + the appropriate code
   d) Set the Drive 0 Status Register to 50h
   e) Issue interrupt to the host
If Drive 0, passed, and no Drive 1 is present
   a) Set the Error Register to Diagnostic Code 01h
   b) Set the Drive 1 Status Register to 00h
   c) Set the Drive 0 Status Register to 50h
   d) Issue interrupt to the host
If Drive 0, did not pass, and no Drive 1 is present
   a) Set the Error Register to the appropriate Diagnostic Code
   b) Set the Drive 1 Status Register to 00h
   c) Set the Drive 0 Status Register to 50h
   d) Issue interrupt to the host working draft AT Attachment Interface for Disk Drives X3T9.2/791D revision 4

Annex C
(informative)

Small Form Factor Connectors

This annex describes the connector-connector mating alternatives for 2 1/2" disk drives or smaller which were developed by the Small Form Factor (SFF) Committee, an industry ad hoc group.

In an effort to broaden the applications for small form factor disk drives, a group of companies representing system integrators, peripheral suppliers, and component suppliers decided to address the issues involved.

A primary purpose of the SFF Committee was to define the external dimensions of small form factor disk drives so that products from different vendors could be used in the same mounting configurations.

The restricted area, and the mating of drives directly to a motherboard required that the number of connectors be reduced, which caused the assignment of additional pins for power. Power is provided to the drives on the same connector as used for the signals, and addresses are set by the receptacle into which the drives are plugged.

The 50-pin connector that has been widely adopted across industry for SFF drives is a low density 2mm connector which has no shroud on the plug which is mounted on the drive. A number of suppliers provide intermatable components. The following information has been provided to assist users in specifying components used in an implementation.

Signals Connector Plug        DuPont 86451 or equivalent
    Signals Connector Receptacle  DuPont 86455 or equivalent

C.1 44-pin signal assignments

The signals assigned for 44-pin applications are described in table 14. Although there are 50 pins in the plug, the mating receptacle need contain only 44 pins (the removal of pins E and F provides room for the wall of the receptacle).

44-pin signal assignments for ATA

The first four pins of the connector plug located on the drive are not to be connected to the host, as they are reserved for manufacturer's use. Pins E, F and K are keys, and are removed.

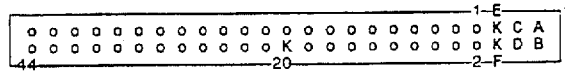

X3T9.2/791D revision 4

Table 14 - Signal assignments for ATA

| Signal name | Connector contact | Conductor | | Connector contact | Signal name |
|---|---|---|---|---|---|
| Vendor unique | A | | | B | Vendor unique |
| Vendor unique | C | | | D | Vendor unique |
| (keypin) | E | | | F | (keypin) |
| RESET- | 1 | 1 | 2 | 2 | Ground |
| DD7 | 3 | 3 | 4 | 4 | DD8 |
| DD6 | 5 | 5 | 6 | 6 | DD9 |
| DD5 | 7 | 7 | 8 | 8 | DD10 |
| DD4 | 9 | 9 | 10 | 10 | DD11 |
| DD3 | 11 | 11 | 12 | 12 | DD12 |
| DD2 | 13 | 13 | 14 | 14 | DD13 |
| DD1 | 15 | 15 | 16 | 16 | DD14 |
| DD0 | 17 | 17 | 18 | 18 | DD15 |
| Ground | 19 | 19 | 20 | 20 | (keypin) |
| DMARQ | 21 | 21 | 22 | 22 | Ground |
| DIOW- | 23 | 23 | 24 | 24 | Ground |
| DIOR- | 25 | 25 | 26 | 26 | Ground |
| IORDY | 27 | 27 | 28 | 28 | PSYNC:CSEL |
| DMACK- | 29 | 29 | 30 | 30 | Ground |
| INTRQ | 31 | 31 | 32 | 32 | IOCS16- |
| DA1 | 33 | 33 | 34 | 34 | PDIAG- |
| DA0 | 35 | 35 | 36 | 36 | DA2 |
| CS1FX- | 37 | 37 | 38 | 38 | CS3FX- |
| DASP- | 39 | 39 | 40 | 40 | Ground |
| * +5v (Logic) | 41 | 41 | 42 | 42 | +5V (Motor) * |
| * Ground (Return) | 43 | 43 | 44 | 44 | TYPE- (0=ATA)* |

* Pins which are additional to those of the 40-pin cable.

What is claimed is:

1. A multiple format interface apparatus coupled to a system bus for interfacing the system bus to a plurality of controllers, the interface apparatus comprising:
   a. a plurality of controllers coupled in parallel for controlling a plurality of peripherals at least two of which use incompatible interface protocols;
   b. a circuit coupled between the system bus and the plurality of controllers for selectively configuring the interface apparatus to communicate using a selected one of the incompatible interface protocols used by the at least two of the plurality of peripherals; and
   c. a plurality of detection circuits, one coupled to each of the plurality of controllers for selectively allowing communication between the each of the plurality of controllers coupled thereto and the system bus through the interface apparatus,
       wherein each of the plurality of detection circuits monitor chip select signal line and data signal lines to determine when a specific one of the plurality of controllers is being accessed by the system bus.

2. The apparatus as claimed in claim 1 wherein the plurality of peripherals comprises peripherals which communicate using an ATA standard interface and peripherals which communicate using PCMCIA specifications.

3. The apparatus as claimed in claim 1 wherein the plurality of peripherals comprises infrared peripherals.

4. The apparatus as claimed in claim 2 wherein the circuit is coupled to the controllers by an ATA standard interface cable.

5. The apparatus as claimed in claim 4 wherein the peripherals which communicate using PCMCIA specifications are coupled to the ATA standard interface and utilize a same cable as the peripherals which communicate using the ATA standard interface.

6. The apparatus as claimed in claim 5 wherein the plurality of peripherals includes an ATA interfaced peripheral and a PCMCIA expansion slot.

7. A multiple format interface apparatus coupled to a system bus for interfacing the system bus to a plurality of controllers, the interface apparatus comprising:
   a. a plurality of controllers coupled in parallel for controlling a plurality of peripherals at least two of which use incompatible interface protocols;
   b. a first circuit coupled between the system bus and the plurality of controllers for selectively configuring the interface apparatus to communicate using a selected one of the incompatible interface protocols used by the at least two of the plurality of peripherals; and
   c. a second circuit coupled to the first circuit for selectively allowing communication between only an appropriate one of the plurality of controllers and the system bus through the interface apparatus,
       wherein the second circuit monitors chip select signal lines and data signal lines to determine when a specific one of the plurality of controllers is being accessed by the system bus.

8. The apparatus as claimed in claim 7 wherein the plurality of peripherals comprises peripherals which communicate using an ATA standard interface and peripherals which communicate using PCMCIA specifications.

9. The apparatus as claimed in claim 7 wherein the plurality of peripherals comprises infrared peripherals.

10. The apparatus as claimed in claim 8 wherein the first circuit is coupled to the plurality of controllers by an ATA standard interface cable.

11. The apparatus as claimed in claim 10 wherein the plurality of peripherals which communicate using PCMCIA specifications are coupled to the ATA standard interface and utilize a same cable as the plurality peripherals which communicate using the ATA standard.

12. The apparatus as claimed in claim 11 wherein the plurality of peripherals includes an ATA interfaced peripheral and a PCMCIA expansion slot.

13. A digital computer system including a CPU, a motherboard, a system bus, and two or more sub-systems, the digital computer system further comprising:
   a. an interface logic circuit coupled to the system bus for controlling communications between the sub-system and the system bus, wherein at least two of the sub-systems have a format and a characteristic different from one another;
   b. a first sub-system coupled to the interface logic circuit having a first set of characteristics for which communications can be conducted in a first format, the first sub-system including a first detection circuit for determining when the first sub-system is being accessed by the interface logic circuitry; and
   c. a second sub-system coupled to the interface logic circuit and the first sub-system, having a second set of characteristics for which communication can be conducted in a second format, the second sub-system including a second detection circuit for determining when the second sub-system is being accessed by the interface logic circuit,
       wherein the detection circuitry within the first and second sub-systems monitors chip select signal lines and data signal lines within the ATA standard cable to determine when the respective sub-system is being accessed by the interface logic circuit.

14. The system as claimed in claim 13 wherein the first sub-system is an ATA disk drive which uses an ATA standard interface and is coupled to the interface logic circuit by an ATA standard cable.

15. The system as claimed in claim 14 wherein the second sub-system is a PCMCIA slot which is coupled to the ATA standard cable.

16. The system as claimed in claim 14 wherein the second sub-system is an infrared transceiver coupled to the ATA standard cable.

17. A communications integrated circuit for communication to a central processing unit (CPU) and a controller, the communications integrated circuit comprising:
   a. a first interface circuit selectively coupled to the CPU according to a predetermined configuration for bidirectional communication;
   b. a second interface circuit selectively coupled to the controller according to a predetermined configuration for bidirectional communication using a windowed-interchip-communication protocol;
   c. a storage means coupled to the first interface circuit and the second interface circuit for receiving control data and storing status information; and
   d. a control circuit coupled to the first interface circuit, the second interface circuit, and the storage means, for controlling the bidirectional communication between the first interface circuit and the CPU and for controlling the bidirectional communication between the second interface and the controller.

18. The communications integrated circuit as claimed in claim 17 wherein the storage means further buffers a flow of data between the first interface circuit and the second interface circuit from the communication with the CPU and the controller.

19. The communications integrated circuit as claimed in claim 18 wherein the controller is a socket controller.

20. The communications integrated circuit as claimed in claim 19 wherein the controller is a socket controller.

21. A communications integrated circuit for communication to a central processing unit (CPU) and a controller, the communications integrated circuit comprising:

a. a first interface circuit selectively coupled to the CPU according to a predetermined configuration for bidirectional communication;

b. a second interface circuit coupled to the controller for bidirectional communication with the controller using a windowed-interchip-communication protocol and is further coupled to a hard disk drive for bidirectionally communicating with the hard disk drive using an ATA communication standard;

c. a storage means coupled to the first interface circuit and the second interface circuit for receiving control data and storing status information; and d. a control circuit coupled to the first interface circuit, the second interface circuit, and the storage means, for controlling the bidirectional communication between the first interface circuit and the CPU and for controlling the bidirectional communication between the second interface and the controller.

22. A controller integrated circuit for communication to a communications integrated circuit and a peripheral, the controller integrated circuit comprising:

a bus interface circuit selectively coupled to the communications integrated circuit according to a predetermined configuration for bidirectional communication using a communication protocol;

a peripheral controller circuit selectively coupled to the peripheral according to a predetermined configuration for bidirectional communication;

a storage means coupled to the bus line interface circuit and the peripheral controller circuit for receiving control data and storing status information; and a control circuit coupled to the bus interface circuit, the peripheral controller circuit, and the storage means, for controlling the bidirectional communication between the bus interface circuit and the communications integrated circuit and for controlling the bidirectional communications between the peripheral controller circuit and the peripheral, wherein the communication protocol is a windowed-interchip-communication protocol.

23. The communications integrated circuit as claimed in claim 22 wherein the storage means further buffers a flow of data between the first interface circuit and the second interface circuit from the communication with the CPU and the controller.

24. The controller integrated circuit as claimed in claim 22 wherein the peripheral is a PCMCIA peripheral.

25. The controller integrated circuit as claimed in claim 22 wherein the communications integrated circuit is a system adapter.

26. A multiple format interface apparatus coupled to a system bus for interfacing the system bus to a plurality of controllers, the interface apparatus comprising:

a plurality of peripherals coupled in parallel, at least two of which use incompatible interface protocols;

a circuit coupled between the system bus and the plurality of peripherals for selectively configuring the interface apparatus to communicate using a selected one of the incompatible interface protocols used by the at least two of the plurality of peripherals; and a detection means coupled to the plurality of peripherals for selectively allowing communication between the each of the plurality of peripherals coupled thereto and the system bus through the interface apparatus, wherein the detection means monitors a chip select signal line and data signal lines to determine when a specific one of the plurality of controllers is being accessed by the system bus.

* * * * *